United States Patent
Kono et al.

(10) Patent No.: US 9,152,337 B2
(45) Date of Patent: *Oct. 6, 2015

(54) STORAGE APPARATUS AND STORAGE APPARATUS MIGRATION METHOD

(71) Applicant: HITACHI, LTD., Tokyo (JP)

(72) Inventors: Taiki Kono, Tokyo (JP); Hidenori Suzuki, Tokyo (JP); Kunihiko Nashimoto, Tokyo (JP); Shigeo Homma, Tokyo (JP); Toru Suzuki, Tokyo (JP); Tomohiro Kawaguchi, Tokyo (JP); Hideo Saito, Tokyo (JP); Azusa Jin, Tokyo (JP); Hiroshi Nasu, Tokyo (JP); Keishi Tamura, Tokyo (JP); Shoji Sugino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,932

(22) Filed: Nov. 18, 2014

(65) Prior Publication Data

US 2015/0074364 A1    Mar. 12, 2015

Related U.S. Application Data

(63) Continuation of application No. 14/453,823, filed on Aug. 7, 2014, now Pat. No. 8,904,133, which is a continuation-in-part of application No. PCT/JP2012/081262, filed on Dec. 3, 2012, and a continuation-in-part of application No. PCT/JP2014/061245, filed on Apr. 22, 2014.

(51) Int. Cl.
*G06F 3/06* (2006.01)
*G06F 11/14* (2006.01)

(52) U.S. Cl.
CPC .............. *G06F 3/0647* (2013.01); *G06F 3/067* (2013.01); *G06F 3/0619* (2013.01); *G06F 11/1458* (2013.01)

(58) Field of Classification Search
None
See application file for complete search history.

(56) References Cited

U.S. PATENT DOCUMENTS

| | | | |
|---|---|---|---|
| 5,742,792 A | 4/1998 | Yanai et al. | |
| 6,101,497 A | 8/2000 | Ofek | |
| 7,152,079 B2 | 12/2006 | Hirakawa et al. | |
| 2003/0033494 A1 | 2/2003 | Fujibayashi et al. | |
| 2005/0149577 A1 | 7/2005 | Okada et al. | |
| 2006/0085607 A1 | 4/2006 | Haruma | |
| 2012/0226860 A1 | 9/2012 | Saito et al. | |

FOREIGN PATENT DOCUMENTS

| | | | |
|---|---|---|---|
| JP | 2006-113895 A | 4/2006 | |
| JP | 2007-115221 A | 5/2007 | |

*Primary Examiner* — Kevin Verbrugge
(74) *Attorney, Agent, or Firm* — Mattingly & Malur, PC

(57) ABSTRACT

A source remote copy configuration in a source storage system is migrated to a destination storage system as a destination remote copy configuration. The destination primary storage apparatus of the destination storage system defines a virtual volume mapped to the primary volume provided by the source primary storage apparatus which is a storage area of the virtual volume; takes over a first identifier of the primary volume to the virtual volume; transfers, when the virtual volume receives an access request, the access request to the source primary storage apparatus to write data in the primary volume; and takes over the first identifier from the virtual volume to another primary volume provided by the destination primary storage apparatus, after completion of copy of data from primary volume of the source primary storage apparatus into primary volume of the destination primary storage apparatus and secondary volume of the destination secondary storage apparatus.

15 Claims, 52 Drawing Sheets

Fig. 28

PARITY GROUP MANAGEMENT TABLE

T100

| PARITY GROUP NAME (T101) | DRIVE NAME (T102) | RAID LEVEL (T103) | SIZE (T104) | REMAINING SIZE (T105) |
|---|---|---|---|---|
| RG A | 0, 1, 2, 3 | RAID 5 | 3 TB | 2 TB |
| RG B | 10, 11, 12, 13 | RAID 5 | 1.5 TB | 1.5 TB |
| RG C | 20, 21, 22, 23, 24, 25, 26, 27 | RAID 5 | 6 TB | 6 TB |

Fig. 29

EXTERNAL VOLUME GROUP MANAGEMENT TABLE (T150)

| GROUP NAME (T151) | WWN (T152) | LUN (T153) | SIZE (T154) |
|---|---|---|---|
| EG1 | 50060e8005111112b | 0 | 100GB |
| EG2 | ... | ... | ... |
|  |  |  |  |

Fig. 30

T200 — LOGICAL VOLUME MANAGEMENT TABLE

| LDEV# | SIZE | GROUP NAME | INITIAL ADDRESS | |
|---|---|---|---|---|
| 44 | 100GB | RG A | 0 | 906 |
| 33 | 100GB | EG1 | 0 | 907 |
| 55 | 300GB | RG C | 0 | 908 |
|  |  |  |  | |

| PORT NAME (T301) | LUN (T302) | LDEV# (T303) | |
|---|---|---|---|
| 3e243174 aaaaaaaa (PORT A) | 0 | 11 | 300-5 |
| | 1 | 12 | |
| | 2 | 13 | |
| | : | : | |
| 3e243174 bbbbbbbb | 0 | 11 | 300-6 |
| | : | : | |
| | : | : | |
| : | : | : | |

| PAIR NUMBER | STATE | PDKC# | P-VOL# | SDKC# | S-VOL# |
|---|---|---|---|---|---|
| 1 | 1 | 1 | 1 | 11 | 0 |
| 2 | 2 | 1 | 2 | 11 | 1 |
| 3 | 2 | 1 | 3 | 11 | 3 |
| 4 | 1 | 1 | 0 | 11 | 2 |
| : | : | : | : | | |
| | : | | : | | |
| | | | | | |

T2001 T2002 T2003 T2004 T2005 T2006

T2000

STATE:
1: copy pending
2: pair
3: suspended

Fig. 34

V-BOX MANAGEMENT TABLE T1000

| ID ~T1001 | MODEL NAME ~T1002 | S/N ~T1003 | VLDEV# ~T1004 | LDEV# ~T1005 | |
|---|---|---|---|---|---|
| v0 | VSP | 2 | 0 | 0 | ⎫ |
| | | | 1 | 1 | ⎬ R1011 |
| | | | 2 | 2 | |
| | | | ... | ... | ⎭ |
| v1 | USP | 1 | NULL | 44 | ⎫ |
| | | | 99 | 33 | ⎬ R1012 |
| | | | ... | ... | ⎭ |
| ... | ... | ... | ... | ... | |

Fig. 35

VIRTUAL LDEV MANAGEMENT TABLE T1500

| LDEV# | VLDEV# | ID | ATTRIBUTE |
|---|---|---|---|
| 0 | 0 | v0 | |
| 1 | 1 | v0 | |
| 2 | NULL | v0 | reserved |
| ... | ... | ... | ... |
| 44 | NULL | v1 | reserved |
| | ... | | |
| | | | |

# STORAGE APPARATUS AND STORAGE APPARATUS MIGRATION METHOD

CROSS REFERENCES TO RELATED APPLICATIONS

This application is a continuation of U.S. Ser. No. 14/453,823, filed Aug. 7, 2014, which is a continuation-in-part of PCT/JP2012/081262, filed Dec. 3, 2012, and PCT/JP2014/061245, filed Apr. 22, 2014, the entire disclosures of all applications listed above are hereby incorporated by reference.

BACKGROUND OF THE INVENTION

The present invention relates to the art of migrating volumes among storage subsystems, including a technology for migrating a volume of a primary storage apparatus or secondary storage apparatus in a remote copy system having the primary storage apparatus and secondary storage apparatus, to another storage apparatus.

Along with the advancement of IT and the spreading of the Internet, the amount of data stored in computer systems of enterprises and the like is continuing to increase, and storage subsystems storing such data are required to have greater capacity and higher performance. Therefore, when a storage subsystem is used for a given number of years, it is replaced with a new-generation system.

In principle, the computer systems used in enterprises and the like are required to realize non-stop operation, and the storage subsystems are also required to operate in such a manner. Therefore, downtime must be suppressed to a minimum during replacement of storage subsystems. For example, Japanese Patent Application Laid-Open Publication No. 2007-115221 (Patent Literature 1) relates to migrating volumes from a migration source storage A to a migration destination storage B. Patent Literature 1 teaches migrating volume pairs subjected to volume mirroring within the storage subsystem or from a storage subsystem to another storage subsystem, and enabling to accept I/O requests during migration of volumes from the migration source subsystem to the migration destination subsystem.

Additional references include US Patent Application Publication No. 2005/0149577 (Patent Literature 2), U.S. Pat. No. 6,101,497 (Patent Literature 3), U.S. Pat. No. 5,742,792 (Patent Literature 4), and U.S. Pat. No. 7,152,079 (Patent Literature 5).

There is known a remote copy system with a primary storage apparatus (PDKC) and secondary storage apparatus (SDKC), wherein data is copied from a primary logical volume (PVOL) of the PDKC to a secondary logical volume (SVOL) of the SDKC. Remote copying is categorized into synchronous remote copying whereby, in synchronization with writing data into the PVOL, the data is written to the SVOL, and asynchronous remote copying whereby, asynchronously with writing data into the PVOL, the data is written into the SVOL. For example, Japanese Patent Application Publication No. 2005-182222 (Patent Literature 6) discloses a technology concerning synchronous remote copying for migrating a PVOL to another storage apparatus.

According to the technology disclosed in Patent Literature 6, a virtual management network needs to be installed in the remote copy system and a migration-source PDKC needs to provide a function for migrating a PVOL. The situation for migrating a PVOL can be considered one wherein the PVOL is migrated using a storage apparatus of the old model that manages a currently operated PVOL to be synchronously remote-copied as a migration source, and a storage apparatus of the new type that is newly installed as a migration destination. In this situation, according to the technology described, the migration-source PDKC might not necessarily be capable of migrating the PVOL, although it needs to be. Making the migration-source PDKC capable of migrating the PVOL can be cumbersome. In some cases it is even impossible to make the migration-source PDKC capable of migrating a PVOL. The problem described above applies to a case where an SVOL is migrated from a migration-source SDKC to a migration-destination SDKC.

BRIEF SUMMARY OF THE INVENTION

In a computer system performing operation using volume pairs, an operation of volume pairs is performed when necessary. For example, when a volume pair is used for the purpose of backup, the following operation is performed when performing backup of a volume: mirroring from a copy source volume (primary volume) to a copy destination volume (secondary volume) is temporarily stopped, the data in the secondary volume in which mirroring has been stopped is subjected to backup to a backup device, and after completing backup, the mirroring is resumed. During this operation, the volume pair can be operated by issuing a command designating an identifier capable of uniquely specifying a volume, such as an identification number (such as a serial number) of a storage subsystem to which the volume pair belongs, and a volume number. Further, since backup is a regular operation, in many cases, the sequence of operation commands of the volume pair required during backup is written in a script file in a server.

When the storage subsystem is replaced, not only the serial number of the storage subsystem but also the volume number may be changed. In that case, the information such as the volume number written in script files for backup must all be rewritten. In a large-scale computer system where a large number of (such as hundreds of) volume pairs are managed, the amount of data to be changed becomes enormous, and the changing of the script files requires much time. As a result, the downtime of the computer system is extended. According to the art taught in Patent Literature 1, I/O from the computer system can be processed during migration of data, but there is no consideration on the changing of identifiers such as volume numbers.

An object of the present invention is to minimize the influence of volume migration on the computer system.

According to a volume migration method of the present invention, at least two volumes forming a volume pair within a migration source storage system (a migration source P-VOL and a migration destination S-VOL) are migrated to a migration destination storage subsystem while realizing a non-stop operation. At the first of the migration process, a virtual logical volume (migration destination P-VOL) having mapped a storage area of a replication source volume (migration source P-VOL) of the volume pair within the migration source storage system and a migration destination S-VOL as replication destination volume of the migration destination P-VOL are created in the migration destination storage system.

The migration destination storage system assigns an identical identifier to the migration destination P-VOL and the migration destination S-VOL as the identifier of the migration source P-VOL and the migration source S-VOL, so as to have the host computer recognize that the migration destination P-VOL and the migration destination S-VOL are identical volumes as the migration source P-VOL and the migration source S-VOL. Thereafter, the access path from the host computer to the migration source P-VOL is changed to the migration destination P-VOL.

Then, a volume pair is created in the migration destination P-VOL and the migration destination S-VOL, so as to realize a state where the data replica of the migration destination P-VOL is stored in the migration destination S-VOL. Lastly, the migration process is completed by changing the storage area of the migration destination P-VOL into a storage area in the migration destination storage system.

According to the migration method of the present invention, a volume pair can be migrated from one storage subsystem to another without stopping host I/O, and since the identifiers of the respective volumes are not changed even when the volume pair is migrated from one storage subsystem to another, there is no need to change the settings of the host computer using the volumes.

According to a specific approach, a migration-destination PDKC, which is coupled to a migration-source PDKC that provides a first PVOL pairing up with an SVOL of a SDKC, has a second PVOL and a control device that manages, based on first identification information, a virtual primary logical volume (PVVOL) obtained by virtualizing the first PVOL, and executes copying of data from the PVVOL to the second PVOL. When receiving a first write request designating the first identification information prior to completion of the copying, the control device transmits write data according to the first write request to the migration-source PDKC. After completion of the copying, the control device changes identification information of the second PVOL to the first identification information, and, upon receiving a second write request designating the first identification information, writes write data according to the second write request into the second PVOL, and transfers the write data to the SDKC. According to this specific approach, the migration-source PDKC can be migrated to the migration-destination PDKC, while continuing synchronous remote copying, without adding any special function to the migration-source PDKC.

An aspect of the present invention is directed to a storage system for migrating a source remote copy configuration in a source storage system to a destination storage system as a destination remote copy configuration. The storage system comprises: the source storage system including the source remote copy configuration comprised of a primary volume provided by a source primary storage apparatus and a secondary volume provided by a source secondary storage apparatus; and the destination storage system, coupled to the source storage system, including a primary volume provided by a destination primary storage apparatus and a secondary volume provided by a destination secondary storage apparatus so that the primary volume of the destination primary storage apparatus and the secondary volume of the destination secondary storage apparatus are able to configure the destination remote copy configuration. The destination primary storage apparatus of the destination storage system is configured to: define a virtual volume mapped to the primary volume provided by the source primary storage apparatus which is a storage area of the virtual volume; take over a first identifier of the primary volume of the source primary storage apparatus, to the virtual volume, the first identifier provided for a host computer as an identifier of the virtual volume; transfer, when the virtual volume receives an access request from the host computer, the access request to the source primary storage apparatus to write data in the primary volume provided by the source primary storage apparatus; and take over the first identifier from the virtual volume to the primary volume of the destination primary storage apparatus, after completion of a copy of data stored in the primary volume of the source primary storage apparatus into both the primary volume of the destination primary storage apparatus and the secondary volume of the destination secondary storage apparatus. When the destination primary storage apparatus of the destination storage system receives a write request from the host computer after taking over the first identifier from the virtual volume to the primary volume of the destination primary storage apparatus, the destination primary storage apparatus of the destination storage system is configured to: write data related to the write request to the primary volume of the destination primary storage apparatus; and copy the data between the primary volume provided by the destination primary storage apparatus and the secondary volume provided by the destination secondary storage apparatus which comprise the destination remote copy configuration.

Another aspect of the invention is directed to a storage system coupled to a host computer for migrating a source remote copy configuration in a source storage system to a destination storage system as a destination remote copy configuration. The storage system comprises: the source storage system including the source remote copy configuration comprised of a primary volume provided by a source primary storage apparatus and a secondary volume provided by a source secondary storage apparatus; and the destination storage system, coupled to the source storage system, including a primary volume provided by a destination primary storage apparatus and a secondary volume provided by a destination secondary storage apparatus so that the primary volume of the destination primary storage apparatus and the secondary volume of the destination secondary storage apparatus are able to configure the destination remote copy configuration. The destination primary storage apparatus is configured to: define a virtual volume which is mapped to the primary volume provided by the source primary storage apparatus for storing data in the primary volume provided by the source primary storage apparatus; take over a first identifier of the primary volume of the source primary storage apparatus to the virtual volume, the first identifier provided for the host computer as an identifier of the virtual volume; and transfer, when the destination primary storage apparatus receives an access request to the virtual volume from the host computer, the access request to the source primary storage apparatus for accessing data in the primary volume provided by the source primary storage apparatus. The destination secondary storage apparatus is configured to take over a second identifier of the secondary volume of the source secondary storage apparatus, to the secondary volume of the destination secondary storage apparatus as an identifier of the secondary volume of the destination secondary storage apparatus. The destination primary storage apparatus of the destination storage system and the destination secondary storage apparatus of the destination storage system are configured to: form a remote copy pair between the virtual volume associated with the first identifier and the secondary volume associated with the second identifier; and copy data in the primary volume of the source primary storage apparatus to the secondary volume of the destination secondary storage apparatus, the primary volume of the destination primary apparatus being a storage area of the virtual volume. The destination primary storage apparatus is configured to: form a volume migration pair between the primary volume of the destination primary storage apparatus and the virtual volume associated with the first identifier; and migrate data stored in the primary volume of the source primary storage apparatus into the primary volume of the destination primary storage apparatus, the primary volume of the destination secondary storage apparatus being a storage area of the virtual volume.

After completion of the copy of data stored in the primary volume of the source primary storage apparatus to the primary volume of the destination primary storage apparatus and completion of the migration of data stored in the primary volume of the source primary storage apparatus to the secondary volume of the destination secondary storage apparatus, the destination primary storage apparatus is configured to: take over the first identifier from the virtual volume to the primary volume of the destination primary storage apparatus; and provide the destination remote copy configuration between the primary volume of the destination primary storage apparatus and the secondary volume of the destination secondary storage apparatus. When the destination primary storage apparatus of the destination storage system receives a write request from the host computer, the destination primary storage apparatus is configured to: write data related to the write request to the primary volume of the destination primary storage apparatus; and copy the data between the primary volume provided by the destination primary storage apparatus and the secondary volume provided by the destination secondary storage apparatus which comprise the destination remote copy configuration.

In some embodiments, when a write request is transferred from the destination primary storage apparatus before completion of a copy of data stored in the primary volume of the source primary storage apparatus into the primary volume of the destination primary storage apparatus, the source primary storage apparatus is configured to: store the data related to the write request in the primary volume of the source primary storage apparatus; and copy the data related to the write request to the secondary volume of the source secondary storage apparatus for keeping the remote copy configuration at the source storage system.

In specific embodiments, the destination primary storage apparatus is configured to execute a remote copy function for copying data from the virtual volume to the secondary volume of the destination secondary storage apparatus and a data migration function. The data migration function is configured to: migrate data between the virtual volume and the primary volume of the destination primary storage apparatus; and take over the first identifier from the virtual volume to the primary volume of the destination primary storage apparatus after completion of the data migration. The data migration function is configured to wait until completion of an initial copy executed by the remote copy function before taking over the first identifier even if the data migration is completed.

In some embodiments, the source remote copy configuration is and the destination remote copy configuration is either a synchronous remote copy configuration or an asynchronous remote copy configuration.

In specific embodiments, the destination primary storage apparatus further comprises a plurality of storage devices which configure a storage area of the primary volume of the destination primary storage apparatus. When the destination primary storage apparatus receives a write request to the primary volume of the destination primary storage apparatus, the destination primary storage apparatus is configured to store data related to the write request in the plurality of storage devices.

In some embodiments, the virtual volume has a third identifier as a real identifier of the virtual volume. The destination primary storage apparatus is configured to take over the first identifier from the primary volume of the source primary storage apparatus to the virtual volume by associating the first identifier with the third identifier. The secondary volume of the destination secondary storage apparatus has a fifth identifier as a real identifier of the secondary volume of the destination secondary storage apparatus. The destination secondary storage apparatus is configured to take over the second identifier from the secondary volume of the source primary storage apparatus to the secondary volume of the destination secondary storage apparatus by associating the second identifier with the fifth identifier.

In specific embodiments, the primary volume of the destination primary storage apparatus has a fourth identifier as a real identifier of the primary volume of the destination primary storage apparatus. After the completion of the copy of data stored in the primary volume of the source primary storage apparatus into the primary volume of the destination primary storage apparatus and the completion of the migration of data stored in the primary volume of the source primary storage apparatus into the secondary volume of the destination secondary storage apparatus, the destination primary storage apparatus is configured to: swap the third identifier for the fourth identifier so that the identifier of the virtual volume changes to the fourth identifier and the identifier of the primary volume of the destination primary storage apparatus changes to the third identifier which is associated with the first identifier; and provide the host computer with the primary volume of the destination primary storage apparatus as a volume having the first identifier.

In some embodiments, when the destination storage system receives an INQUIRY command from the host, the destination storage system is configured to respond to the INQUIRY command with not a real identifier of a volume which takes over the first identifier but the first identifier as an identifier of the volume.

In specific embodiments, the storage system further comprises a management terminal. When the destination primary storage apparatus receives a command for instructing pair creation specifying the first identifier and the second identifier from the management terminal, the primary storage apparatus is configured to configure remote a copy pair in the destination storage system between a volume having the third identifier associated with the first identifier and a volume having the fifth identifier associated with the second identifier.

Another aspect of this invention is directed to a remote copy configuration migration method for migrating a source remote copy configuration in a source storage system to a destination storage system as a destination remote copy configuration. The remote copy configuration migration method comprises: defining a virtual volume which is mapped to a primary volume provided by the source storage system for storing data in the primary volume of the source storage system; taking over a first identifier of the primary volume of the source storage system to the virtual volume, the first identifier provided for a host computer as an identifier of the virtual volume; transferring, when the source storage system receives an access request to the virtual volume from the host computer, the access request to the source storage system for accessing data in the primary volume of the source storage system; taking over a second identifier of the secondary volume of the source storage system, to the secondary volume of the destination storage system as an identifier of the secondary volume of the destination storage system; forming a remote copy pair between the virtual volume associated with the first identifier and the secondary volume associated with the second identifier; copying data in the primary volume of the source storage system to the secondary volume of the destination storage system, the primary volume of the destination primary apparatus being a storage area of the virtual volume; configuring a volume migration pair between the primary volume of the destination storage system and the virtual volume associated with the first identifier; and migrating data stored in the primary volume of the source storage system into the primary volume of the destination storage system, the primary volume of the destination storage system being a storage area of the virtual volume. After both completion of the copy of data stored in the primary volume of the source storage system to the primary volume of the destination storage system and completion of the migration of data stored in the primary volume of the source storage system to the secondary volume of the destination storage system, the remote copy configuration migration method further comprises: taking over the first identifier from the virtual volume to the primary volume of the destination storage system; and forming the destination remote copy configuration between the primary volume of the destination storage system and the secondary volume of the destination storage system. When the destination storage system receives a write request from the host computer, the remote copy configuration migration method further comprises: writing data related to the write request to the primary volume of the destination storage system; and copying the data between the primary volume of the destination storage system and the secondary volume of the secondary storage system which comprise the destination remote copy configuration.

Another aspect of the present invention is directed to a destination storage system coupled to a host computer for migrating a source remote copy configuration in a source storage system to a destination storage system as a destination remote copy configuration. The storage system comprises: the source storage system including the source remote copy configuration comprised of a primary volume provided by a source primary storage apparatus and a secondary volume provided by a source secondary storage apparatus; and the destination storage system, coupled to the source storage system, including a primary volume provided by a destination primary storage apparatus and a secondary volume provided by a destination secondary storage apparatus so that the primary volume of the destination primary storage apparatus and the secondary volume of the destination secondary storage apparatus are able to configure the destination remote copy configuration. The destination primary storage apparatus is configured to: define a virtual volume which is mapped to the primary volume provided by the source primary storage apparatus for storing data in the primary volume provided by the source primary storage apparatus; take over a first identifier of the primary volume of the source primary storage apparatus to the virtual volume, the first identifier provided for the host computer as an identifier of the virtual volume; and transfer, when the destination primary storage apparatus receives an access request to the virtual volume from the host computer, the access request to the source primary storage apparatus for accessing data in the primary volume provided by the source primary storage apparatus. The destination secondary storage apparatus is configured to take over a second identifier of the secondary volume of the source secondary storage apparatus, to the secondary volume of the destination secondary storage apparatus as an identifier of the secondary volume of the destination secondary storage apparatus. The destination primary storage apparatus of the destination storage system and the destination secondary storage apparatus of the destination storage system are configured to: form a remote copy pair between the virtual volume associated with the first identifier and the secondary volume associated with the second identifier; and copy data in the primary volume of the source primary storage apparatus to the secondary volume of the destination secondary storage apparatus, the primary volume of the destination primary apparatus being a storage area of the virtual volume. The destination primary storage apparatus is configured to: configure a volume migration pair between the primary volume of the destination primary storage apparatus and the virtual volume associated with the first identifier; and migrate data stored in the primary volume of the source primary storage apparatus into the primary volume of the destination primary storage apparatus, the primary volume of the destination secondary storage apparatus being a storage area of the virtual volume. After completion of the copy of data stored in the primary volume of the source primary storage apparatus to the primary volume of the destination primary storage apparatus and completion of the migration of data stored in the primary volume of the source primary storage apparatus to the secondary volume of the destination secondary storage apparatus, the destination primary storage apparatus is configured to: take over the first identifier from the virtual volume to the primary volume of the destination primary storage apparatus; and form the destination remote copy configuration between the primary volume of the destination primary storage apparatus and the secondary volume of the destination secondary storage apparatus. When the destination primary storage apparatus of the destination storage system receives a write request from the host computer, the destination primary storage apparatus is configured to: write data related to the write request to the primary volume of the destination primary storage apparatus; and copy the data between the primary volume provided by the destination primary storage apparatus and the secondary volume provided by the destination secondary storage apparatus which comprise the destination remote copy configuration.

These and other features and advantages of the present invention will become apparent to those of ordinary skill in the art in view of the following detailed description of the specific embodiments.

BRIEF DESCRIPTION OF THE DRAWINGS

FIG. 28 illustrates a configuration example of a parity group management table.

FIG. 29 illustrates a configuration example of an external volume group management table.

FIG. 30 illustrates a configuration example of a logical volume management table.

FIG. 31 illustrates a configuration example of an LU management table.

FIG. 32 illustrates a configuration example of a pair management table.

FIG. 34 illustrates a configuration example of a V-BOX management table.

FIG. 35 illustrates a configuration example of a virtual LDEV management table.

DETAILED DESCRIPTION OF THE INVENTION

Figure 1:
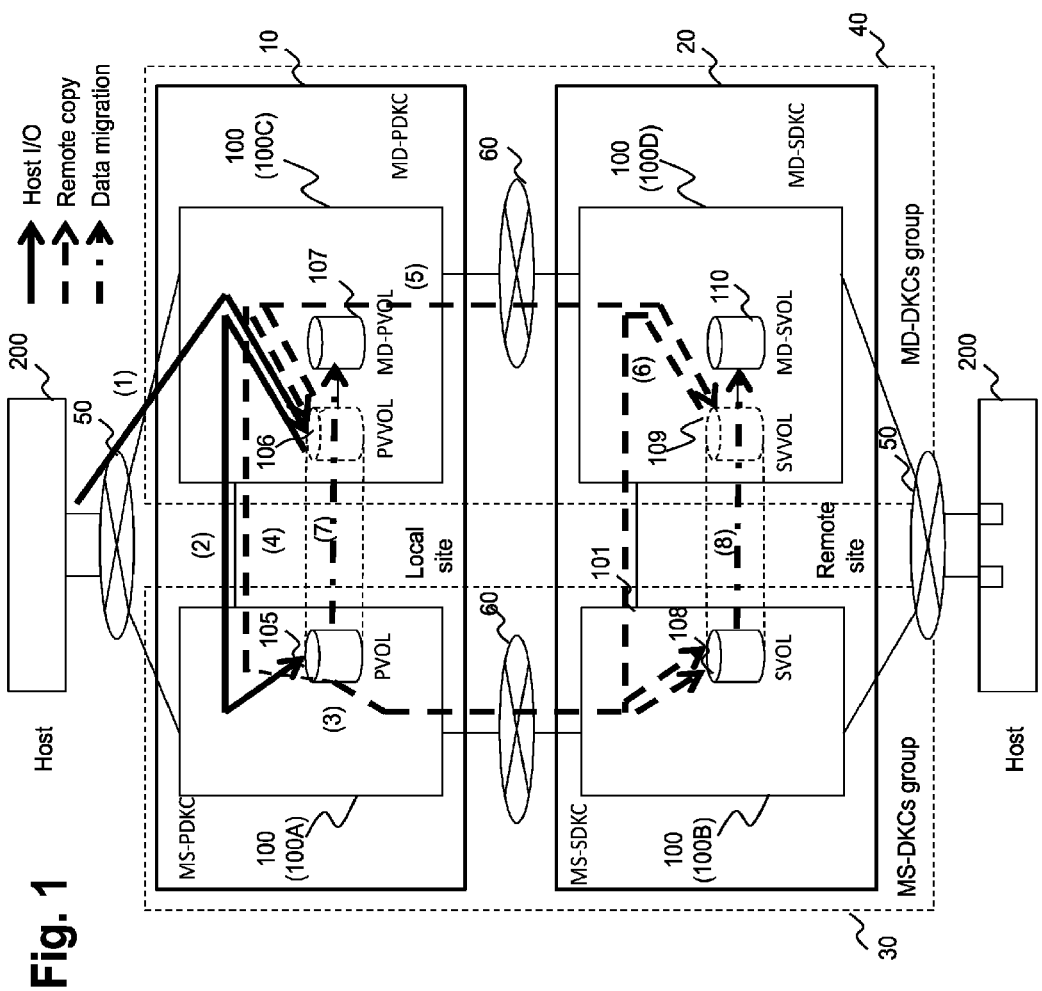
FIG. 1 is a diagram showing an example of an outline of Example 1.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for migrating volumes among storage subsystems. The present specification uses the following terms.

"PDEV" is short for physical storage device (typically a non-volatile storage device). The PDEV has, for example, a storage medium (typically a non-volatile storage medium) and a controller that controls input/output (I/O) of data to/from the storage medium. The non-volatile storage medium may be a group of hard disks (one or more hard disks) or a group of NVMs (one or more non-volatile semiconductor memories (NVM)). In other words, the PDEV may be, for example, a hard disk drive (HDD) or an NVM device such as a flash memory (FM) device (e.g., a solid state device (SSD)). The NVM may be, for example, an FM or a phase change memory. The FM may have, for example, a plurality of blocks (physical blocks), each of which may have a plurality of pages (physical pages). The NVM (typically the FM) may be of a type (e.g., a NAND-type FM) to which data can be written page by page; however, data cannot be written into a page unless the data on the page is deleted, and data are deleted block by block.

"VOL" is short for "logical volume" and is a logical storage device. The VOL may be a substantive VOL (RVOL) or a virtual VOL (VVOL). The VOL may be categorized into an online VOL that is provided to an external apparatus (e.g., a host computer) coupled to a DKC having the VOL, and an offline VOL that is not provided to the external apparatus (that is not recognized from the external apparatus). "RVOL" is a VOL based on a physical storage resources (e.g., a RAID (Redundant Array of Independent (or Inexpensive) Disks) group that is configured by a plurality of PDEVs (non-volatile physical storage devices)) of a storage apparatus having the RVOL. "VVOL" may be categorized into, for example, an external connection VOL (EVOL), which is a VOL based on a storage resource (e.g., a logical volume) of an external storage apparatus coupled to a storage apparatus having the VVOL and complies with a storage virtualization technology, and a VOL (TPVOL) that is configured by a plurality of virtual pages (virtual storage areas) and complies with a capacity virtualization technology (typically Thin Provisioning). The TPVOL is typically an online VOL. Real pages are allocated from a pool to the TPVOL. "Pool" is a storage resource configured by a plurality of real pages (substantive storage areas). The pool is configured by, for example, a plurality of pool VOLs, each of which is divided into two or more real pages. "Pool VOL" is a VOL configuring the pool. The pool VOL may be an RVOL or an EVOL. The pool VOL is typically an offline VOL.

"PVOL" is short for primary logical volume and represents a copy-source VOL. "SVOL" is short for secondary logical volume and represents a copy-destination VOL. A pair of PVOL and SVOL is typically referred to as VOL pair. Data is copied from the PVOL to the SVOL.

"DKC" represents a storage apparatus. The DKC has a VOL and a controller that controls I/O of data to/from the VOL. The DKC may have one or more PDEVs (e.g., one or more RAID groups), and the VOL of the DKC may be an RVOL or VVOL.

"PDKC" is short for primary DKC and is a DKC with a PVOL. "SDKC" is short for secondary DKC, which is a DKC with an SVOL. A remote copy system typically has a PDKC and a SDKC, and the PVOL and SVOL configuring a VOL pair exist in different DKCs.

"MS" is short for migration source. For example, "MS-PDKC" means migration-source PDKC.

"MD" is short for migration destination. For example, "MD-PDKC" means migration-destination PDKC.

In the following description, various pieces of information are described in the form of "aaa tables" but may be described in the form of data structures other than tables. For the purpose of indicating that the various pieces of information are independent of data structures, "aaa table" can be referred to as "aaa information." Furthermore, a case where processing is explained using a program or software as the doer of the action, can actually be understood that a processor or the like executes the program or software.

Example 1

FIG. 1 is a diagram showing an example of an outline of Example 1. This computer system is to migrate a PVOL 105 and a SVOL 108 to a MD-PVOL 107 and a MD-SVOL 110, respectively, while maintaining a remote copy operation. The computer system comprises one or more hosts (host computer(s)) 200 and a remote copy system. The remote copy system comprises a plurality of DKCs (storage apparatuses) 100. In the present example the remote copy system includes a MS-PDKC 100A that manages the PVOL 105, which is a MS (migration source), a MS-SDKC 100B that manages the SVOL 108, which is a copy-destination VOL of the PVOL 105, a MD-PDKC 100C that manages the MD-PVOL 107, which is a MD (migration destination) of the PVOL 105, and a MD-SDKC 100D that manages the MD-SVOL 110, which is a MD of the SVOL 108.

The MS-PDKC 100A and MS-SDKC 100B are coupled to each other via a communication network 60. The MD-PDKC 100C and MD-SDKC 100D, too, are coupled to each other via a communication network 60. In the present example, the PVOL 105 and the SVOL 108 corresponding to a MS-DKCs group 30 including the MS-PDKC 100A and the MS-SDKC 100B are migrated to a MD-DKCs group 40 including the MD-PDKC 100C and the MD-SDKC 100D.

The MS-PDKC 100A and the MD-PDKC 100C are installed in, for example, the same local site 10 and are communicably coupled to each other. In the present example, the MD-PDKC 100C virtualizes communication interface device (port) so that the MD-PDKC 100C appear to the MS-PDKC 100A as the MS-SDKC 100B. The MS-SDKC 100B and the MD-SDKC 100D are installed in a remote site 20, located away from the local site 10, and are communicably coupled to each other. In the present example the MD-SDKC 100D virtualizes communication interface device (port) so that the MD-SDKC 100D appear to the MS-SDKC 100B as the MS-PDKC 100A.

The MD-PDKC 100C manages a PVVOL 106 that is obtained by virtualizing the externally coupled PVOL 105 based on a storage virtualization technology. The host 200 and the MD-PDKC 100C are coupled to each other via a communication network 50. The host 200 recognizes a path through which the PVVOL 106 of the MD-PDKC 100C can be accessed. The MD-SDKC 100D manages a SVVOL 109 that is obtained by virtualizing the externally coupled SVOL 108 based on the storage virtualization technology.

In this computer system, the MD-PDKC 100C executes a PVOL migration process for migrating (e.g., copying) data of the PVOL 105 of the MS-PDKC 100A to the MD-PVOL 107 (FIG. 1(7)), while the MD-SDKC 100D executes an SVOL migration process for migrating data of the SVOL 108 of the MS-SDKC 100B to the MD-SVOL 110 (FIG. 1(8)).

The computer system enables the host 200 to write data to the PVOL 105 in conjunction with the PVOL migration process and the SVOL migration process. Specifically, when writing data to the PVOL 105 in the MS-PDKC 100A (at the time of host I/O), the host 200 transmits a write request concerning the PVVOL 106 to the MD-PDKC 100C (FIG. 1(1)).

In response to the write request concerning the PVVOL 106 from the host 200, the MD-PDKC 100C transfers this write request to the MS-PDKC 100A (FIG. 1(2)).

The MS-PDKC 100A executes a write process of writing data to the PVOL 105 in accordance with the received write request, as well as remote copying corresponding to the write request. In the present example, the MS-PDKC 100A recognizes that a path coupled to the MS-SDKC 100B via the communication network 60 (FIG. 1(3)) and a path coupled to the MD-PDKC 100C (FIG. 1(4)) exist as the path for remote copying the PVOL 105 to the SVOL 108.

Thus, at the time of remote copying, a write request relevant to the remote copying is transmitted using either one of these paths. The path to be used is selected according to, for example, a round-robin fashion.

For instance, when a write request is transmitted through the path shown by FIG. 1(3), the MS-SDKC 100B writes write target data (often described as "WR data" in the diagram) to the SVOL 108 in accordance with the write request.

On the other hand, when a write request is transmitted through the path shown by FIG. 1(4), the MD-PDKC 100C transmits the write request, which is transmitted from the MS-PDKC 100A, to the MD-SDKC 100D (FIG. 1(5)). Upon receiving this write request, the MD-SDKC 100D recognizes that the write request concerns the SVVOL 109, and transmits the write request to the MS-SDKC 100B (FIG. 1(6)).

Upon receiving this write request, the MS-SDKC 100B writes write target data to the SVOL 108 in accordance with the write request. Therefore, the data can be remote-copied from MS-PDKC 100A to the SVOL 108 of the MS-SDKC 100B via the MD-PDKC 100C.

In the present example, when all data in the PVOL 105 of the MS-PDKC 100A are migrated to the MD-PVOL 107 of the MD-PDKC 100C, the MD-PDKC 100C is configured to treat an access to the PVVOL 106 as an access to the MD-PVOL 107. Subsequently, when the access concerning the PVVOL 106 is received from the host 200, the MD-PDKC 100C executes a process of treating this access as an access to the MD-PVOL 107. Specifically, when a write request concerning the PVVOL 106 is transmitted from the host 200, the MD-PDKC 100C remote-copies the data to the MD-SDKC 100D (FIG. 1(5)) without transferring the write request to the MS-PDKC 100A, and thereafter stores write target data in the MD-PVOL 107.

According to the present example described above, the data in the PVOL 105 can be migrated to the MD-PVOL 107 of the MD-PDKC 100C, while continuing the remote copy operation, and thereafter the data in the MD-PVOL 107 can be remote-copied appropriately.

The computer system according to the present example is described hereinafter in detail with reference to the drawings.

Figure 2:
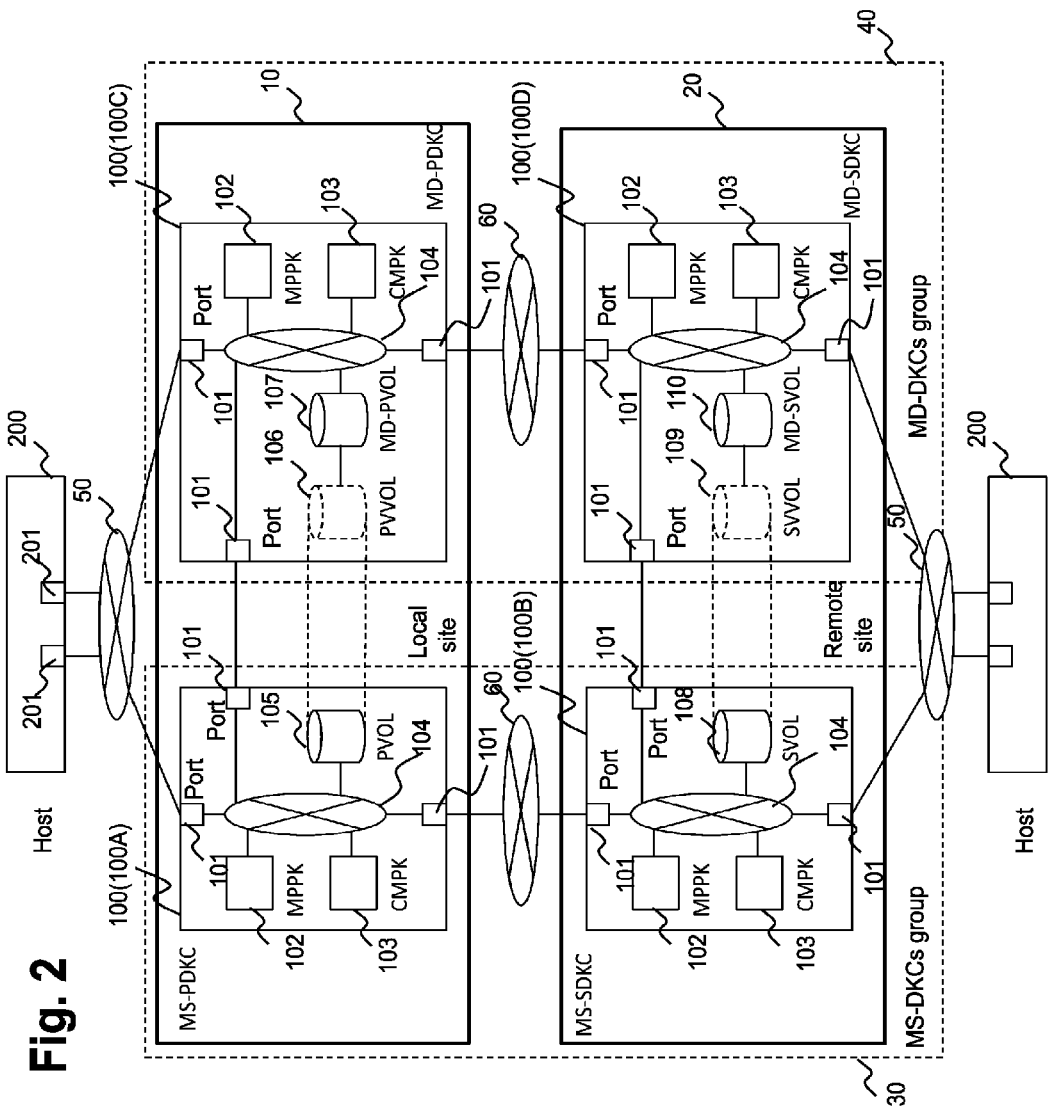
FIG. 2 is a diagram showing a configuration example of a computer system according to Example 1.

FIG. 2 is a diagram showing a configuration example of the computer system according to Example 1.

The computer system comprises one or more hosts 200 and a plurality of DKCs 100.

The host 200 is a general computer with a processor, cache, storage devices, and the like. The host 200 issues access requests to the DKCs 100 to access the VOLs managed by the DKCs 100. The host 200 has one or more ports 201. The port 201 is an example of a communication interface device and is an interface for coupling to a network. Identification information (e.g., world-wide name (WWN), etc.) by which the port can uniquely be identified is configured in the port 201. The host 200 manages information on a path to the DKCs 100, which is obtained by associating the identification information (e.g., a device number) of a VOL to be accessed and the identification information of the port 101 (port information) of the DKC 100 that is accessed when accessing the VOL.

In the present example, the DKCs 100 include the MS-PDKC 100A that manages the PVOL 105, which is a migration source (MS), the MS-SDKC 100B that manages the SVOL 108, which is a copy-destination VOL of the PVOL 105, the MD-PDKC 100C that manages the MD-PVOL 107, which is a migration destination (MD) of the PVOL 105, and the MD-SDKC 100D that manages the MD-SVOL 110, which is a MD of the SVOL 108.

The MS-PDKC 100A and MS-SDKC 100B are coupled to each other via a communication network 60. The MD-PDKC 100C and the MD-SDKC 100D, too, are coupled to each other via a communication network 60. In the present example, the PVOL 105 and the SVOL 108 corresponding to the MS-DKCs group 30 including the MS-PDKC 100A and the MS-SDKC 100B are migrated to the MD-DKCs group 40 including the MD-PDKC 100C and the MD-SDKC 100D.

The MS-PDKC 100A and the MD-PDKC 100C are installed in, for example, the same local site 10 and are communicably coupled to each other. The MS-SDKC 100B and the MD-SDKC 100D are installed in the remote site 20, away from the local site 10, and are communicably coupled to each other.

The DKC 100 comprises, for example, a plurality of ports 101, one or more microprocessor packages (MPPKs) 102, one or more cache memory packages (CMPKs) 103, an internal network 104, and one or more PDEVs configuring a VOL. The VOL is configured by one or more PDEVs. The ports 101, MPPKs 102, CMPKs 103, and PDEVs configuring the VOL are communicably coupled to one another via the internal network 104.

Regarding the VOLs managed by the DKCs 100, for instance, the MS-PDKC 100A manages the PVOL 105. The MS-SDKC 100B manages the SVOL 108. The MD-PDKC 100C manages the PVVOL 106 and MD-PVOL 107. The MD-SDKC 100D manages the SVVOL 109 and MD-SVOL 110.

The port 101 is an example of a communication interface device and is an interface for coupling to a network. Identification information (e.g., world-wide name (WWN), etc.) by which the port can uniquely be identified is configured in the port 101. In addition, any identification information can virtually be allocated to the port 101.

In the present example, the MS-PDKC 100A, for example, comprises a port 101 for coupling to the host 200, a port 101 for coupling to the MD-PDKC 100C, and a port 101 for coupling to the MS-SDKC 100B.

The MD-PDKC 100C comprises a port 101 for coupling to the host 200, a port 101 for coupling to the MS-PDKC 100A, and a port 101 for coupling to the MD-SDKC 100D.

The MS-SDKC 100B comprises a port 101 for coupling to the host 200, a port 101 for coupling to the MS-PDKC 100A, and a port 101 for coupling to the MD-SDKC 100D.

The MD-SDKC 100D comprises a port 101 for coupling to the host 200, a port 101 for coupling to the MD-PDKC 100C, and a port 101 for coupling to the MS-SDKC 100B.

The MPPK 102 is a device with one or a plurality of processors. The processors execute various processes according to programs. The MPPK 102 may have a memory for storing program executed by the processors and data to be used. In the present example, the MPPKs 102 of the MD-PDKC 100C and MD-SDKC 100D have programs for realizing new functions in the following example. It is sufficient that the MPPKs 102 of the MS-PDKC 100A and MS-SDKC 100B have existing programs.

The CMPK 103 includes one or more cache memories (CM). One or more CMs are volatile memories and/or non-volatile memories. In addition to storage areas ("cache areas," hereinafter) for temporarily storing data to be input/output to/from the PDEVs, one or more CMs may have storage areas ("shared areas," hereinafter) for storing information used by the processor of the MPPK 102.

Figure 3:
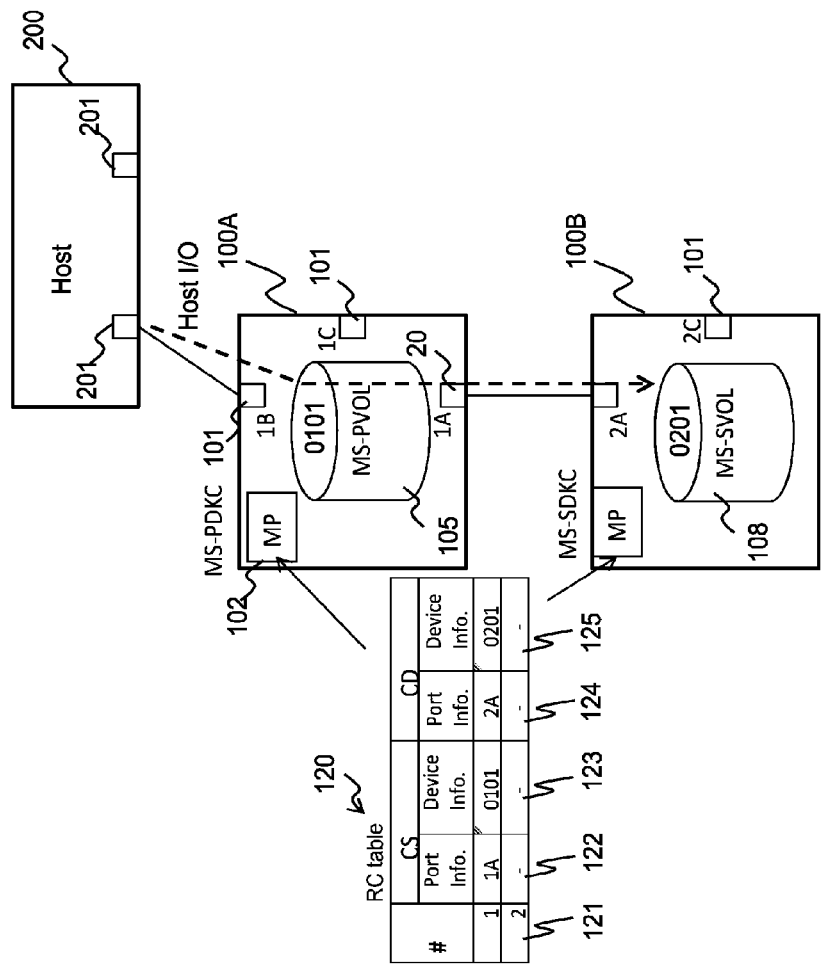
FIG. 3 is a diagram showing an example of a state of the computer system that is obtained prior to the start of migration.

FIG. 3 is a diagram showing an example of a state of the computer system that is obtained prior to the start of migration. Note in this diagram that a copy source is described as "CS" and a copy destination as "CD."

The computer system prior to the start of a migration has a host 200, an MS-PDKC 100A, and an MS-SDKC 100B.

The MS-PDKC 100A has ports 101 that have "1A," "1B," and "1C" as previously configured port information items (referred to as "ports 1A, 1B, 1C" hereinafter. The other ports are described in the same manner). The MS-SDKC 100B has ports 2A, 2B, and 2C. The MS-PDKC 100A is coupled to the host 200 via the port 1B. The port 1A of the MS-PDKC 100A and the port 2A of the MS-SDKC 100B are coupled to each other.

The MS-PDKC 100A manages the PVOL 105 of which device information is "0101." The MS-SDKC 100B manages the SVOL 108 that is a copy destination of the PVOL 105 and of which device information is "0201." Remote copying for copying the PVOL 105 to the SVOL 108 is performed in the computer system. Note that this remote copying is the synchronous remote copying.

A remote copy table (RC table) 120 is stored in each of the MPPKs 102 of the MS-PDKC 100A and MS-SDKC 100B.

With respect to each remote copy operation, the RC table 120 stores entry having the fields of: number (#) 121, copy-source port information 122, copy-source device information 123, copy-destination port information 124, and copy-destination device information 125.

A remote copy number for identifying a remote copy operation is stored in the number 121. Identification information (port information) for identifying a port of a copy-source DKC 100 is stored in the copy-source port information 122. Identification information (device information) for identifying a copy-source device (the PVOL 105, in this case) is stored in the copy-source device information 123. Identification information (port information) for identifying a port of a copy-destination DKC 100 is stored in the copy-destination port information 124. Identification information (device information) for identifying a copy-destination device (the SVOL 108, in this case) is stored in the copy-destination device information 125.

The RC table 120 shown in FIG. 3 stores information of remote copy in which a device 0101 of the port 1A is the copy source and a device 0201 of the port 2A is the copy destination.

Thus, in the computer system obtained prior to the start of data migration, when the MS-PDKC 100A receives a write request concerning the PVOL 105 from the host 200, a write request for writing write target data corresponding to the write request is transmitted from the port 1A to the port 2A of the MS-SDKC 100B, whereby the write target data is copied to the SVOL 108 of the MS-SDKC 100B.

Figure 4:
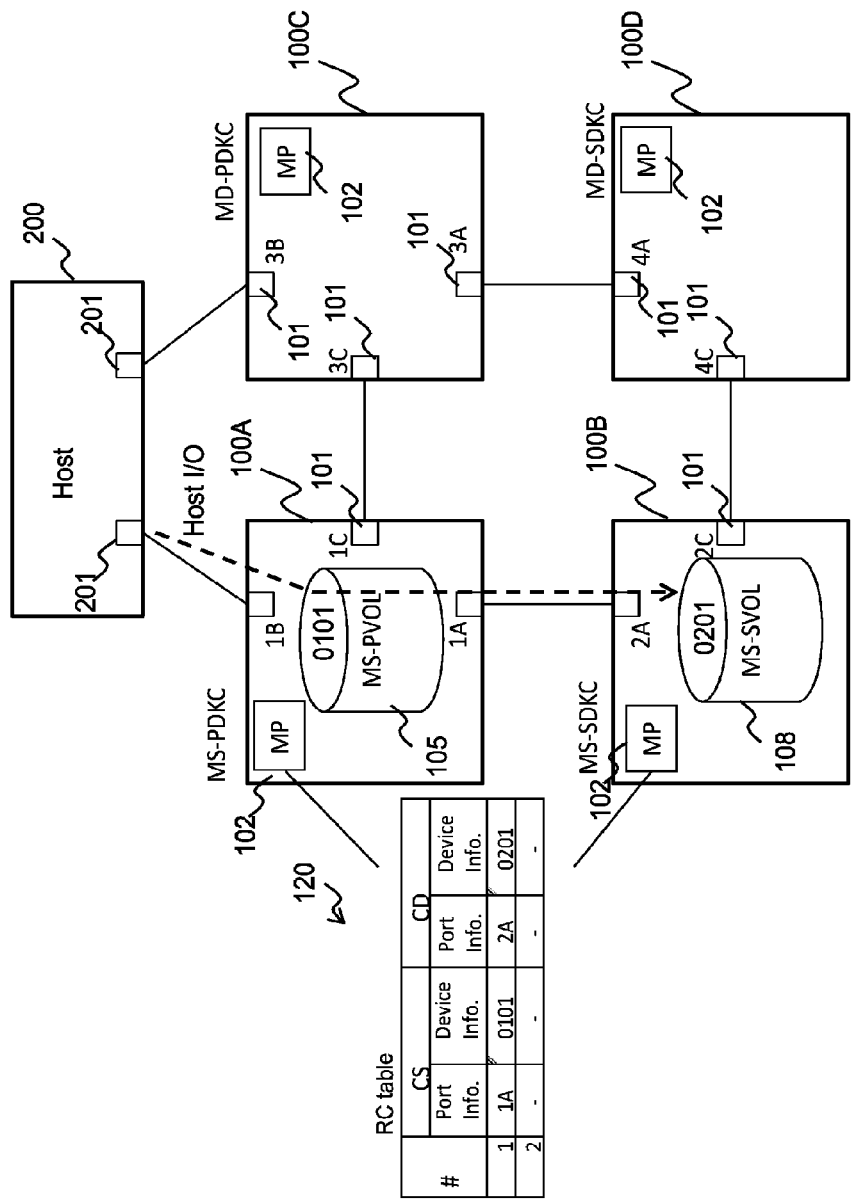
FIG. 4 is a diagram illustrating an introduction of an MD-DKC to the computer system.

FIG. 4 is a diagram illustrating an introduction of an MD-DKC to the computer system.

In the computer system shown in FIG. 3, for example, an administrator installs the MD-PDKC 100C (DKC 100C), to which the PVOL 105 is migrated, in the local site 10 to which, for example, the MS-PDKC 100A belongs, and installs the MD-SDKC 100D (DKC 100D), to which the SVOL 108 is migrated, in the remote site 20 to which, for example, the MS-SDKC 100B belongs. The MD-PDKC 100C comprises a port 3A, a port 3B, and a port 3C. The MD-SDKC 100D comprises a port 4A and a port 4B.

The administrator then couples the port 3B of the MD-PDKC 100C to the port 201 of the host 200 via the network 50. The administrator also couples the port 3C of the MD-PDKC 100C to the port 1C of the MS-PDKC 100A via a cable or a network. The administrator further couples the port 3A of the MD-PDKC 100C to the port 4A of the MD-SDKC 100D via the network 60. The administrator further couples the port 4C of the MD-SDKC 100D to the port 2C of the MS-SDKC 100B via a cable or a network.

Figure 5:
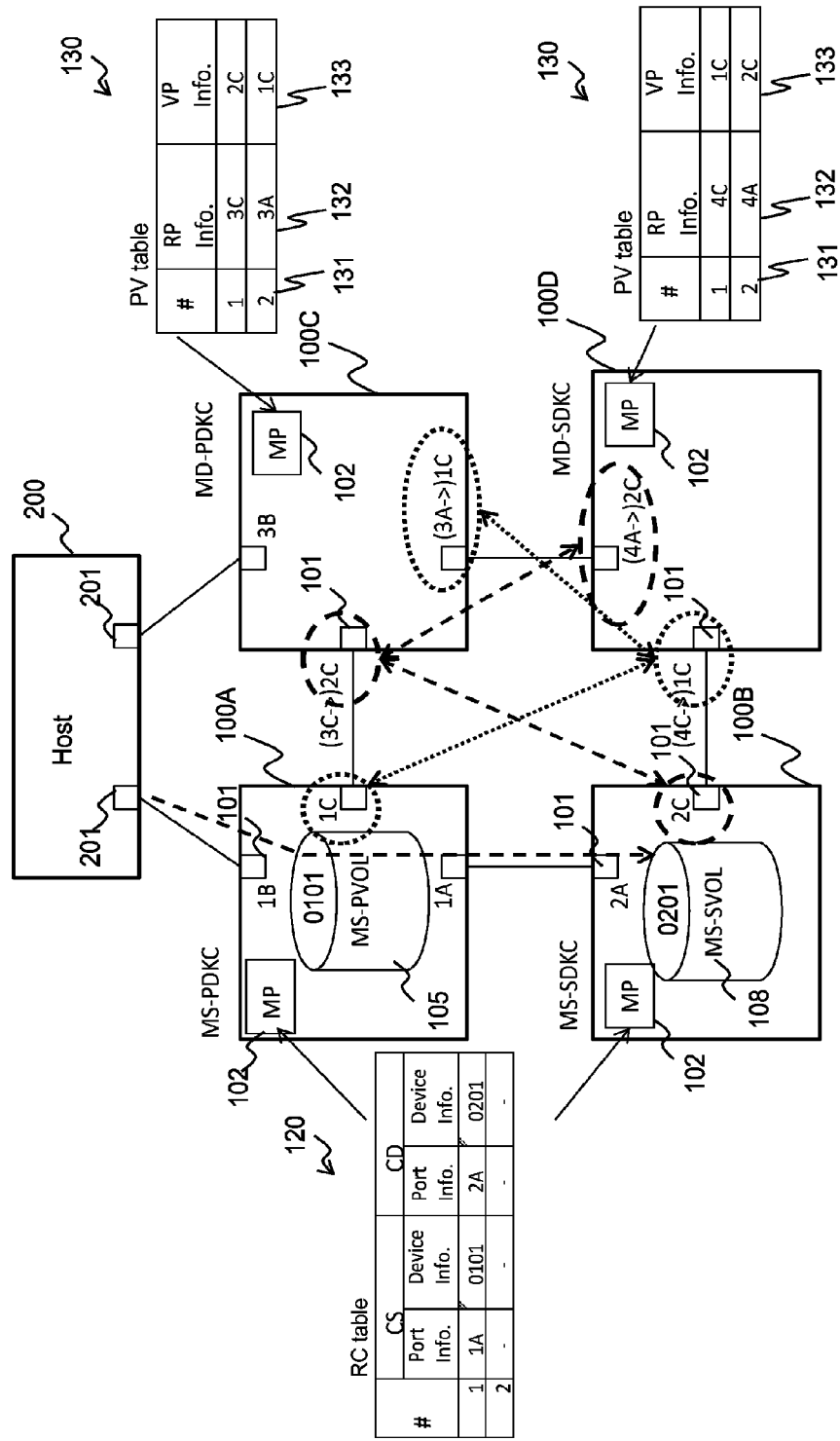
FIG. 5 is a diagram illustrating a virtualization of a port in the MD-DKC.

FIG. 5 is a diagram illustrating a virtualization of a port in the MD-DKC.

Identification information for uniquely specifying each ports 101 (port information, such as WWN) is configured in each of the ports 101 corresponding to the MD-PDKC 100C and the MD-SDKC 100D. Suppose here that previously configured port information is actual port information. In the present example, virtual port information (virtualized port information) (VP information) different from the actual port information (RP information) can be allocated to each of the ports 101 of the MD-PDKC 100C and the MD-SDKC 100D, so that communication can be made by using the virtualized port information. For the purpose of managing the virtualized port information, a port virtual information management table (PV table) 130 for managing the virtualized port information of the ports 101 is stored in each of the MPPKs 102 of the MD-PDKC 100C and the MD-SDKC 100D.

With respect to each port, the port virtual information management table 130 stores entry having the fields of: item number 131, actual port information 132, and virtualized port information 133.

Entry number is stored in the item number 131. Actual port information on the port corresponding to the entry is stored in the actual port information 132. Virtualized port information allocated to the port corresponding to the entry is stored in the virtualized port information 133.

In the present example, subsequent to the state of the computer system shown in FIG. 4, the actual port information of the port 2C of the MS-SDKC 100B is allocated as the virtualized port information of the port 3C of the MD-PDKC 100C, and the actual port information of the port 1C of the MS-PDKC 100A is allocated as the virtualized port information of the port 3A. As the virtualized port information of the port 4C of the MD-SDKC 100D, actual port information "1C" of the port 1C of the MS-PDKC 100A is allocated. As the virtualized port information of the port 4A, actual port information "2C" of the port 2C of the MS-SDKC 100B is allocated. Specifically, in the port virtual information management table 130 of the MD-PDKC 100C, the actual port information "2C" of the port 2C of the MS-SDKC 100B is stored in the virtualized port information 133 that corresponds to the port 3C of the MD-PDKC 100C, and the actual port information "1C" of the port 1C of the MS-PDKC 100A is stored in the virtualized port information 133 that corresponds to the port 3A. Furthermore, in the port virtual information management table 130 of the MD-SDKC 100D, the actual port information "2C" of the MS-SDKC 100B is stored in the virtualized port information 133 that corresponds to the port 4A of the MD-SDKC 100D, and the actual port information "1C" of the MS-PDKC 100A is stored in the virtualized port information 133 that corresponds to the port 4C.

When configuring the port virtual information management tables 130 of the MD-PDKC 100C and the MD-SDKC 100D as described above, the administrator may configure the port virtual information management tables 130 by using a terminal such as a service processor (SVP) coupled to the MD-PDKC 100C or MD-SDKC 100D or a management apparatus coupled to the same via a network. The processors of the MPPKs 102 of the MD-PDKC 100C and the MD-SDKC 100D may configure the tables by collecting various information items and determining based on the various information items. Note that the term "administrator" is often used as the subject of a sentence describing the operations, configurations and the like provided by the administrator using the terminal such as the SVP.

Since the MD-PDKC 100C uses the allocated virtualized port information items to communicate with the MS-PDKC 100A, the MS-PDKC 100A recognizes the MD-PDKC 100C as the MS-SDKC 100B. Moreover, since the MD-SDKC 100D uses the allocated virtualized port information items to communicate with the MS-SDKC 100B, the MS-SDKC 100B recognizes the MD-SDKC 100D as the MS-PDKC 100A. Thus, it is unnecessary for the MS-PDKC 100A and the MS-SDKC 100B to understand the MD-PDKC 100C and the MD-SDKC 100D, and no new functions need to be added to the MS-PDKC 100A and the MS-SDKC 100B.

Figure 6:
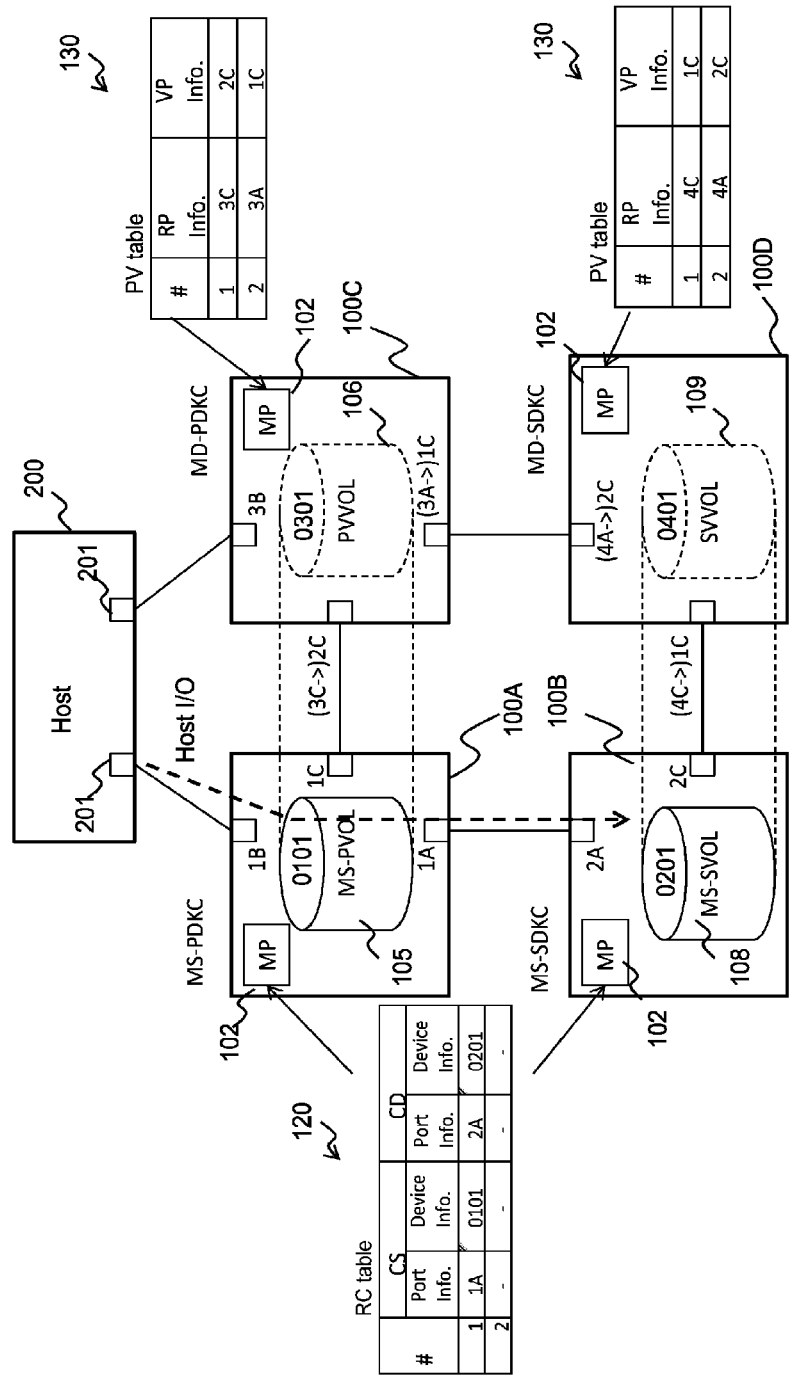
FIG. 6 is a diagram illustrating a creation of a VVOL in the MD-DKC.

FIG. 6 is a diagram illustrating a creation of a VVOL in the MD-DKC.

Subsequent to the state of the computer system shown in FIG. 5, the administrator creates a VVOL 106 based on the MS-PVOL 105 in the MD-PDKC 100C, as well as a VVOL 109 based on the MS-SVOL 108 in the MD-SDKC 100D. It should be noted that the use of the storage virtualization technology can realize the function of creating the VVOL based on an RVOL of the MS-PDKC 100A (MS-SDKC 100B) in the MD-PDKC 100C (MD-SDKC 100D). Here, unique device information (actual device information) is configured to each of the VVOLs 106 and 109. In the present example, device information "0301" is configured to the VVOL 106 and device information "0401" to the VVOL 109.

Figure 7:
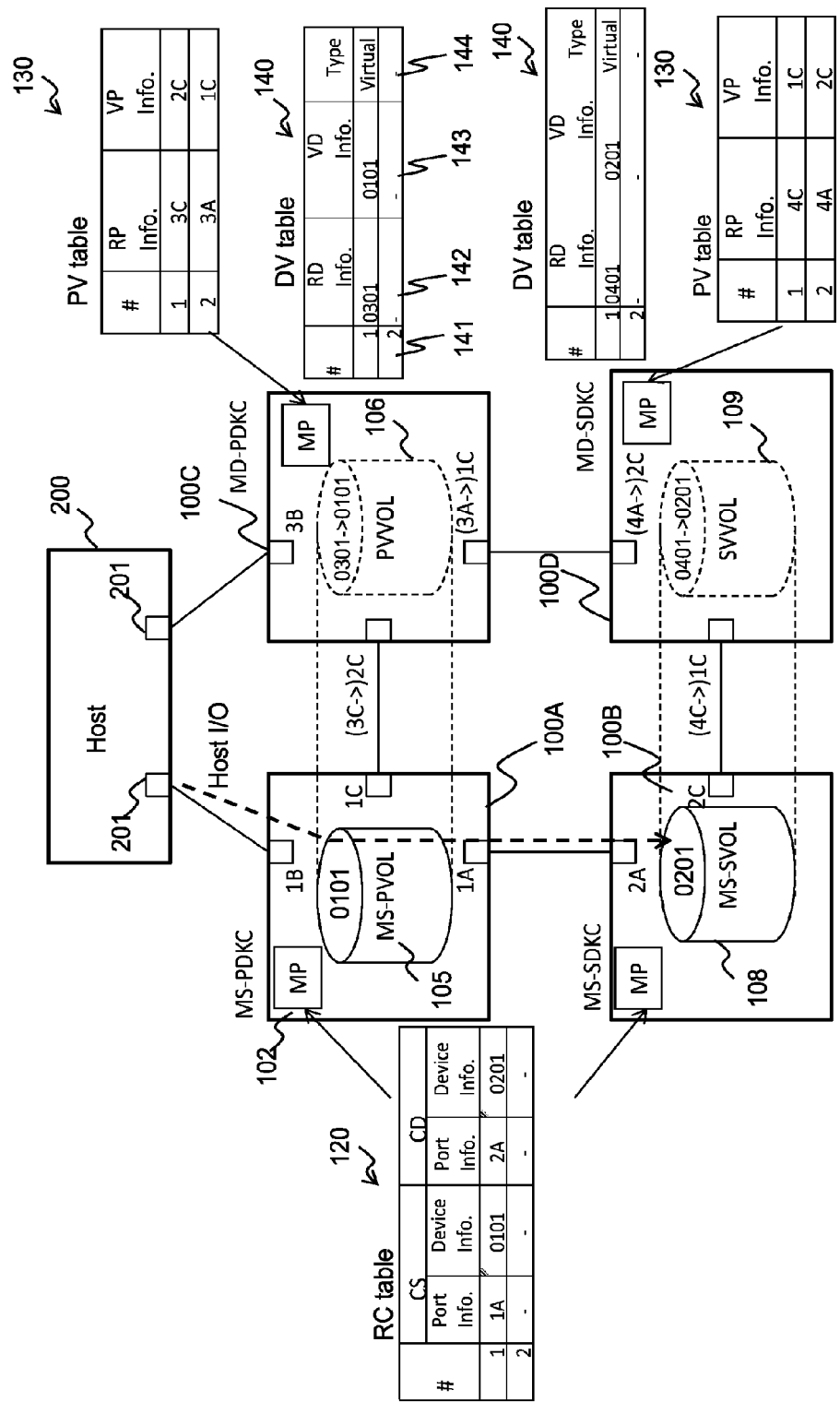
FIG. 7 is a diagram illustrating a virtualization of the VVOL in the MD-DKC.

FIG. 7 is a diagram illustrating a virtualization of the VVOLs in the MD-DKCs.

Virtual device information can be configured to the VVOL 106 and VVOL 109 as their device information items. Thus, the VVOL 106 and VVOL 109 can be used as the devices corresponding to the virtual device information items. The MD-PDKC 100C and the MD-SDKC 100D have device virtual information management tables (DV tables) 140 stored in the memories of their MPPKs 102 in order to manage the virtual device information items of the respective VVOLs.

The device virtual information management table 140 stores entry having the fields of: number (#) 141, actual device information (RD information) 142, virtual device information (VD information) 143, and type 144 with respect to each device.

A number corresponding to the entry is stored in the number 141. Actual device information of a device corresponding to the entry is stored in the actual device information 142. Virtual device information that is configured for the device corresponding to the entry is stored in the virtual device information 143. The type of the device corresponding to the entry is stored in the type 144. In the present example, when the device corresponding to the entry is a VVOL, "virtual" is stored in the type 144.

In the present example, subsequent to the state of the computer system shown in FIG. 6, the actual device information "0101" of the PVOL 105 of the MS-PDKC 100A is configured as the virtual device information of the VVOL 106 that is created in the MD-PDKC 100C, and the actual device information "0201" of the SVOL 108 of the MS-SDKC 100B is configured as the virtual device information of the VVOL 109 that is created in the MD-SDKC 100D. Specifically, according to an indication from the management apparatus, the MD-PDKC 100C adds an entry to the device virtual information management table 140 thereof, to store actual device information "0301" of the virtual device 106 in the actual device information 142, the actual device information "0101" of the PVOL 105 in the virtual device information 143, and "virtual" in the type 144. In addition, according to the indication from the management apparatus, the MD-SDKC 100D adds an entry to the device virtual information management table 140 thereof, to store actual device information "0401" of the virtual device 109 in the actual device information 142, the actual device information "0201" of the SVOL 108 in the virtual device information 143, and "virtual" in the type 144.

Since the device information of the VVOL 106 can be treated as the actual device information "0101" of the PVOL 105, an access request related to the PVOL 105 can be treated as an access request related to the VVOL 106. Furthermore, since the device information of the VVOL 109 can be treated as the actual device information "0201" of the SVOL 108, an access request related to the SVOL 108 can be treated as an access request related to the VVOL 109.

Figure 8:
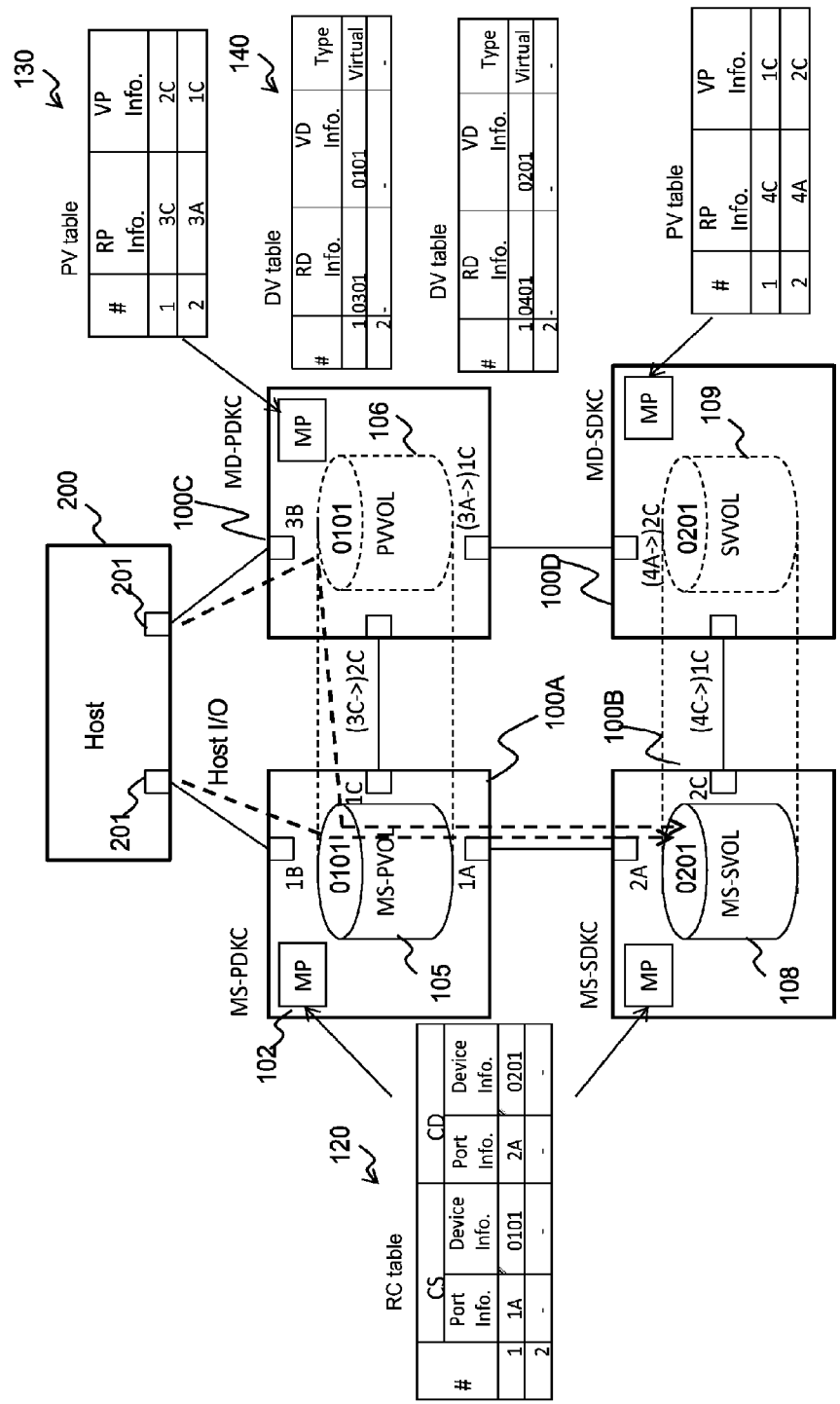
FIG. 8 is a diagram illustrating an addition of a path to the MD-DKC in a host.

FIG. 8 is a diagram illustrating an addition of a path to the MD-DKC in the host.

Subsequent to the state of the computer system shown in FIG. 7, the administrator adds a path through which the host 200 accesses a device (VOL) corresponding to the device information "0101" (an access path). Specifically, a path from the port 201 of the host 200 to the port 3B of the MD-PDKC 100C is added as the path to access the device corresponding to the device information "0101." As a result, the host 200 recognizes that the access path for accessing the device corresponding to the device information "0101" (essentially, the PVOL 105) includes a path passing through the port 1B of the MS-PDKC 100A (a first path) and a newly added path passing through the port 3B of the MD-PDKC 100C (a second path). When accessing the device corresponding to the device information "0101," the host 200 can select the first path or the second path in, for example, a round-robin fashion.

In the computer system in the state shown in FIG. 8, when the host 200 selects the first path to transmit a write request concerning the device information "0101," the MS-PDKC 100A receives the write request via the port 1B thereof. The MS-PDKC 100A saves write target data corresponding to the write request in the CM thereof and, in accordance with the contents of the RC table 120, transmits to the MS-SDKC 100B a write request for remote-copying the write target data to the device information "0201" of the port 2A. The MS-SDKC 100B then receives the write request via the port 2A thereof, writes the write target data corresponding to the write request to the SVOL 108, which is the device corresponding to the device information "0201," and returns a response to the MS-PDKC 100A. Upon receiving the normal response from the MS-SDKC 100B, the MS-PDKC 100A stores the write target data saved in the CM in the PVOL 105, which is the device corresponding to the device information "0101," and returns a response to the host 200.

When the host 200 selects the second path to transmit a write request concerning the device corresponding to the device information "0101," the MD-PDKC 100C receives the write request via the port 3B thereof. The MD-PDKC 100C transfers the write request concerning the device information "0101" to the MS-PDKC 100A by performing a switching operation. The MS-PDKC 100A saves the write target data corresponding to the write request in the CM and, in accordance with the contents of the RC table 120, transmits to the MS-SDKC 100B a write request for remote-copying the write target data to the device information "0201" of the port 2A. The MS-SDKC 100B then receives the write request via the port 2A thereof, writes the write target data corresponding to the write request to the SVOL 108, which is the device corresponding to the device information "0201," and returns a response to the MS-PDKC 100A. Upon receiving the normal response from the MS-SDKC 100B, the MS-PDKC 100A stores the write target data saved in the CM in the PVOL, which is the device corresponding to the device information "0101," and returns a response to the MD-PDKC 100C. The MD-PDKC 100C then returns a response concerning the write request, to the host 200.

In this manner, regardless of the path through which the write request from the host 200 passes, the write target data corresponding to the write request can appropriately be stored in the PVOL 105 and SVOL 108.

Figure 9:
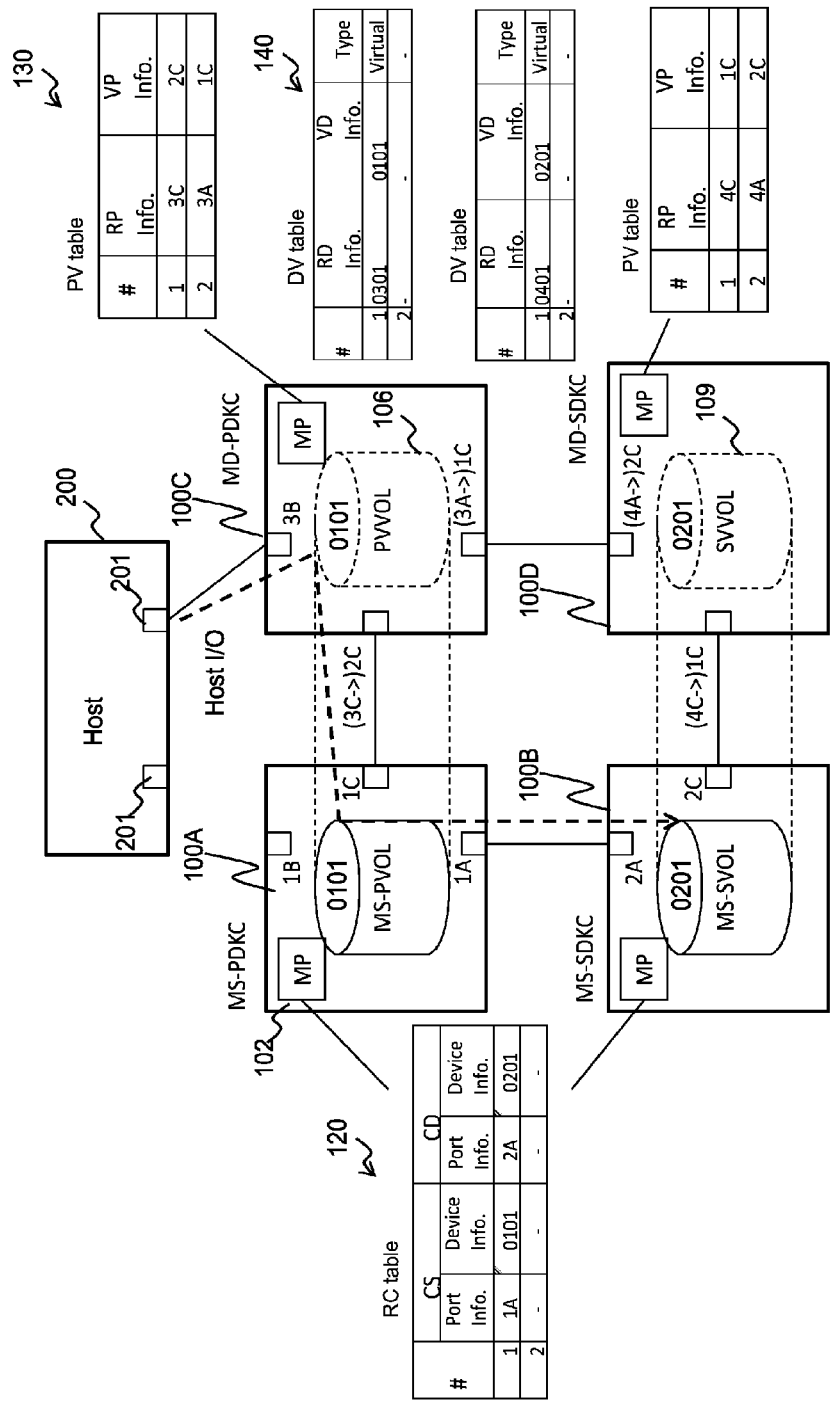
FIG. 9 is a diagram illustrating a deletion of a path to an MS-DKC in the host.

FIG. 9 is a diagram illustrating a deletion of a path to the MS-DKC in the host.

Subsequent to the state of the computer system shown in FIG. 8, the administrator deletes the path passing through the port 1B of the MS-PDKC 100A, through which the host 200 accesses the device corresponding to the device information "0101." As a result of the deletion, access requests for accessing the PVOL 105 can be concentrated on the path passing through the port 3B of the MD-PDKC 100C and transmitted. In other words, all the access requests for accessing the PVOL 105 can be acquired by the MD-PDKC 100C.

Figure 10:
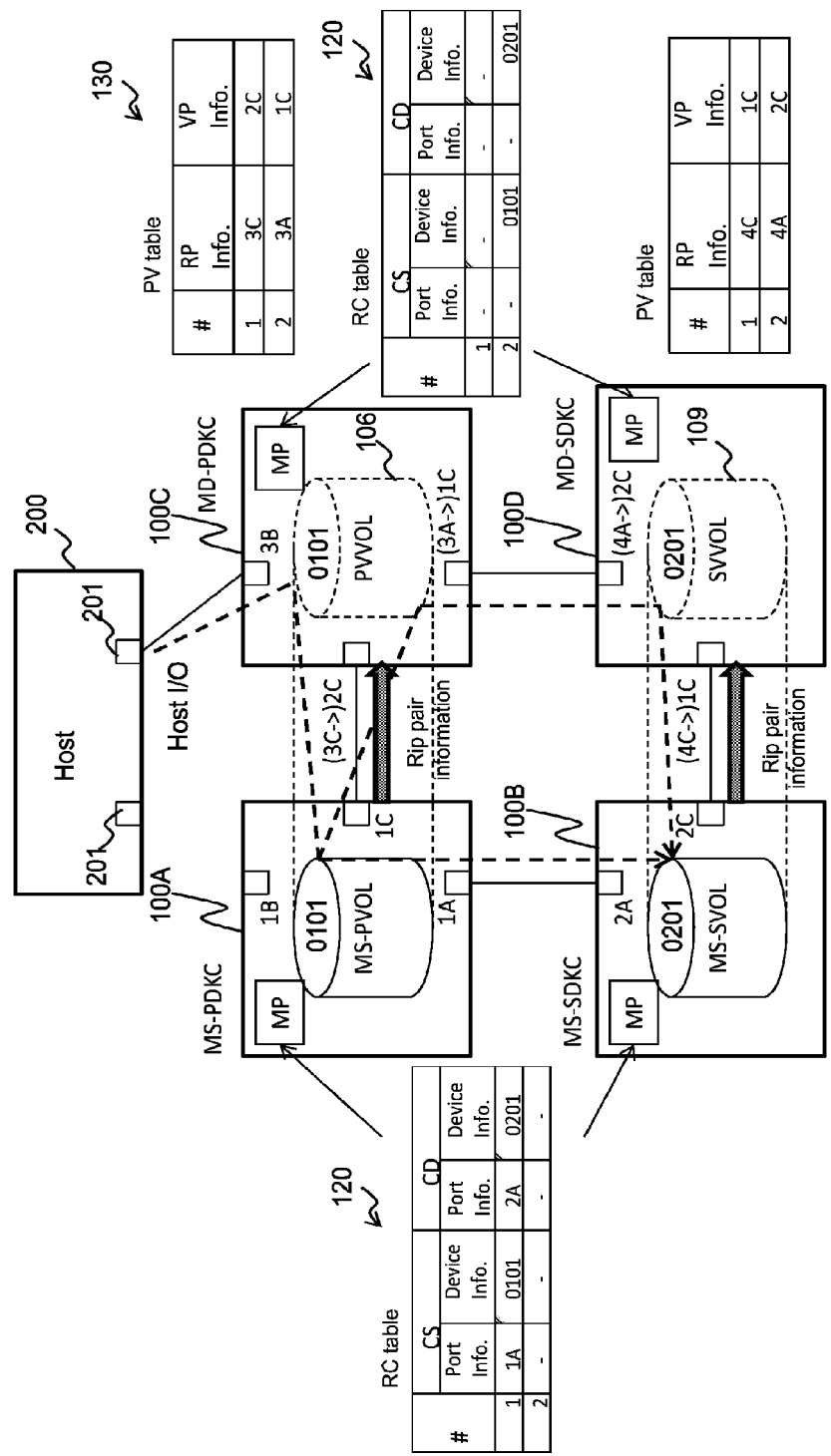
FIG. 10 is a diagram illustrating a read of pair information from the MS-DKC.

FIG. 10 is a diagram illustrating a read of pair information from the MS-DKC.

Subsequent to the state of the computer system shown in FIG. 9, the MD-PDKC 100C and the MD-SDKC 100D rip the information items of the entries (copy pair information items) stored in the RC tables 120, from the MS-PDKC 100A and the MS-SDKC 100B, and then register these copy pair information items in the RC tables 120 of the MPPKs 102 of the MD-PDKC 100C and the MD-SDKC 100D. Here, the MD-PDKC 100C and the MD-SDKC 100D store the device information "0101" of the PVOL 105 in the copy-source device information 123 and the device information "0201" of the SVOL 106 in the copy-destination device information 125 of the RC tables 120 thereof.

Figure 11:
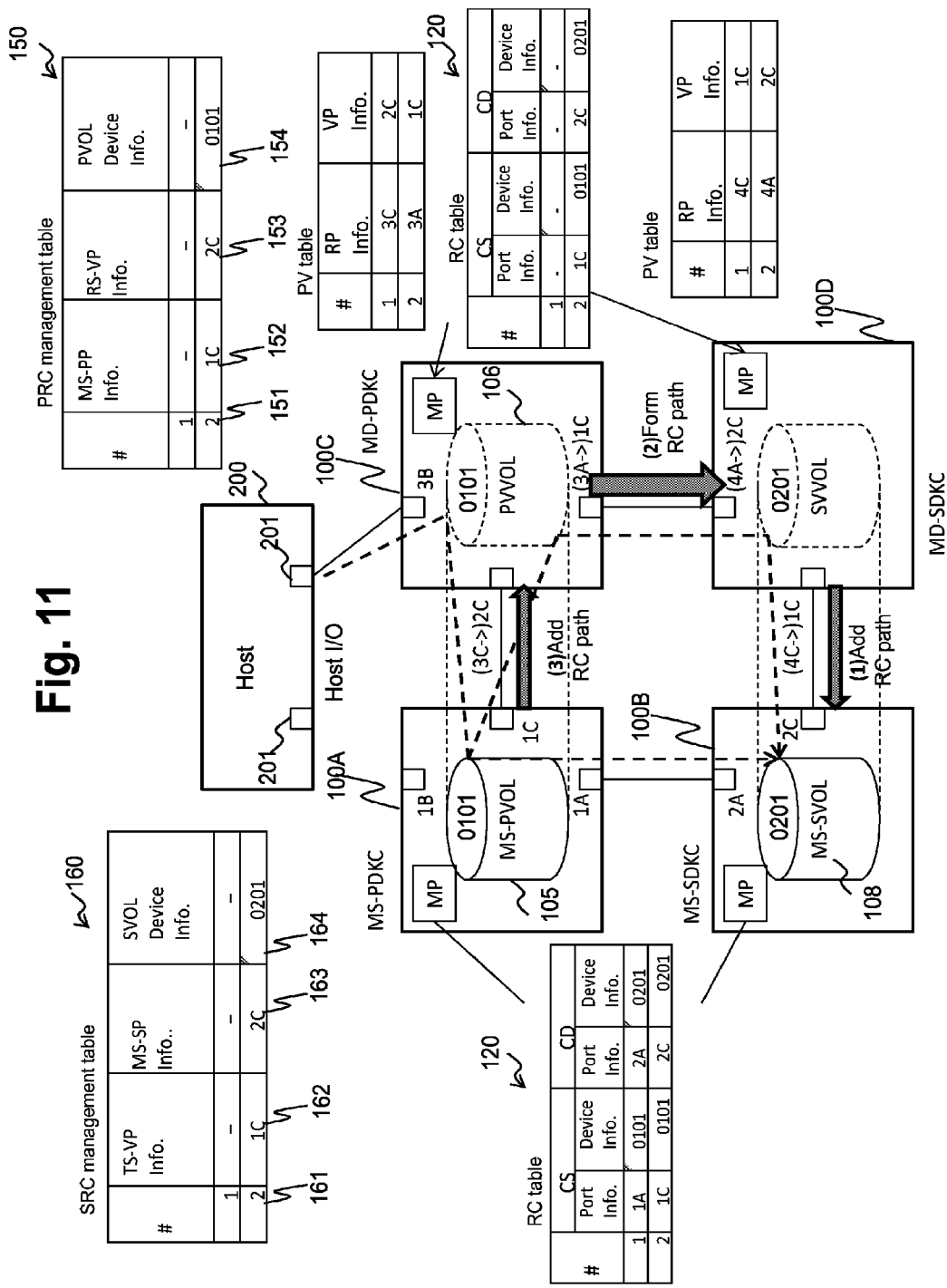
FIG. 11 is a diagram illustrating an addition of an RC path.

FIG. 11 is a diagram illustrating an addition of an RC path.

Subsequent to the state of the computer system shown in FIG. 10, the administrator adds a new remote copy path (RC path) passing through the MD-PDKC 100C and MD-SDKC 100D.

Here, for the purpose of managing the new RC path, the MD-PDKC 100C stores a primary remote copy management table (PRC management table) 150 in the MPPK 102 thereof, while the MD-SDKC 100D stores a secondary remote copy management table (SRC management table) 160 in the MPPK 102 thereof.

The PRC management table 150 stores entry having the fields of: number (#) 151, migration-source primary port (MS-PP) information 152, reception-source virtual port (RS-VP) information 153, and PVOL device information 154 with respect to each remote copy operation, A number corresponding to a remote copy operation is stored in the number 151. Port information of a port of the MS-PDKC 100A to which a remote copy write request is transmitted is stored in the MS-PP information 152. Virtualized port information of a port of the MD-PDKC 100C that receives the remote copy write request is stored in the transfer data reception-source virtualized port information 153. Device information of the PVOL related to the remote copy operation is stored in the PVOL device information 154. When there is no RC path passing through the MD-PDKC 100C and MD-SDKC 100D at the time of remote copying, for example, "-" is stored in the MS-PP information 152, the transfer data reception-source virtualized port information 153, and the PVOL device information 154.

The SRC management table 160 stores entry having the fields of: number (#) 161, transmission-source virtual port (TS-VP) information 162, migration-source secondary port (MS-SP) information 163, and SVOL device information 164 with respect to each remote copy operation. A number corresponding to a remote copy operation is stored in the number 161. Virtualized port information of a port of the MD-SDKC 100D to which a remote copy write request is transmitted is stored in the transmission-source virtualized port information 162. Port information of a port of the MS-SDKC 100B to which the remote copy write request is transmitted is stored in the MS-SP information 163. Device information of the SVOL related to the remote copy operation is stored in the SVOL device information 164.

Next, a process of adding a new RC path passing through the MD-PDKC 100C and MD-SDKC 100D is described in detail.

The MD-SDKC 100D transmits to the MS-SDKC 100B a path addition request for adding a remote copy path passing from the MD-SDKC 100D to the MS-SDKC 100B (FIG. 11(1)). The path addition request contains the contents showing the virtualized port information "1C" of the port 4C of the MD-SDKC 100D as the copy source and the port 2C of the MS-SDKC 100B as the copy destination. Upon receiving the path addition request, in empty entry of the RC table 120 (the entry of the second row in this case) of the MS-SDKC 100B, the MS-SDKC 100B stores the virtualized port information of the port 4C of the MD-SDKC 100D ("1C") in the copy-source port information 122, the device information "0101" of the PVOL 105 in the copy-source device information 123, the port information "2C" of the port 2C of the MS-SDKC 1006 in the copy-destination port information 124, and the device information "0201" of the SVOL in the copy-destination device information 125. For the entry in the SRC management table 160 regarding the number of the added RC copy, the MD-SDKC 100D stores the virtualized port information "1C" of the port 4C of the MD-SDKC 100D in the transfer data transmission-source virtualized port information 162, the port information "2C" of the port 2C of the MS-SDKC 100B in the MS-SP information 163, and the device information "0201" of the SVOL 108 in the SVOL device information 164.

Next, the MD-PDKC 100C forms a remote path between the MD-PDKC 100C and the MD-SDKC 100 (FIG. 11(2)). Specifically, for the entries in the PRC management table 150 regarding the number of the formed RC copy, the MD-PDKC 100C stores the port information "1C" of the port 1C of the MS-PDKC 100A in the MS-PP information 152, the virtualized port information "2C" of the port 3C of the MD-PDKC 100C in the transfer data reception-source virtualized port information 153, and the device information "0101" of the PVOL 105 in the PVOL device information 154. For the entry in the RC table 120 of the MD-SDKC 100D regarding the formed copy path, upon receiving an indication from the MD-PDKC 100C, the MD-SDKC 100D stores the virtualized port information "1C" of the port 3A of the MD-PDKC 100C in the copy-source port information 122 and the virtualized port information "2C" of the port 4A of the MD-SDKC 100D in the copy-destination port information 124.

Subsequently, for the entry in the RC table 120 of the MS-PDKC 100A regarding the added copy path, according to an indication from the administrator, the MS-PDKC 100A stores the port information "1C" of the port 1C of the MS-PDKC 100A in the copy-source port information 122, and the virtualized port information "2C" of the port 3C of the MD-PDKC 100C in the copy-destination port information 124. the MS-PDKC 100A also transmits to the MD-PDKC 100C a path addition request for adding a remote copy path extending from the MS-PDKC 100A to the MD-PDKC 100C (FIG. 11(3)). Upon receiving this path addition request, the MD-PDKC 100C stores the virtualized port information "1A" of the port 3A of the MD-PDKC 100C in the copy-source port information 122, and the virtualized port information "2C" of the port 4A of the MD-SDKC 100D in the copy-destination port information 124, for the entry in the RC table 120 regarding the added copy path.

As the path for remote copying the data from the PVOL 105 to the SVOL 108, a path extending from the MS-PDKC 100A to the MS-SDKC 100B without passing through any of the MD-DKCs, and a path extending from the MS-PDKC 100A to the MS-SDKC 100B via the MD-PDKC 100C and MD-SDKC 100D, are managed. According to the description above, the process of adding an RC path is performed in order of (1), (2), and (3) shown in FIG. 11; however, the steps (1), (2), and (3) may be executed in parallel as long as the step (3) is not executed prior to the steps (1) and (2). This is because when the step (3) is executed first and consequently the formation of the remote path reaching the MS-SDKC 100B cannot be completed, a remote copy write request is issued from the MS-PDKC 100A to the MD-PDKC 100C.

Figure 12:
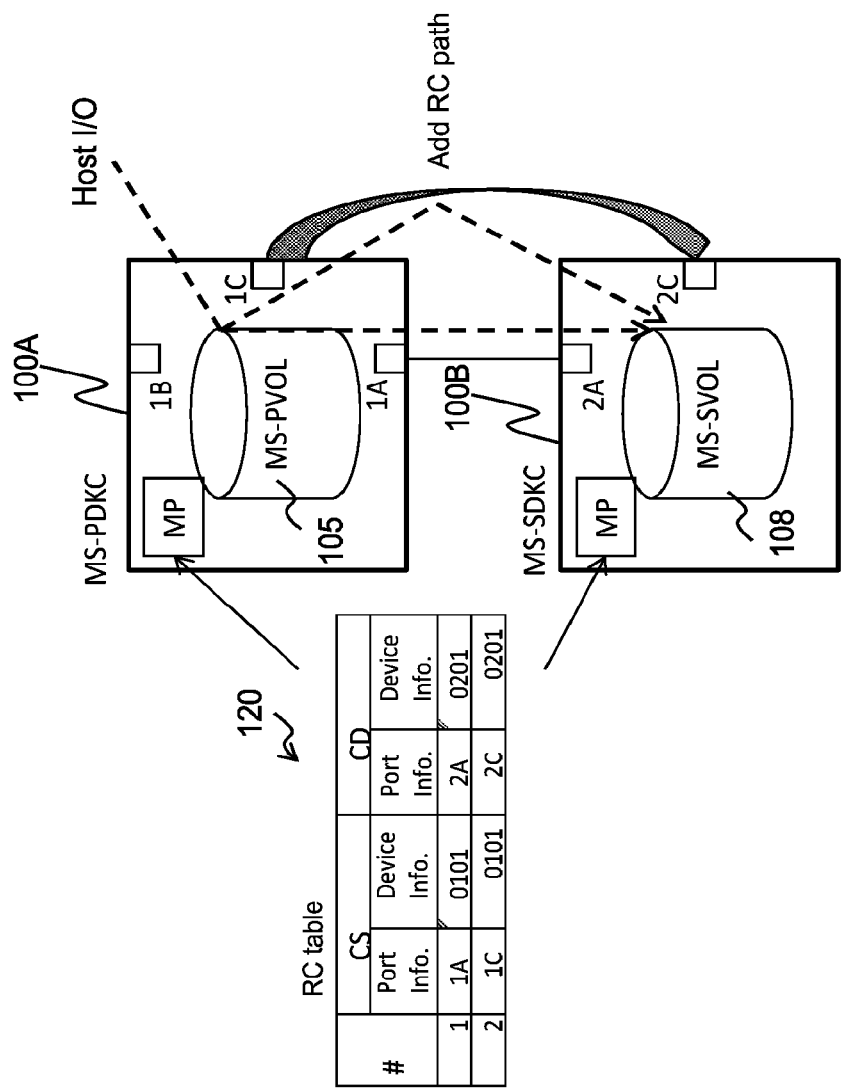
FIG. 12 is a diagram illustrating the RC path viewed from the perspective of the MS-DKC.

FIG. 12 is a diagram illustrating the RC path viewed from the perspective of the MS-DKCs.

In the computer system, two RC paths are managed, as shown in FIG. 11. In the MS-PDKC 100A and the MS-SDKC 100B, because the paths are configured based only on the port information items of the ports of the MS-PDKC 100A and the MS-SDKC 100B, simply these two remote paths therebetween are recognized, as shown in FIG. 12. Therefore, the MS-PDKC 100A and the MS-SDKC 100B cannot recognize the presence of the MD-PDKC 100C and MD-SDKC 100D, or in other words, do not have to recognize the presence of the MD-PDKC 100C and MD-SDKC 100D.

Figure 13:
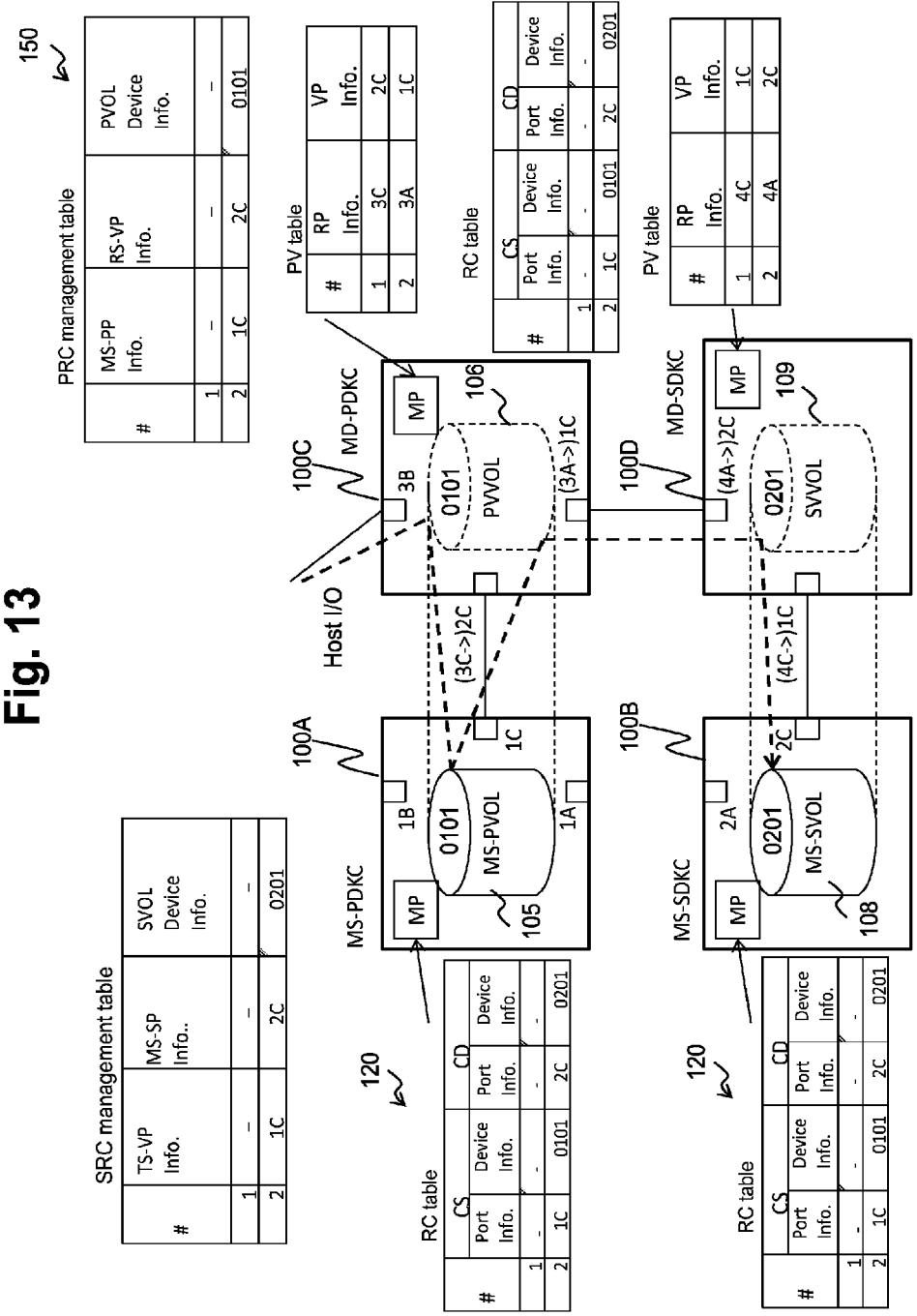
FIG. 13 is a diagram illustrating a deletion of the RC path between MS-DKCs.

FIG. 13 is a diagram illustrating a deletion of the RC path between the MS-DKCs.

Subsequent to the state of the computer system shown in FIG. 11, the administrator deletes the access path that reaches MS-SDKC 100B from the MS-PDKC 100A without passing through the MD-PDKC 100C and MD-SDKC 100D. In other words, for the entry regarding the access path that reaches the MS-SDKC 100B from the MS-PDKC 100A without passing through the MD-PDKC 100C and MD-SDKC 100D, the administrator configures "-" in the copy-source port information 122, the copy-source device information 123, the copy-destination port information 124, and the copy-destination device information 125 of the RC tables 120 of the MS-PDKC 100A and MS-SDKC 100B. As a result, remote copy write requests for remote-copying the data from the PVOL 105 to the SVOL 108 can be concentrated on an access path that extends from the MS-PDKC 100A to the MS-SDKC 100B via the MD-PDKC 100C and MD-SDKC 100D to transmit. In other words, the MD-PDKC 100C can acquire all the remote copy write requests for remote-copying the data from the PVOL 105 to the SVOL 108.

Figure 14:
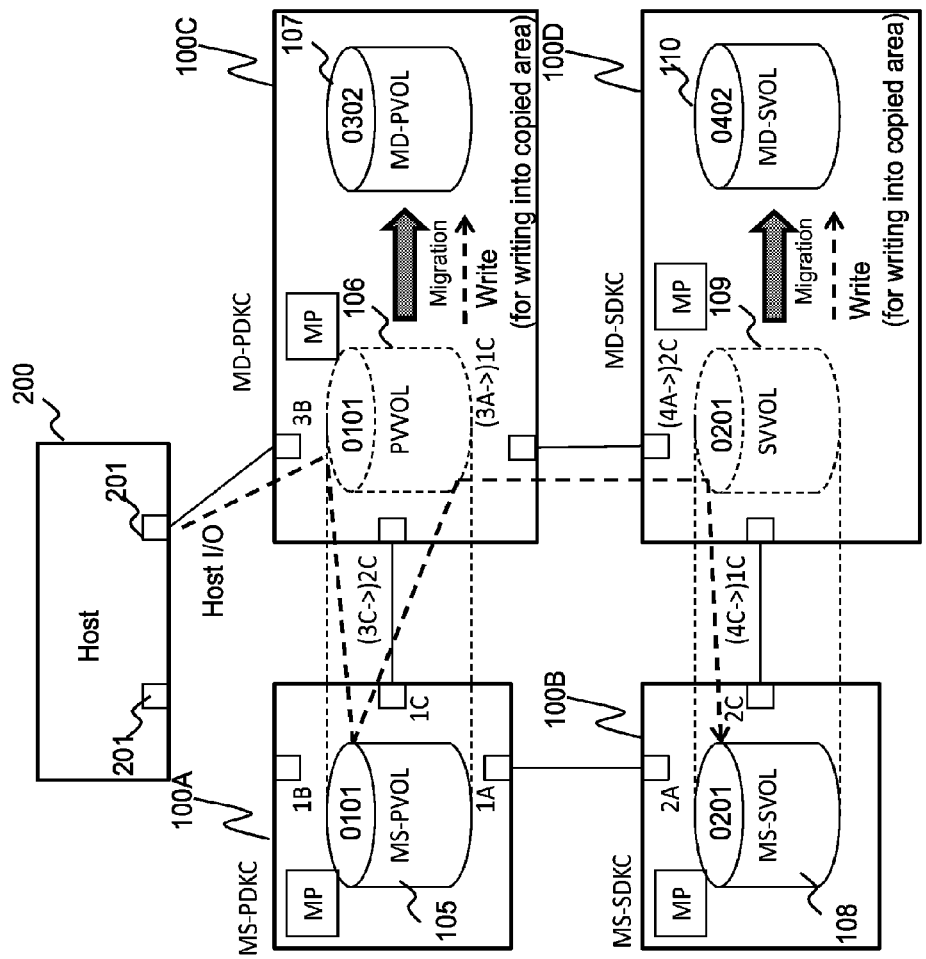
FIG. 14 is a first diagram illustrating a migration of data of an MS-VOL according to Example 1.

FIG. 14 is a first diagram illustrating a migration of data of the MS-VOLs according to Example 1.

For example, subsequent to the state of the computer system shown in FIG. 13, a data migration process of migrating the PVOL 105 of the MS-PDKC 100A to the MD-PVOL 107 of the MD-PDKC 100C and migrating the SVOL 108 of the MS-SDKC 100B to the MD-SVOL 110 of the MD-SDKC 100D is started, as shown in FIG. 14.

In this data migration process, the MD-PDKC 100C migrates the data sequentially to the PVOL 107, starting from the data in a front area of the VVOL 106 based on the MS-PVOL 105, while the MD-SDKC 100D migrates the data sequentially to the SVOL 110, starting from the data in a front area of the VVOL 109 based on the MS-SVOL 108.

When a write request is transmitted from the host 200 to the MD-PDKC 100C in the middle of the data migration process, the MD-PDKC 100C transfers the write request to the MS-PDKC 100A. The MS-PDKC 100A transmits a remote copy write request through the RC path shown in FIG. 13. This can appropriately reflect writing concerning the PVOL 105 in the SVOL 108. Here, when the remote copy write request received from the MS-PDKC 100A is intended for an area in the MD-PVOL 107 to which the data is already copied from the PVOL 105, the MD-PDKC 100C writes the write target data to this area of the MD-PVOL 107. When the remote copy write request received from the MD-PDKC 100C is intended for an area in the MD-SVOL 110 to which the data is already copied from the SVOL 105, the MD-SDKC 100D writes the write target data to this area of the MD-SVOL 110. In this manner, writing to the copied area can appropriately be reflected in the MD-VOLs.

Figure 15:
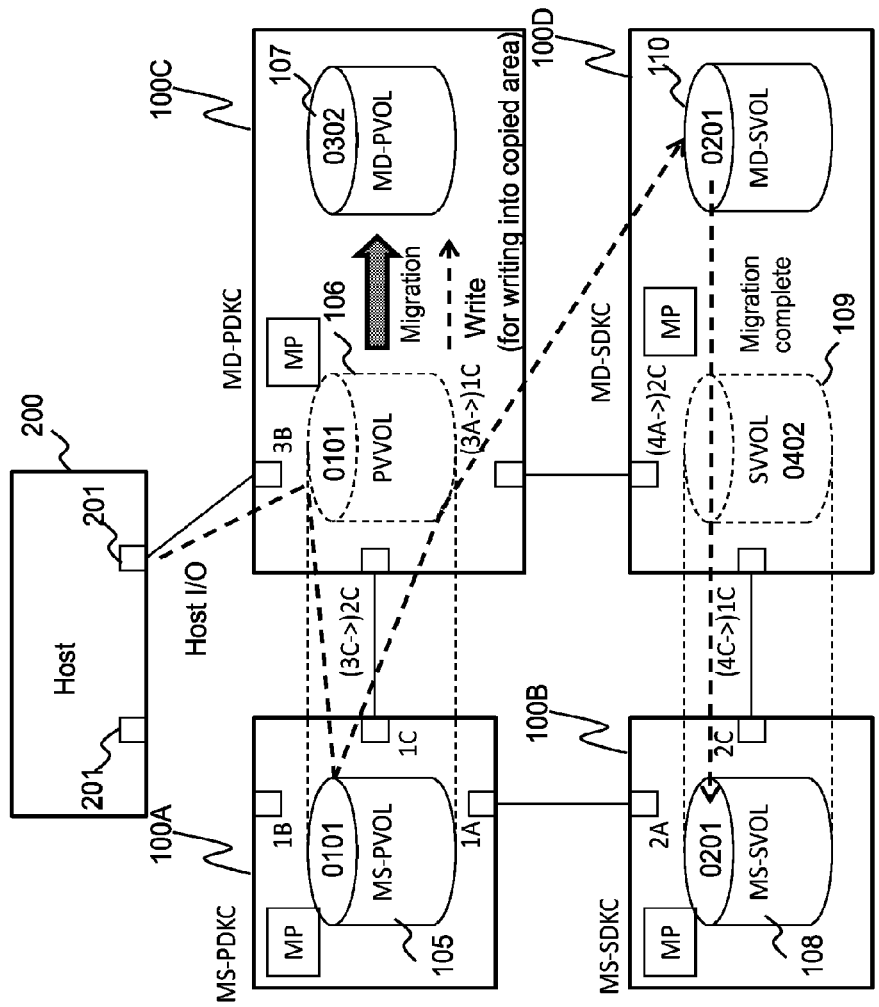
FIG. 15 is a second diagram illustrating a migration of data of the MS-VOL according to Example 1.

FIG. 15 is a second diagram illustrating a migration of data of the MS-VOLs according to Example 1.

FIG. 15 shows a data migration process that is performed when migration of data from the SVOL 108 to the MD-SVOL 110 is ended in the data migration process shown in FIG. 14.

When migration of data from the SVOL 108 to the MD-SVOL 110 is ended, the MD-SDKC 100D switches between the device information of the MD-SVOL 110 and the device information of the VVOL 109 and thereby makes the MD-SVOL 110 be an SVOL for use.

Thereafter, upon receiving the remote copy write request from the MD-PDKC 100C, the MD-SDKC 100D writes the write target data corresponding to the write request to the MD-SVOL 110 and transmits the remote copy write request to the MS-SVOL 108. Upon receiving the write request, the MS-SDKC 100B writes the write target data into the SVOL 108. Here, the write target data is written to the SVOL 108 as well because, when the data migration of the PVOL 105 is not completed, the state of the SVOL 108 needs to conform with that of the PVOL 105 so that the PVOL 105 can appropriately be restored based on the SVOL 108 in case of failure.

Figure 16:
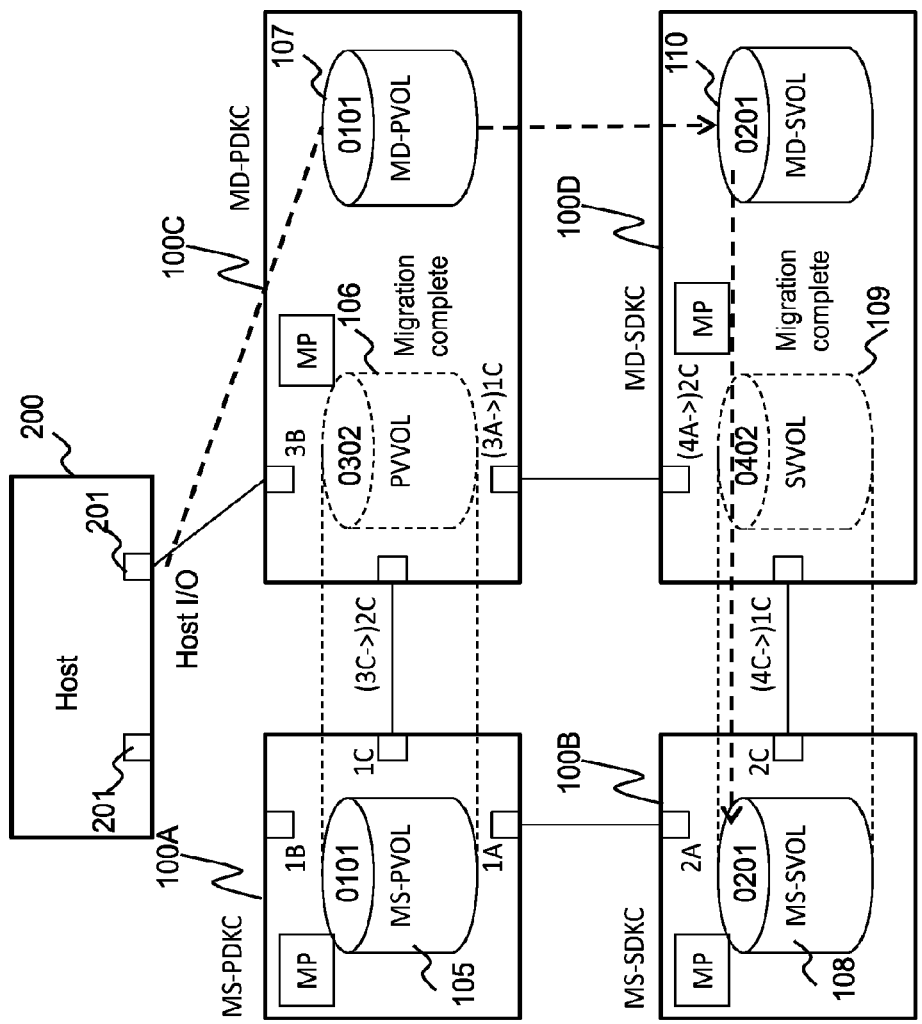
FIG. 16 is a third diagram illustrating a migration of data of the MS-VOL according to Example 1.

FIG. 16 is a third diagram illustrating a migration of data of the MS-VOLs according to Example 1.

FIG. 16 shows a data migration process that is performed immediately after completion of migration of data from the PVOL 105 to the MD-PVOL 107 in the data migration process shown in FIG. 15.

When migration of data from the PVOL 105 to the MD-PVOL 107 is completed, the MD-PDKC 100C switches between the device information of the MD-PVOL 107 and the device information of the VVOL 106 and thereby makes the MD-PVOL 107 be a PVOL for use. This can allow the host 200 to appropriately access the MD-PVOL 107 naturally in the future.

Thereafter, when a write request is transmitted from the host 200 to the MD-PDKC 100C, the MD-PDKC 100C saves the write target data in the CM without transferring the write request to the MS-PDKC 100A. The MD-PDKC 100C then transmits a remote copy write request to the MD-SDKC 100D.

Upon receiving the remote copy write request from the MD-PDKC 100C, the MD-SDKC 100D writes the write target data corresponding to the write request into the MD-SVOL 110, and transmits the remote copy write request to the MS-SVOL 108. Upon receiving the write request, the MS-SDKC 100B writes the write target data into the SVOL 108. Here, the write target data is written into the SVOL 108 as well because, when the data migration of the PVOL 105 is not completed, the state of the SVOL 108 needs to conform with that of the PVOL 105 so that the PVOL 105 can appropriately be restored based on the SVOL 108 in case of failure.

Upon receiving a response from the MS-SDKC 100B regarding the write request, the MD-SDKC 100D returns a response of the write request, to the MD-PDKC 100C. When the response from the MD-SDKC 100D regarding the write request indicates a normal end, the MD-PDKC 100C writes the write target data saved in the CM, to an corresponding area in the MD-PVOL 107, and returns a response regarding the write request, to the host 200.

Figure 17:
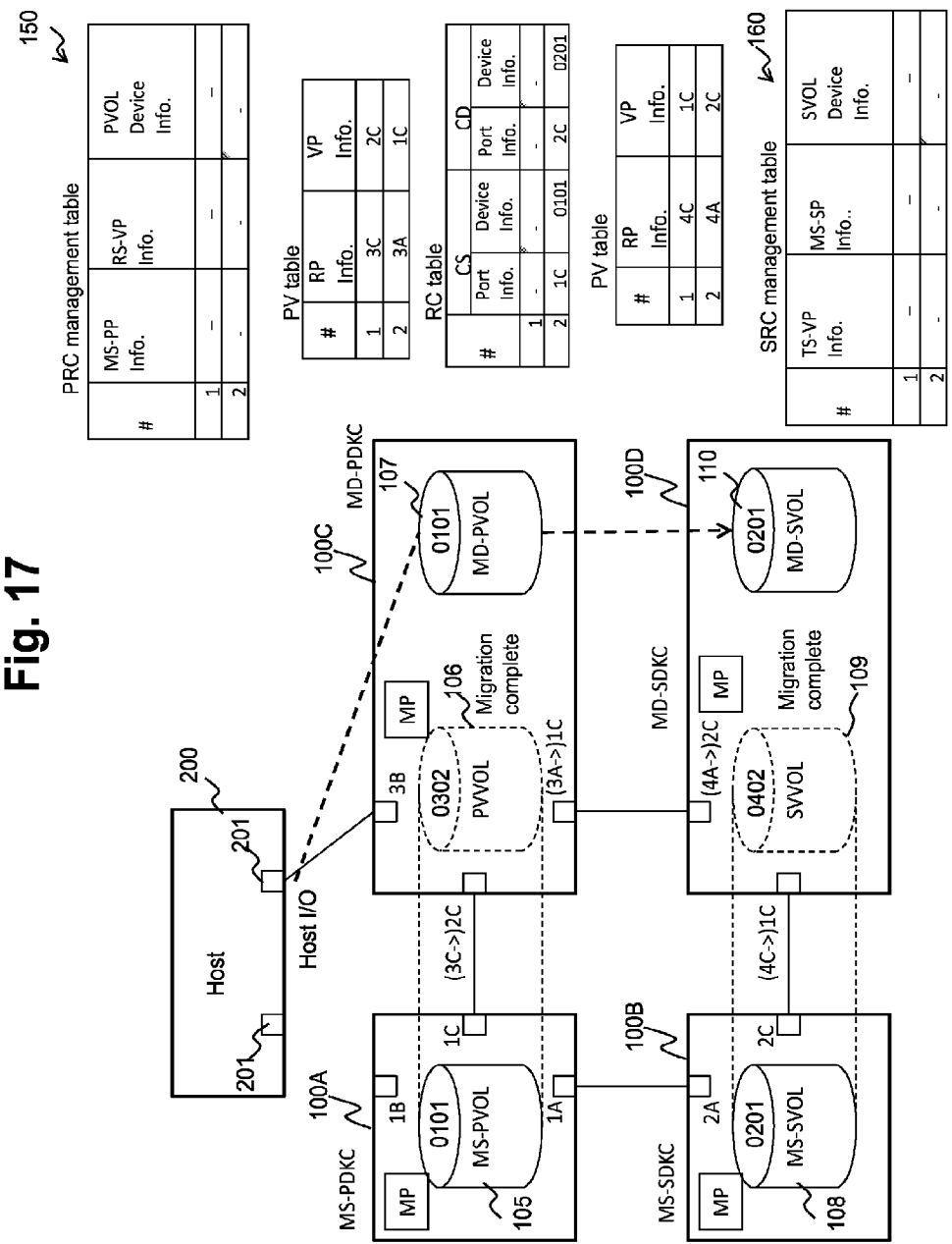
FIG. 17 is a diagram illustrating a stop of remote copying between the MS-DKCs.

FIG. 17 is a diagram illustrating a stop of remote copying between MS-DKCs.

Subsequent to the state shown in FIG. 16, the MD-PDKC 100C and the MD-SDKC 100D stop the remote copying between the MS-DKCs. Specifically, the MD-PDKC 100C deletes the configurations for transferring the remote copy, by configuring "-" in the MS-PP information 152, the transfer data reception-source virtualized port information 153, and the PVOL device information 154 as the entry in the PRC management table 150 concerning the migration-completed PVOL 105. Meantime, the MD-SDKC 100D deletes the configurations for transferring the remote copy, by configuring "-" in the transfer data transmission source virtualized port information 162, the MS-SP information 163, and the SVOL device information 164 as the entry in the SRC management table 160 concerning the migration-completed SVOL 108.

In this manner, upon receiving a remote copy write request from the MD-PDKC 100C, the MD-SDKC 100D is prevented from transmitting a remote copy write request to the MS-SVOL 108.

Figure 18:
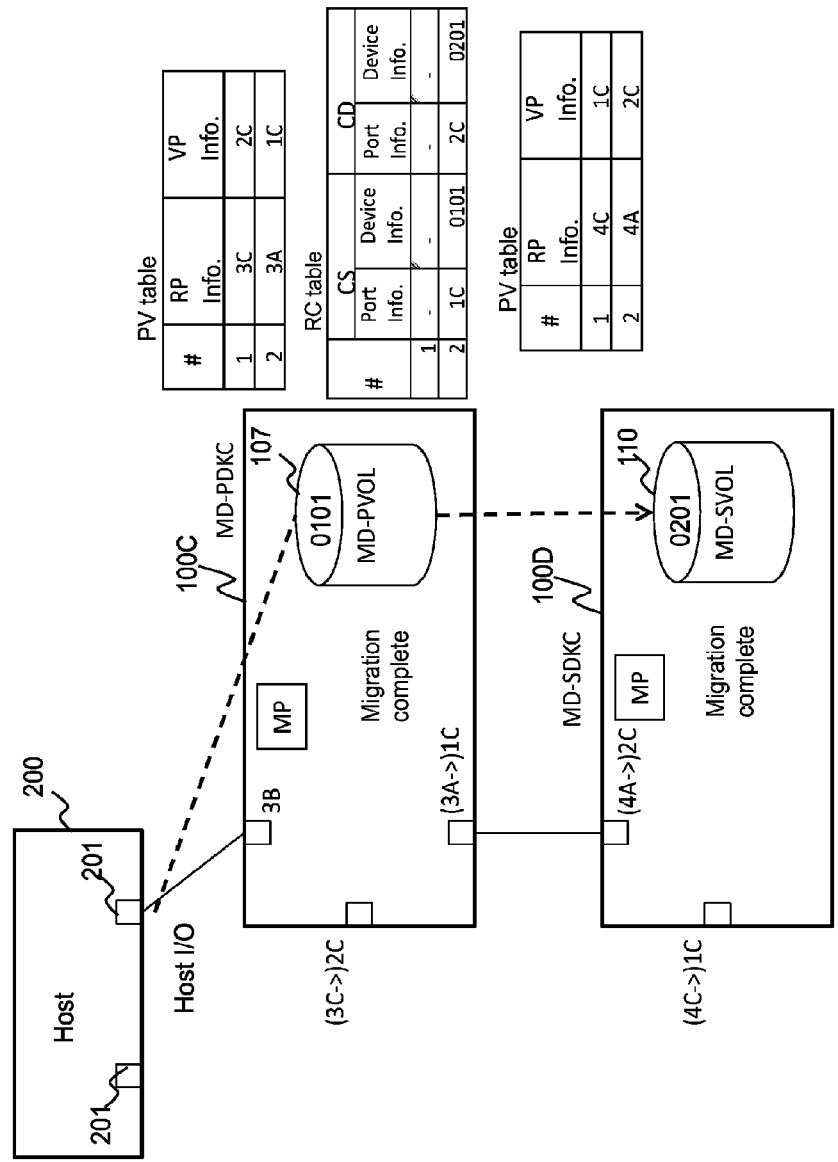
FIG. 18 is a diagram showing an example of a state of the computer system that is obtained after completion of the migration.

FIG. 18 is a diagram showing an example of a state of the computer system that is obtained after completion of the migration.

Subsequent to the state of the computer system shown in FIG. 17, the administrator can remove the MS-PDKC 100A and MS-SDKC 100B from the computer system, as shown in FIG. 18.

The processes that are performed in the present example are described hereinafter.

Figure 19:
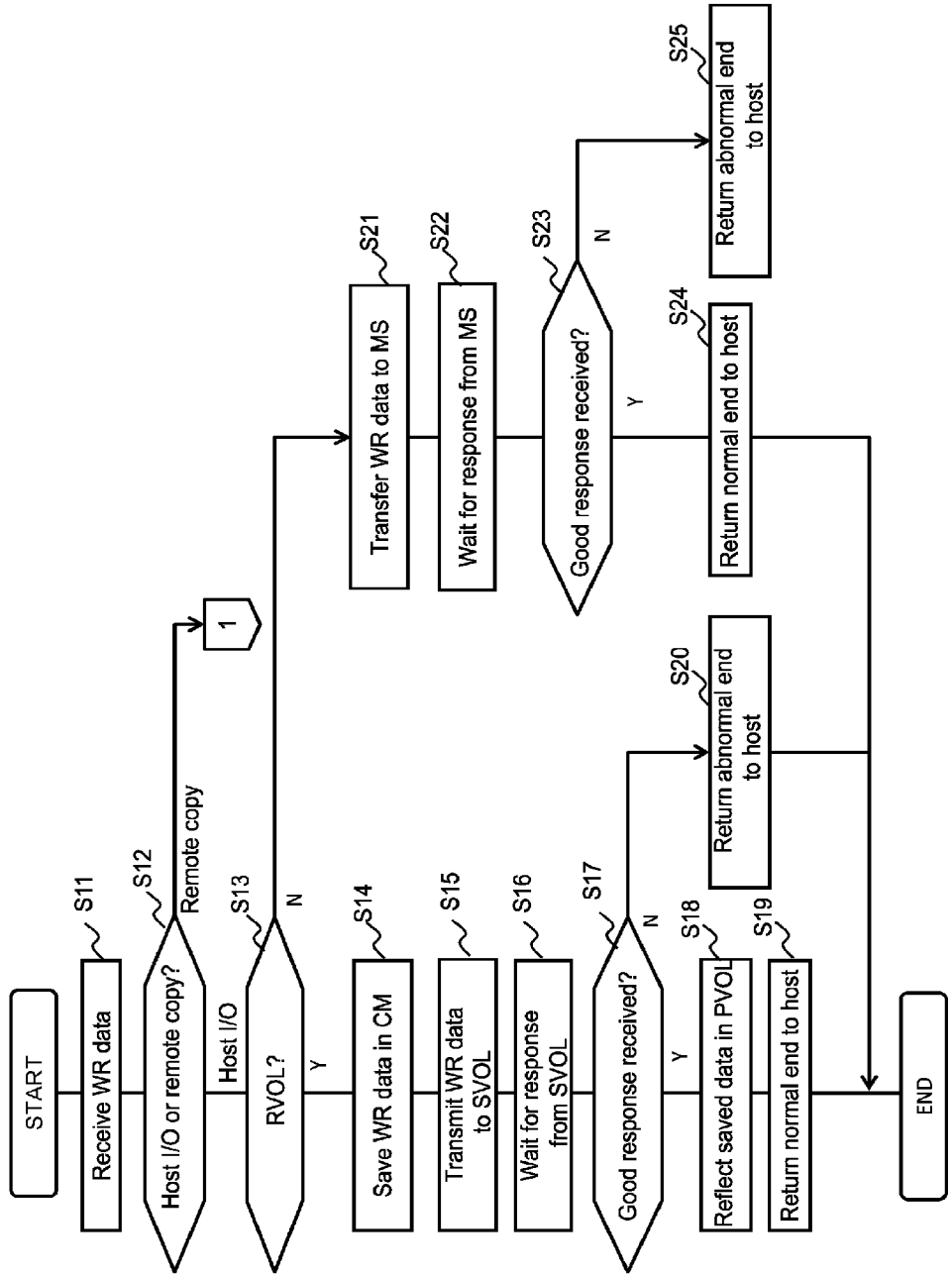
FIG. 19 is a first flowchart showing a write process according to Example 1.
Figure 20:
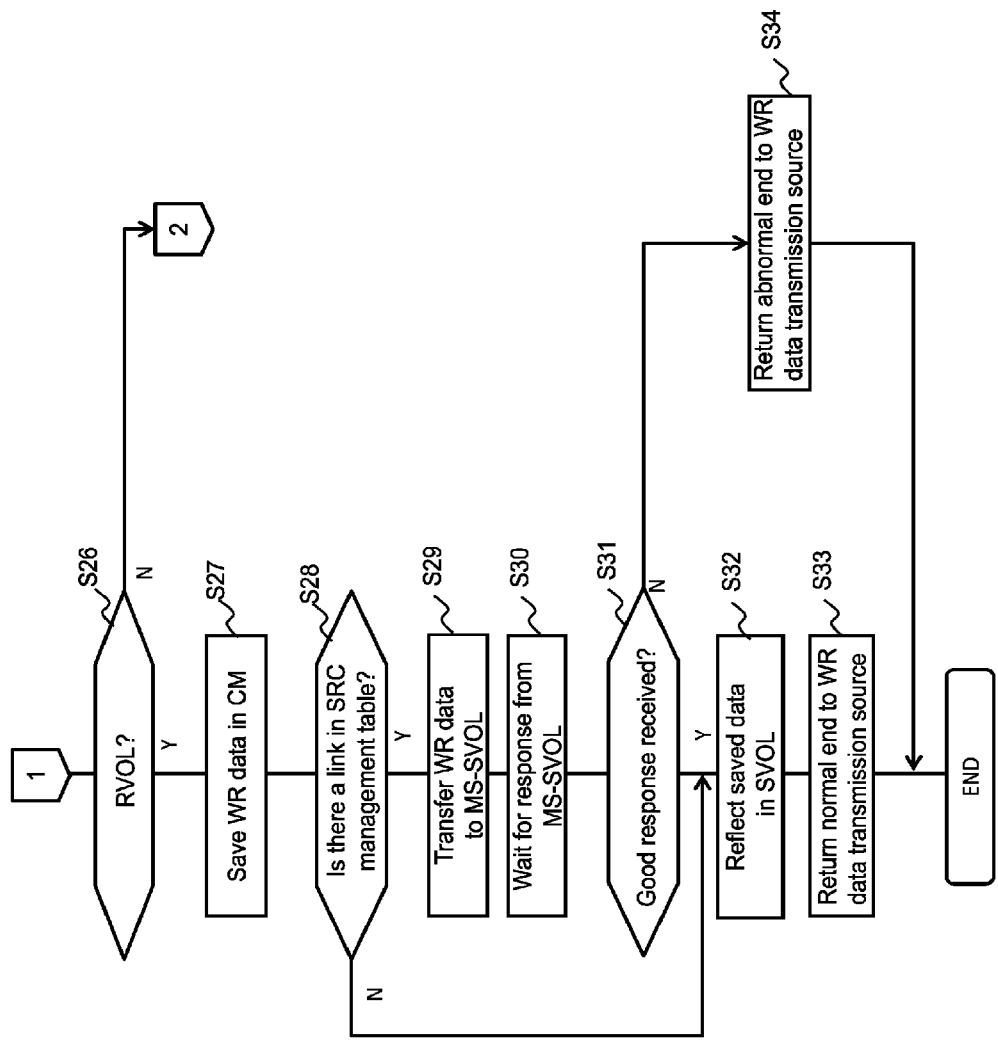
FIG. 20 is a second flowchart showing the write process according to Example 1.
Figure 21:
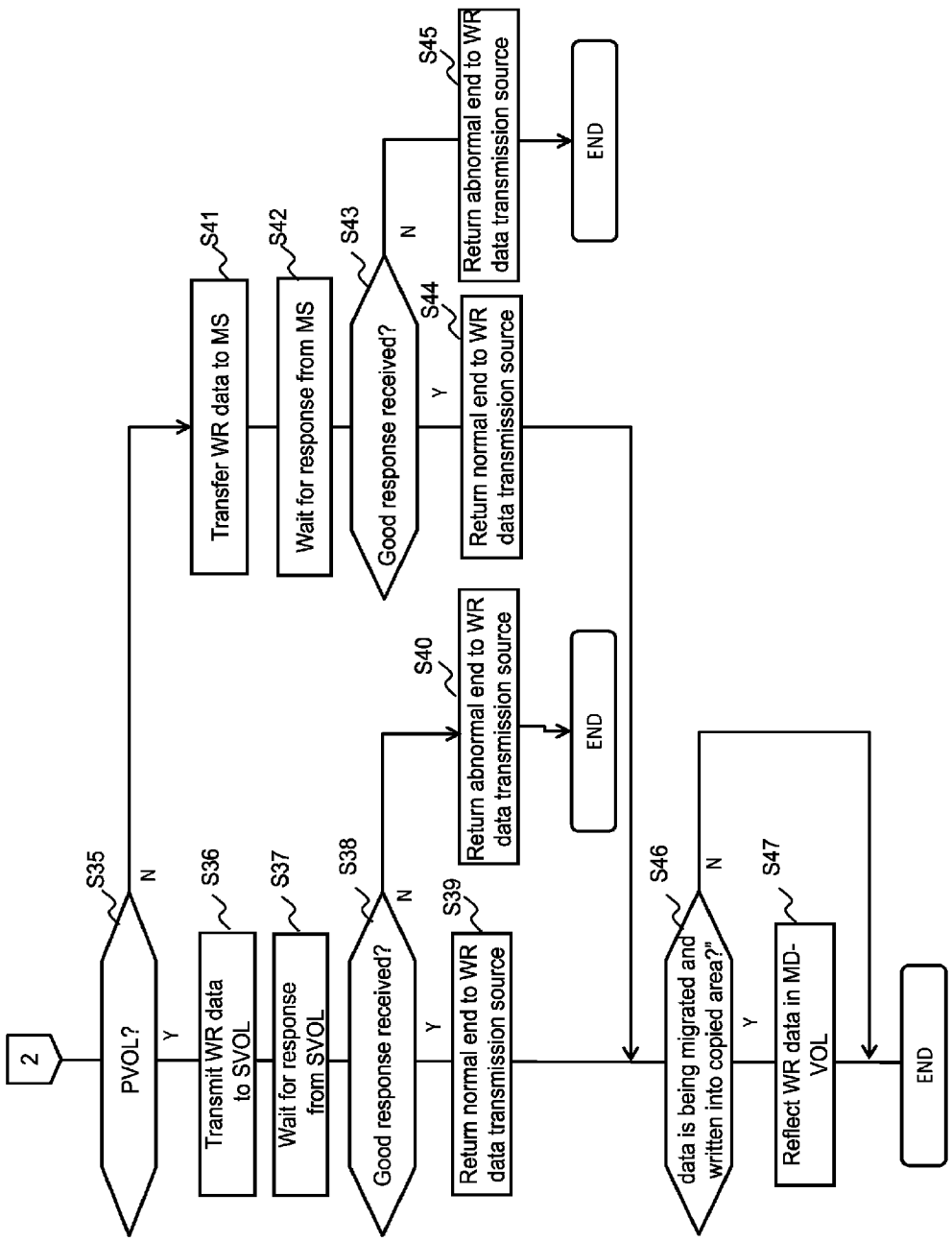
FIG. 21 is a third flowchart showing the write process according to Example 1.

In the present example the MD-PDKC 100C and MD-SDKC 100D execute processes according to the common flowchart shown in FIGS. 19 through 21. Accordingly, the MD-PDKC 100C executes the processes required for the MD-PDKC shown in FIGS. 14 through 16, while the MD-SDKC 100D executes the processes required for the MD-SDKC shown in FIGS. 14 through 16. In this case, the MD-PDKC 100C and the MD-SDKC 100D may be caused to execute the same program. Since the flowcharts shown in FIGS. 19 through 21 might be executed by both the MD-PDKC 100C and the MD-SDKC 100D, the following description assumes a DKC 100 as the subject that executes the processes.

FIG. 19 is a first flowchart showing a write process according to Example 1. FIG. 20 is a second flowchart showing the write process according to Example 1. FIG. 21 is a third flowchart showing the write process according to Example 1. The flowchart of FIG. 19 and the flowchart of FIG. 20 are coupled by a hexagonal connector 1 shown in each of the flowcharts, and the flowchart of FIG. 20 and the flowchart of FIG. 21 are coupled by a hexagonal connector 2 shown in each of the flowcharts.

Upon receiving a write request including data to be written (write target data) (step S11), the DKC 100 (specifically, the processor of the MPPK 102 of the DKC 100) determines whether this write request corresponds to host I/O from the host 200 or to remote copying (step S12).

When the write request corresponds to remote copying (step S12: remote copy), the DKC 100 proceeds to step S26 of the process shown in FIG. 20.

When the write request corresponds to host I/O (step S12: host I/O), on the other hand, then it means that the DKC 100 is the MD-PDKC 100C. Therefore, the DKC 100 determines whether the target of the write request is an RVOL or not (step S13).

When the target of the write request is an RVOL (step S13: Y), then it means that, for example, migration of the PVOL 105 is ended and that the write request concerns the MD-PVOL 107. Therefore, the DKC 100 proceeds to step S14 of the process. When, on the other hand, the target of the write request is not an RVOL (step S13: N), then it means that the migration of the PVOL 105 is not ended. Therefore, the DKC 100 proceeds to step S21 of the process.

In step S14, the DKC 100 saves and stores the write target data in the CM of the CMPK 103. The DKC 100 then transmits the write target data to an SVOL (step S15). In the present example this SVOL is the MD-SVOL 110 that is migrated from the MS-SDKC 100B to the MD-SDKC 100D.

Subsequently, the DKC 100 waits for a response from the SVOL, i.e., the MD-SDKC 100D (step S16), and determines whether a Good response indicating completion of storage of the write target data is received from the SVOL (step S17). When the Good response is received (step S17: Y), the DKC 100 reflects the write target data saved in the CM of the CMPK 103, in the MD-PVOL 107 (step S18), returns a normal end to the host 200 in response to the write request transmitted therefrom, and ends the write process. When the Good response is not received (step S17: N), the DKC 100 returns an abnormal end to the host 200 in response to the write request transmitted therefrom (step S20), and ends the write process.

In step S21 the DKC 100 transfers the write request including the write target data to the MS-PDKC 100A. The DKC 100 then waits for a response from the MS-PDKC 100A (step S22), and determines whether a Good response indicating completion of storage of the write target data is received from the MS-PDKC 100A (step S23). When the Good response is received (step S23: Y), the DKC 100 returns a normal end to the host 200 in response to the write request transmitted therefrom, and ends the write process. As a result, even when the host 200 transmits a write request concerning the PVOL 105 to the MD-PDKC 100C, the host 200 can appropriately be informed of the fact that storage of the write target data in the PVOL 105 is ended normally in the MS-PDKC 100A. When, on the other hand, the Good response is not received (step S23: N), the DKC 100 returns an abnormal end to the host 200 in response to the write request transmitted therefrom (step S25), and ends the write process.

In step S26 shown in FIG. 20, the DKC 100 determines whether the target of the write request is an RVOL or not.

When the target of the write request is an RVOL (step S26: Y), then it means that the DKC 100 is the MD-SDKC 100D and that migration of data from the SVOL 108 to the MD-SVOL 110 is completed. Therefore, the DKC 100 proceeds to step S27 of the process. The reason that the DKC 100 is determined as the MD-SDKC 100D when the target of the write request is an RVOL is because a write request corresponding to remote copy is not transmitted to the MD-PDKC 100C having an RVOL. When the target of the write request is not an RVOL (step S26: N), the DKC 100 proceeds to step S35 of the process shown in FIG. 21.

In step S27, the DKC 100 saves and stores the write target data in the CM of the CMPK 103. The DKC 100 then determines whether the SRC management table 160 has an entry which indicates a link with the MS-SDKC 1006 (step S28). In the present example, the entry which indicates the link with the MS-SDKC 100B is secured in the SRC management table 160 until migration of the data of the PVOL 105 is completed, so that the SVOL 108 of the MS-SDKC 100B can be kept in a restorable state until migration of the PVOL 105 is completed.

When the SRC management table 160 does not have an entry which indicates the link with the MS-SDKC 100B (step S28: N), the DKC 100 proceeds to step S32.

When, on the other hand, the SRC management table 160 has an entry which indicates the link with the MS-SDKC 100B (step S28: Y), in order to reflect the write target data in the SDKC 108, the DKC 100 transfers the write target data to the SVOL 108 (step S29), waits for a response from the SVOL 108, i.e., the MS-SDKC 100B (step S30), and determines whether a Good response indicating completion of storage of the write target data is received from the SVOL 108 (step S31). When the Good response is received (step S31: Y), then it means that the write target data is reflected in the SVOL 108. Thus, the DKC 100 proceeds to step S32 of the process. However, when the Good response is not received (step S31: N), the DKC 100 proceeds to step S34 of the process.

In step S32, the DKC 100 reflects the write target data saved in the CM of the CMPK 103, in the MD-SVOL 110. The DKC 100 then returns a normal end to the DKC 100 in response to the write request transmitted therefrom (step S33), and ends the write process.

In step S34, the DKC 100 returns an abnormal end to the DKC 100 in response to the write request transmitted therefrom, and ends the write process.

In step S35 shown in FIG. 21, the DKC 100 determines whether the write target data corresponding to the write request is the data to be written the PVOL 105 or not.

When the write target data corresponding to the write request is the data to be written the PVOL 105 (step S35: Y), then it means that the write target data needs to be written to the SVOL. Therefore, the DKC 100 proceeds to step S36 of the process. When the write target data corresponding to the write request is not the data to be written the PVOL 105 (step S35: N), the DKC 100 proceeds to step S41 of the process.

In step S36, the DKC 100 transmits the write target data to the SVOL. In the present example, the SVOL is the MD-SVOL 110 or the SVVOL 109 that is migrated from the MS-SDKC 100B to the MD-SDKC 100D.

The DKC 100 then waits for a response from the SVOL, i.e., the MD-SDKC 100D (step S37), and determines whether a Good response indicating completion of storage of the write target data is received from the SVOL (step S38). When the Good response is received (step S38: Y), the DKC 100 returns a normal end to the MS-PDKC 100A in response to the write request transmitted therefrom (step S39), and proceeds to step S46 of the process.

When the Good response is not received (step S38: N), the DKC 100 returns an abnormal end to the MS-PDKC 100A00A in response to the write request transmitted therefrom (step S40), and ends the write process.

In step S41, on the other hand, the DKC 100 transfers the write request including the write target data to the MS-SDKC 100B. The DKC 100 then waits for a response from the MS-SDKC 100B (step S42), and determines whether a Good response indicating completion of storage of the write target data is received from the MS-SDKC 100B (step S43). When the Good response is received (step S43: Y), the DKC 100 returns a normal end to the MD-PDKC 100C in response to the write request transmitted therefrom (step S41), and proceeds to step S46 of the process. When, on the other hand, the Good response is not received (step S43: N), the DKC 100 returns an abnormal end to the MD-PDKC 100C in response to the write request transmitted therefrom (step S45), and ends the write process.

In step S46 the DKC 100 determines whether the data of the PVOL 105 (or the SVOL 108) is in the middle of migration to the MD-PVOL 107 (or to the MD-SVOL 110) and whether the destination of the write target data is the area in the PVOL 105 (or the SVOL 108), in which the data is already copied to the MD-PVOL 107 (or the MD-SVOL 110).

When the data is in the middle of migration and the destination of the write target data is the area in the PVOL 105 (or the SVOL 108) in which the data is already copied to the MD-PVOL 107 (the MD-SVOL 110) (step S46: Y), the DKC 100 reflects the write target data in the area corresponding to the MD-PVOL 107 (the MD-SVOL 110) (step S47), and ends the process. Thus, when writing occurs in the area in which the data is copied to the MD-PVOL 107 or MD-SVOL 110, the write target data can appropriately be reflected at that moment. When the write target data is not in the middle of migration and the destination of the write target data is not the area in the PVOL 105 (or the SVOL 108) in which the data is already copied to the MD-PVOL 107 (MD-SVOL 110) (step S46: N), the DKC 100 ends the process.

Example 2

Next is described a computer system according to Example 2. Mainly the differences with Example 1 are described, and the descriptions of the similarities to Example 1 are omitted or simplified (the same applies to Example 3 described hereinafter).

In Example 2, the PVOL 105 of the MS-PDKC 100A is migrated, but the SVOL 108 of the MS-SDKC 100B is not migrated.

Figure 22:
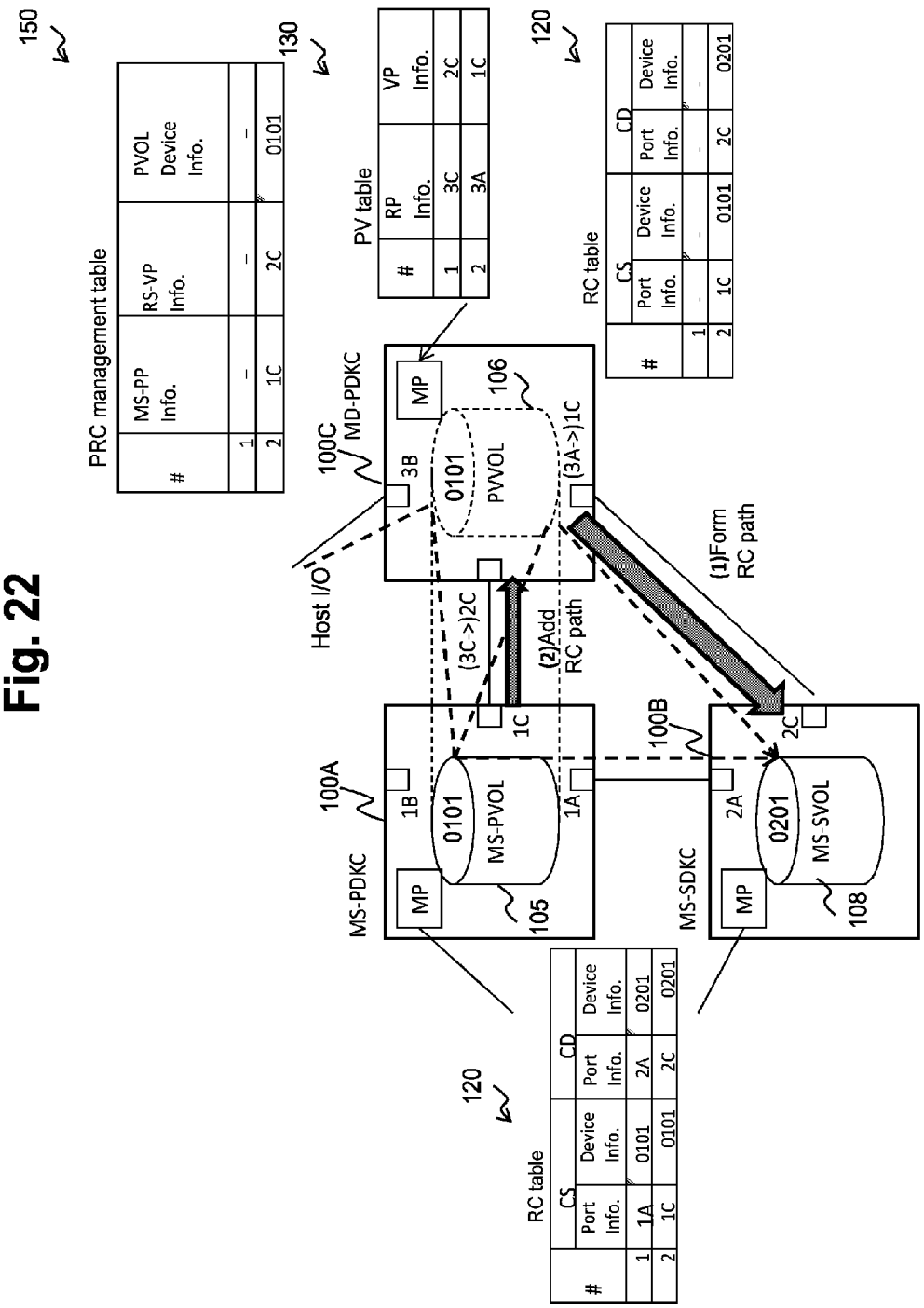
FIG. 22 is a diagram illustrating an addition of an RC path according to Example 2.

FIG. 22 is a diagram illustrating an addition of an RC path according to Example 2. FIG. 22 corresponds to the time points when the RC paths shown in FIG. 11 according to Example 1 are added.

The computer system according to Embodiment 2 does not comprise the MD-SDKC 100D, and the port 3A of the MD-PDKC 100C is coupled to the port 2C of the MS-SDKC 100B, as shown in FIG. 22.

Subsequent to the state of the computer system shown in FIG. 10 (without the MD-SDKC 100D), the administrator adds new remote copy paths (RC path, RC path) passing through the MD-PDKC 100C.

A process of adding new RC paths passing through the MD-PDKC 100C and MD-SDKC 100D is now described in detail.

The MD-PDKC 100C transmits to the MS-SDKC 100B a path addition request for forming a remote copy path extending from the MD-PDKC 100C to the MS-SDKC 100B (FIG. 22(1)). The path addition request contains the contents showing the virtualized port information "1C" of the port 3A of the MD-PDKC 100C as the copy source and the port 2C of the MS-SDKC 100B as the copy destination. Upon receiving the path addition request, in empty entry of the RC table 120 (the entry of the second row in this case) of the MS-SDKC 100B, the MS-SDKC 100B stores the virtualized port information ("1C") of the port 3A of the MD-PDKC 100C in the copy-source port information 122, the device information "0101" of the PVOL 105 in the copy-source device information 123, the port information "2C" of the port 2C of the MS-SDKC 1006 in the copy-destination port information 124, and the device information "0201" of the SVOL in the copy-destination device information 124. For the entry in the PRC management table 150 regarding the number of the formed RC copy, the MD-PDKC 100C stores the port information "1C" of the port 1C of the MS-SDKC 100B in the MS-PP information 151, the virtualized port information "2C" of the port 3C of the MD-PDKC 100C in the transfer data reception-source virtualized port information 153, and the device information "0101" of the PVOL 105 in the PVOL device information 154.

Subsequently, for the entry in the RC table 120 of the MS-PDKC 100A regarding the added copy path, according to an indication from the administrator, the MS-PDKC 100A stores the port information "1C" of the port 1C of the MS-PDKC 100A in the copy-source port information 122, and the virtualized port information "2C" of the port 3C of the MD-PDKC 100C in the copy-destination port information 124. The MS-PDKC 100A also transmits a path addition request for adding a remote copy path extending from the MS-PDKC 100A to the MD-PDKC 100C (FIG. 22(2)). Upon receiving the path addition request, the MD-PDKC 100C stores the virtualized port information "1C" of the port 3A of the MD-PDKC 100C in the copy-source port information 122, and the virtualized port information "2C" of the port 2C of the MS-SDKC 100B in the copy-destination port information 124 for the entry in the RC table 120 regarding the added RC path.

Through these processes, the path extending from the MS-PDKC 100A to the MS-SDKC 100B without passing through the MD-PDKC 100C and the path extending from the MS-PDKC 100A to the MS-SDKC 100B via the MD-PDKC 100C are managed as the paths through which the data is remote-copied from the PVOL 105 to the SVOL 108.

Figure 23:
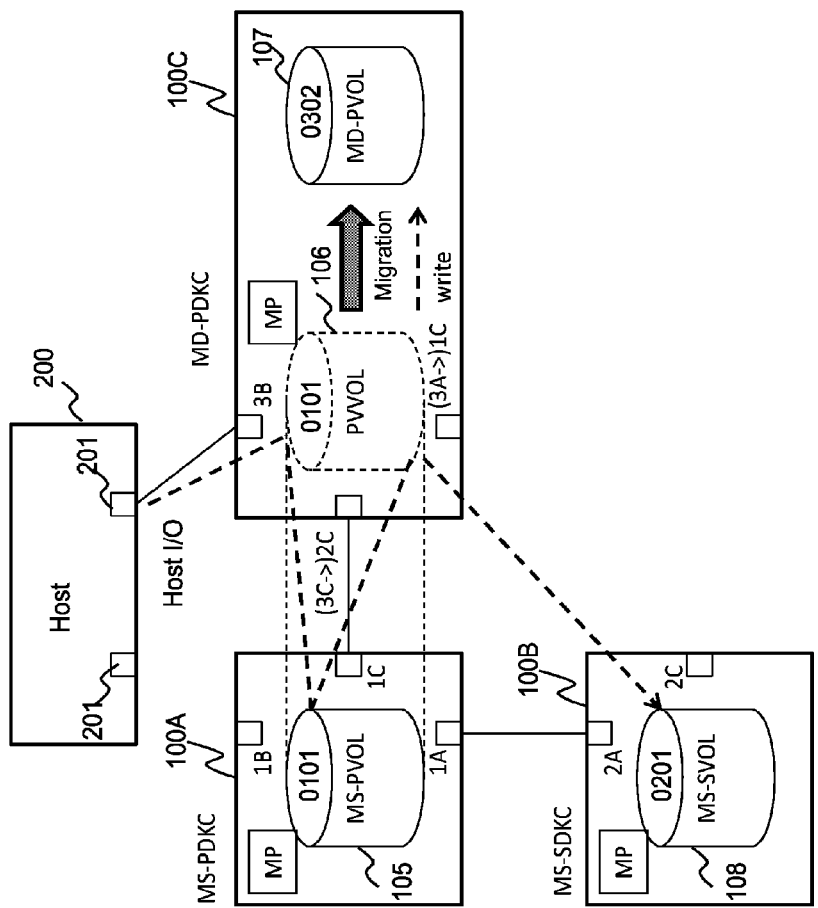
FIG. 23 is a diagram illustrating a migration of data of an MS-VOL according to Example 2.

FIG. 23 is a diagram illustrating a migration of data of a MS-VOL according to Example 2.

For instance, subsequent to the state of the computer system shown in FIG. 22, a data migration process of migrating the PVOL 105 of the MS-PDKC 100A to the MD-PVOL 107 of the MD-PDKC 100C is started, as shown in FIG. 23.

In the data migration process, the MD-PDKC 100C migrates the data sequentially to the PVOL 107, starting from the data in a front area of the VVOL 106 based on the MS-PVOL 105.

When a write request is transmitted from the host 200 to the MD-PDKC 100C in the middle of the data migration process, the MD-PDKC 100C transfers the write request to the MS-PDKC 100A. The MS-PDKC 100A transmits a remote copy write request to the MD-PDKC 100C. The MD-PDKC 100C then transmits the remote copy write request to the MS-SDKC 100B. The MS-SDKC 100B stores the write target data in the SVOL 108 in accordance with the write request. This can appropriately reflect writing concerning the PVOL 105 in the SVOL 108. Here, when the remote copy write request received from the MS-PDKC 100A is intended for an area in which the data is already copied from the PVOL 105 to the MD-PVOL 107, the MD-PDKC 100C writes the write target data to corresponding area of the MD-PVOL 107. Accordingly, writing to the migration-completed area can appropriately be reflected in the MD-PVOL 107.

Example 3

A computer system according to Example 3 is now described.

In Example 3, the SVOL 108 of the MS-SDKC 100B is migrated, but the PVOL 105 of the MS-PDKC 100A is not migrated.

Figure 24:
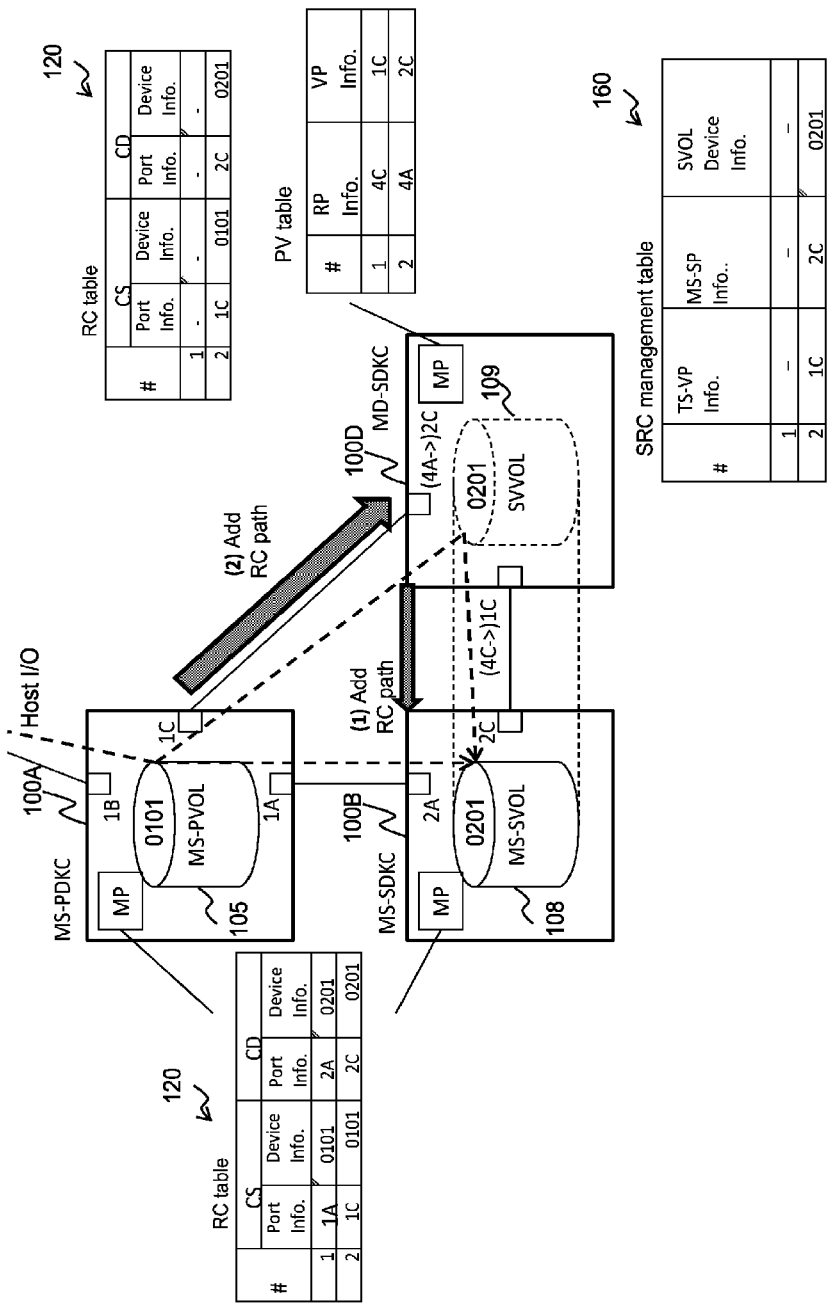
FIG. 24 is a diagram illustrating an addition of an RC path according to Example 3.

FIG. 24 is a diagram illustrating an addition of an RC path according to Example 3. FIG. 24 corresponds to the time points when the RC paths shown in FIG. 11 according to Example 1 are added.

Subsequent to the state of the computer system shown in FIG. 10 (without the MD-PDKC 100C), the administrator adds new remote copy paths (RC path, RC path) passing through the MD-SDKC 100D.

Next, a process of adding new RC paths passing through the MD-SDKC 100D is described in detail.

The MD-SDKC 100D transmits to the MS-SDKC 100B a path addition request for adding a remote copy path extending from the MD-SDKC 100D to the MS-SDKC 100B (FIG. 24(1)). The path addition request contains the contents showing the virtualized port information "1C" of the port 4C of the MD-SDKC 100D as the copy source and the port 2C of the MS-SDKC 100B as the copy destination. Upon receiving the path addition request, in empty entry of the RC table 120 (the entry of the second row in this case) of the MS-SDKC 100B, the MS-SDKC 100B stores the virtualized port information ("1C") of the port 4C of the MD-SDKC 100D in the copy-source port information 122, the device information "0101" of the PVOL 105 in the copy-source device information 123, the port information "2C" of the port 2C of the MS-SDKC 100B in the copy-destination port information 124, and the device information "0201" of the SVOL in the copy-destination device information 124. The MD-SDKC 100D further stores the virtualized port information "1C" of the port 4C of the MD-SDKC 100D in the transfer data transmission-source virtualized port information 162, the port information "2C" of the port 2C of the MS-SDKC 100B in the MS-SP information 163, and the device information "0201" of the SVOL 108 in the SVOL device information 164, for the entry in the SRC management table 160 regarding the number of the added RC copy.

Next, for the entry in the RC table 120 of the MS-PDKC 100A regarding the added copy path, according to an indication from the administrator, the MS-PDKC 100A stores the port information "1C" of the port 1C of the MS-PDKC 100A in the copy-source port information 122, and the virtualized port information "2C" of the port 4A of the MD-SDKC 100D in the copy-destination port information 124. The MS-PDKC 100A also transmits a path addition request for adding a remote copy path extending from the MS-PDKC 100A to the MD-SDKC 100D (FIG. 24(2)). Upon receiving the path addition request, the MD-SDKC 100D stores the virtualized port information "1C" of the port 4C of the MD-SKC 100D in the copy-source port information 122 and the port information "2C" of the port 2C of the MS-SDKC 100B in the copy-destination port information 124, for the entry in the RC table 120 regarding the added RC path.

Through these processes, the path extending from the MS-PDKC 100A to the MS-SDKC 100B without going through the MD-SDKC 100D and the path extending from the MS-PDKC 100A to the MS-SDKC 100B via the MD-SDKC 100D are managed as the paths through which data are remote-copied from the PVOL 105 to the SVOL 108.

Figure 25:
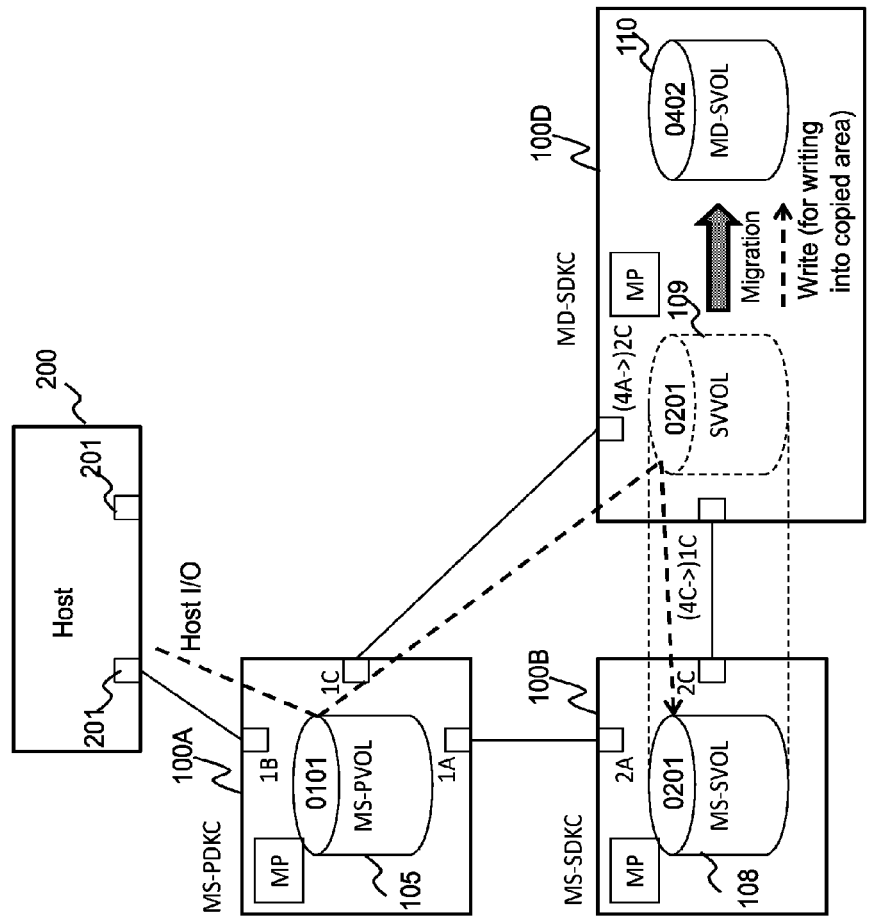
FIG. 25 is a diagram illustrating a migration of data of an MS-VOL according to Example 3.

FIG. 25 is a diagram illustrating a migration of data of an MS-VOL according to Example 3.

For instance, subsequent to the state of the computer system shown in FIG. 24, a data migration process of migrating the SVOL 108 of the MS-SDKC 100B to the MD-VOL 110 of the MD-SDKC 100D is started, as shown in FIG. 25.

In the data migration process, the MD-SDKC 100D migrates the data sequentially to the SVOL 110, starting from the data in a front area of the VVOL 109 based on the MS-SVOL 108.

When a write request is transmitted from the host 200 to the MS-PDKC 100A in the middle of the data migration process, the MS-PDKC 100A transmits a remote copy write request to the MD-SDKC 100D. The MD-SDKC 100D then transmits the remote copy write request to the MS-SDKC 100B. The MS-SDKC 100B stores the write target data in the SVOL 108 in accordance with the write request. This can appropriately reflect writing concerning the PVOL 105 in the SVOL 108. Here, when the remote copy write request received from the MS-PDKC 100A is intended for an area in which the data is already copied from the SVOL 108 to the MD-VOL 110, the MD-SDKC 100D writes the write target data to corresponding area of the MD-SVOL 110. Accordingly, writing to the migration-completed area can appropriately be reflected in the MD-SVOL 110.

Embodiment 1

Configuration of Computer System

Figure 26:
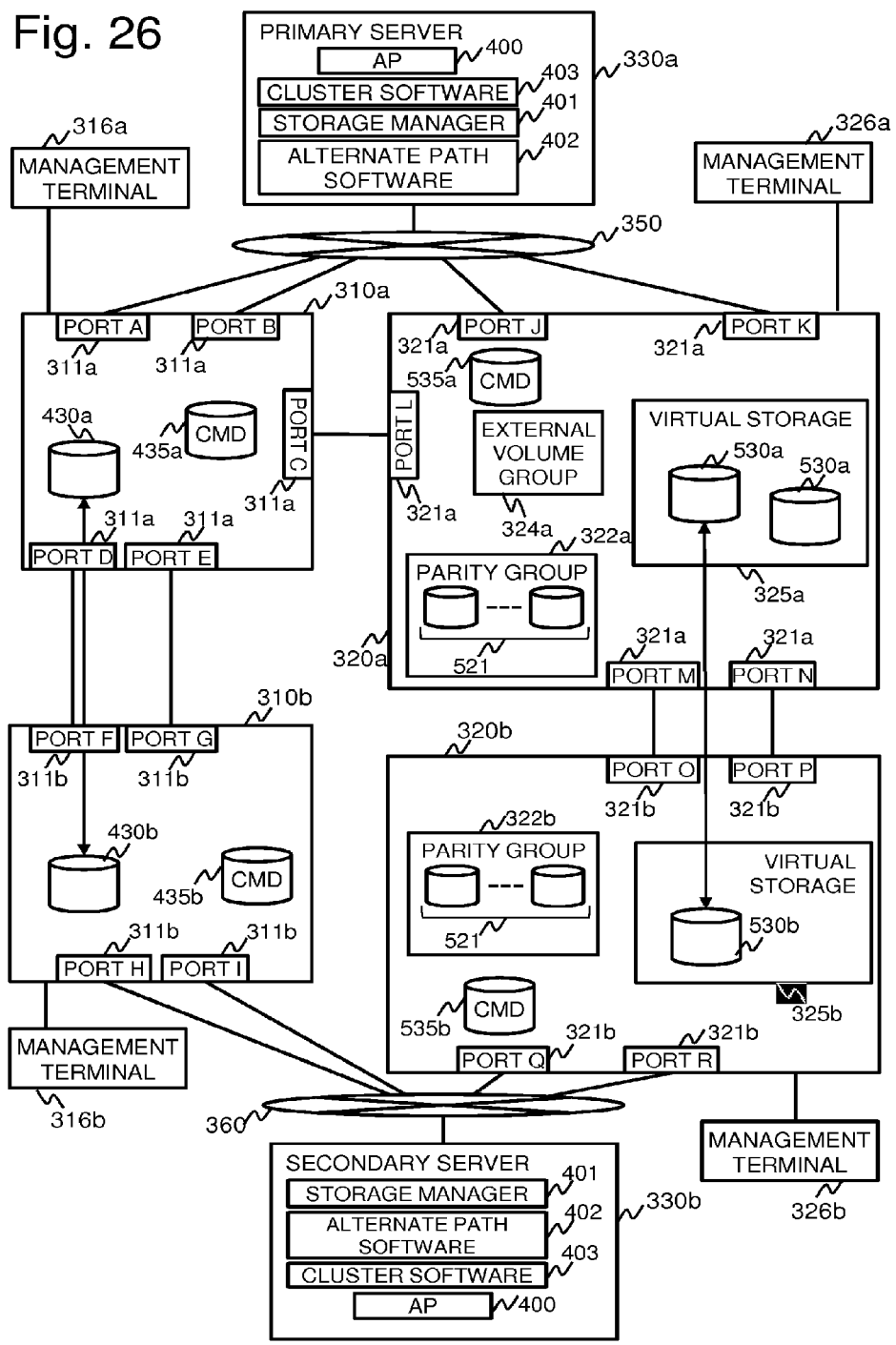
FIG. 26 illustrates a configuration view showing an outline of a computer system according to Embodiment 1 of the present invention.

FIG. 26 is a view showing an outline of configuration of a computer system according to Embodiment 1 of the present invention. A computer system is composed of a migration source primary storage subsystem 310a, a migration source secondary storage subsystem 310b, a migration destination primary storage subsystem 320a, a migration destination secondary storage subsystem 320b, a primary server 330a, and a secondary server 330b.

FIG. 26 illustrates the configuration during processing of a migration process described hereinafter, and before the migration process is performed, the migration destination primary storage subsystem 320a and the migration destination secondary storage subsystem 320b do not exist. In the state before the migration process, the primary server 330a is connected via a SAN (Storage Area Network) 350 to the migration source primary storage subsystem 310a, and performs access to a logical volume 430a in the migration source primary storage subsystem 310. Further, before executing the migration process, the secondary server 330b is connected via a SAN 360 to the migration source secondary storage subsystem 310b, and can access a logical volume 430b of the migration source secondary storage subsystem 310b. Further, the migration source primary storage subsystem 310a and the migration source secondary storage subsystem 310b are mutually connected via ports (311a, 311b). According to the computer system of Embodiment 1 of the present invention, the SAN 350 and the SAN 360 are networks composed of Fibre Channel cables and Fibre Channel switches, but they can also be networks composed using an Ethernet.

When performing the migration process, the migration destination primary storage subsystem 320a and the migration destination secondary storage subsystem 320b are disposed within the computer system. Then, as shown in FIG. 26, the migration destination primary storage subsystem 320a is connected via the SAN 350 to the primary server 330a, and also connected to the migration source primary storage subsystem 310a and the migration destination secondary storage subsystem 320b. The migration destination secondary storage subsystem 320b is connected via the SAN 360 to the secondary server 330b.

In the following description, the migration source primary storage subsystem 310a and the migration source secondary storage subsystem 310b are collectively referred to as "migration source storage system 310". The migration destination primary storage subsystem 320a and the migration destination secondary storage subsystem 320b are collectively referred to as "migration destination storage system 320". The migration source primary storage subsystem 310a, the migration source secondary storage subsystem 310b, the migration destination primary storage subsystem 320a and the migration destination secondary storage subsystem 320b are collectively referred to as "storage subsystem". The primary server 330a and the secondary server 330b are referred to as "host computer".

Figure 27:
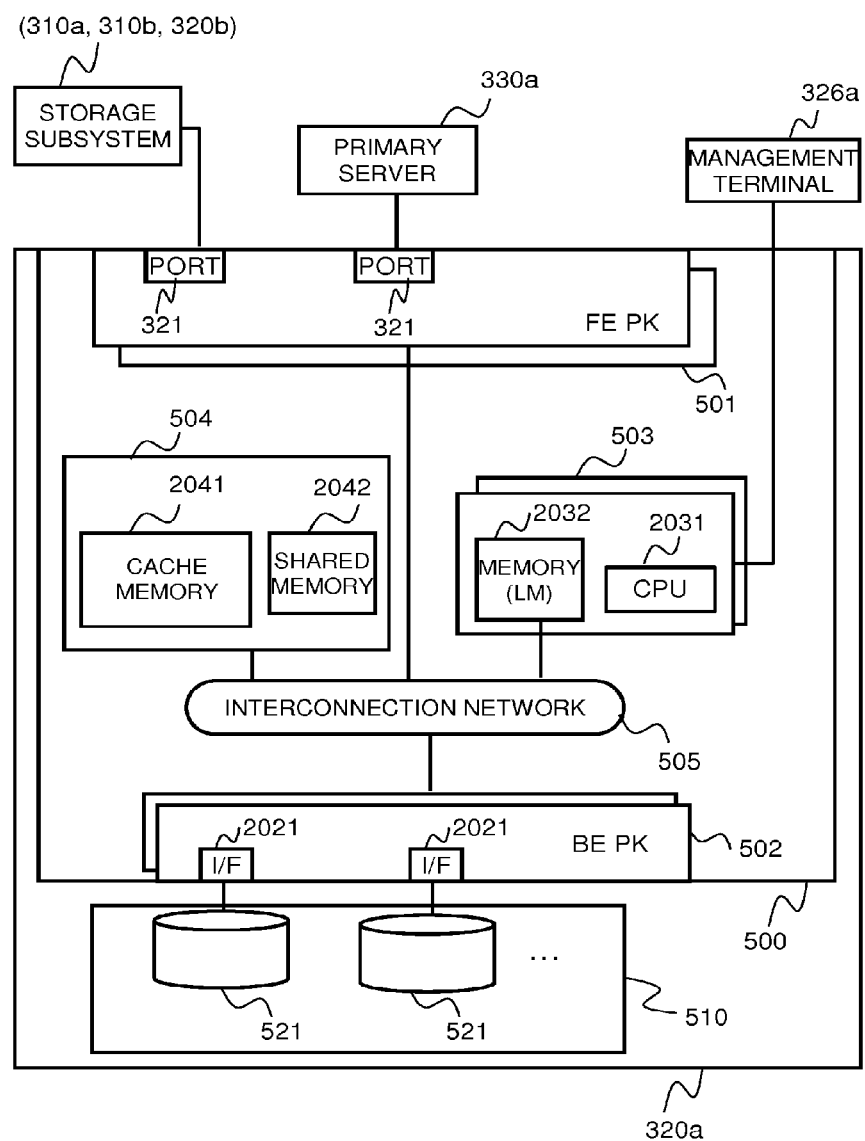
FIG. 27 illustrates a hardware configuration of the storage subsystem.

Now, the hardware configuration within the storage subsystem of the present computer system will be described with reference to FIG. 27. We will mainly describe the hardware configuration of the migration destination primary storage subsystem 320a, but other storage subsystems (migration source primary storage subsystem 310a, migration source secondary storage subsystem 310b and migration destination secondary storage subsystem 320b) adopt a similar hardware configuration. However, it is not necessary for all storage subsystems to adopt the same hardware configuration.

The migration destination primary storage subsystem 320a is composed of a controller 500 formed by mutually connecting a frontend package (FEPK) 501, a backend package (BEPK) 502, a processor package (MPPK) 503 and a cache memory package (CMPK) 504 via an interconnection network 505, and a disk unit (DKU) 510 mounting multiple drives 521.

The frontend package (FEPK) 501 includes multiple ports 321 for connecting to a host computer such as primary server 330*a* or to the storage subsystems (310*a*, 310*b*, 320*b*), which is a component for relaying control information and data communicated between the CMPK 504 and the MPPK 503. The FEPK 501 includes, other than the ports 321, a buffer, a CPU, an internal bus, and an internal port, which are not shown. A buffer is a storage area for temporarily storing the control information and data relayed by the FEPK 501, and similar to the CMPK 504, it is composed of various volatile memories and nonvolatile memories. The internal bus mutually connects the various components within the FEPK 501. The FEPK 501 is connected via an internal port to the interconnection network 505. The number of ports 321 is not restricted to the example illustrated in the drawing.

The backend package (BEPK) 502 is a component having multiple interfaces (I/F) 2021 for connecting to drives 521, which relays control information and data communicated between the drives 521 and the CMPK 504 or the MPPK 503. The BEPK 502 includes, other than the interface (I/F) 2021, a buffer, a CPU, an internal bus and an internal port, which are not shown. The buffer is a storage area for temporarily storing control information and data that the BEPK 502 relays, and similar to the CMPK 504, it is composed of various volatile memories and nonvolatile memories. The internal bus mutually connects various components within the FEPK 501.

The MPPK 503 is composed of a CPU 2031, a memory (LM) 2032, and an internal bus and an internal port not shown. Similar to the cache memory 2041, the memory (LM) 2032 can be composed of various kinds of volatile memories and nonvolatile memories. The CPU 2031, the memory (LM) 2032 and the internal port are mutually connected via an internal bus. The MPPK 503 is connected via an internal port of the MPPK 503 to the interconnection network 505.

Also, the MPPK 503 is a component for performing various data processes within the storage subsystem. By executing programs stored in the memory (LM) 2032, the CPU 2031 can realize various functions including a volume copying function of the storage subsystem described hereinafter.

The CMPK 504 is a component having a cache memory 2041 and a shared memory 2042. The cache memory 2041 is a storage area for temporarily storing the data received from the primary server 330*a* or a different storage subsystem, and for temporarily storing the data read from the drive 521. The cache memory 2041 is composed of volatile memories such as DRAM and SRAM, or of volatile memories such as flash memories.

The shared memory 2042 is a storage area for storing management information related to various data processes within the storage subsystem. The shared memory 2042 can be composed of various kinds of volatile memories or nonvolatile memories, similar to the cache memory 2041. As for the hardware of the shared memory 2042, the hardware which is common to the cache memory 2041 can be used, or the hardware not common therewith can be used.

The interconnection network 505 is a component for mutually connecting components and transferring control information and data between mutually connected components. An interconnection network can be composed using switches and buses, for example.

The drive 521 is a storage device for storing data (user data) used by various programs in the primary server 330*a*, and redundant data (parity data). The drive 521 can utilize, as storage media, magnetic storage media used in HDDs and the like, or nonvolatile semiconductor storage media such as NAND flash memories, MRAMs, ReRAMs or PRAMs.

We will return to FIG. 26. Each storage subsystem according to Embodiment 1 of the present invention has one or more logical volumes (430*a*, 430*b*, 530*a*, 530*b*) and command devices (435*a*, 435*b*, 535*a*, 535*b*). The logical volumes (430*a*, 430*b*, 530*a*, 530*b*) are storage devices for storing write data from the host computer such as the primary server 330*a*, and will be described in detail later. The command devices (435*a*, 435*b*, 535*a*, 535*b*) are a sort of logical volumes, but they are not used to store write data from the host computer. They are storage devices used to receive various control instructions, such as a logical volume copy instruction, from a storage manager 401 in the primary server 330*a* or the secondary server 330*b*. In the computer system according to Embodiment 1 of the present invention, the respective storage subsystems have a command device. The command device is created when an administrator, by using a management terminal, issues a command for instructing creation of a command device to the respective storage subsystems.

Since the respective storage subsystems according to Embodiment 1 of the present invention have a large number of ports, in the following description, the respective ports are distinguished by assigning identifiers A through R thereto, as shown in FIG. 26. The migration source primary storage subsystem 310*a* includes ports A through E, wherein ports A and B are used for connecting to the primary server 330*a*, and ports D and E are used for connecting to the migration source secondary storage subsystem 310*b*. Further, port C is used for connecting to the migration destination primary storage subsystem 320*a* during the migration process.

The migration source secondary storage subsystem 310*b* has ports F through I, wherein ports F and G are used for connecting to the migration source primary storage subsystem 310*a*. Ports H and I are used for connecting to the secondary server 330*b*.

The migration destination primary storage subsystem 320*a* includes ports J through N, wherein ports J and K are used for connecting to the primary server 330*a*, and ports M and N are used for connecting to the migration destination secondary storage subsystem 320*b*. Further, port L is used for connecting to the migration source primary storage subsystem 310*a*.

The migration destination secondary storage subsystem 320*b* includes ports O through R, wherein ports O and P are used for connecting to the migration destination primary storage subsystem 320*a*. Ports Q and R are used for connecting to the secondary server 330*b*.

Further, the configuration of each storage subsystem is not restricted to the one having the number of ports described above, and can have a larger number of ports than those described above.

The primary server 330*a* and the secondary server 330*b* are computers having CPUs and memories, which are not shown. The primary server 330*a* and the secondary server 330*b* are connected via a communication network which is not shown. A LAN (Local Area Network) or a WAN (Wide Area Network) are used as the communication network. The CPU executes various programs loaded in the memory. The programs operating in the primary server 330*a* and in the secondary server 330*b* include an application program (AP) 400, a storage manager 401, an alternate path software 402, and a cluster software 403.

The application program (AP) 400 is a program such as database management system which performs accesses (read/write) to the logical volume 430*a*. The migration source storage system has a remote copying function where the data written to the logical volume 430*a* is replicated to the logical volume 430b, so that the data in the logical volume 430a is constantly replicated to the logical volume 430b.

The cluster software 403 is a program for performing a so-called disaster recovery operation, which is operated in the primary server 330a and in the secondary server 330b. For example, when the primary server 330a or the migration source primary storage subsystem 310a goes down due to failure or the like, the cluster software 403 operating in the secondary server 330b performs a process to resume the operations performed by the AP 400 in the primary server 330a.

The alternate path software 402 is a program managing an access route (path) from the host computer such as the primary server 330a to the volumes (logical volumes) of the storage subsystem, which enables to continue access to the volume using an alternate path to enable access to the volume even when one path is disconnected due to failure.

The storage manager 401 is a program for configuring and controlling the storage subsystem. The detailed description thereof will follow.

Function of Storage Subsystem Used for Migration Process

Next, we will describe the function of a storage subsystem required to describe the migration method according to a preferred embodiment of the present invention. Here, mainly the function provided in the migration destination primary storage subsystem 320a will be described. As mentioned earlier, the respective functions of the storage subsystem described hereinafter is realized by the CPU 2031 of the storage subsystem executing programs in the memory (LM) 2032.

(1) Volume Creating Function

The migration destination primary storage subsystem 320a according to a preferred embodiment of the present invention manages one or multiple drives 521 as a group, and this group is called a parity group (elements 322a, 322b and the like of FIG. 26 are parity groups). The migration destination primary storage subsystem 320a uses the so-called RAID technique to create redundant data (parity) from data before storing the data to the drives constituting the parity group 322. Then, the data and the parity are stored into the drives constituting the parity group 322.

The information of the parity group 322 managed by the migration destination primary storage subsystem 320a (such as the information of drives constituting the parity group) is managed via a parity group management table T100 as illustrated in FIG. 28. This information is stored in the shared memory 2042. The parity group management table T100 is composed of the following fields: a parity group name T101, a drive name T102, a RAID level T103, a size T104, and a remaining size T105. The identifiers of the parity group are stored in the parity group name T101, and the identifiers of the drives constituting the parity group are stored in the drive name T102. The information of the RAID level which is a method for realizing redundancy of the parity group is stored in the RAID level T103, and the information related to the capacity of the parity group is stored in the size T104.

Although described in detail later, the storage area in the parity group is used for creating logical volumes. In the remaining size T105, the information related to the size of the area in the parity group that has not yet used for creating logical volumes is stored.

The migration destination primary storage subsystem 320a further has a function to create one or more logical volumes (also referred to as LDEVs) using the storage area provided by the parity group. This function is called a volume creating function.

The migration destination primary storage subsystem 320a manages the respective logical volumes by assigning unique numbers within the storage subsystem, which are called logical volume numbers (LDEV #). The logical volume information is managed via a logical volume management table T200 shown in FIG. 30. Each row of the logical volume management table T200 shows the information of the logical volume, wherein LDEV # (T201) shows the logical volume number (LDEV #) which is the identifier of the logical volume, and the size of the logical volume is stored in size T202. The information of the parity group whose storage area is mapped to the logical volume is stored in group name T203, and the information of the initial address of the storage area in the parity group is stored in initial address T204.

In the example of FIG. 30, by referring to the information of the logical volume where the LDEV # (T201) is 44 (information in row 906), the group name T203 is "RG A", the initial address T204 is 0, and the size of the logical volume (T202) is 100 GB, so that it shows that the area from the beginning (address 0) to 100 GB in the parity group "RG A" is assigned to logical volume "44".

It has been described here that the migration destination primary storage subsystem 320a has a volume creating function, but other storage subsystems also have the above-described volume creating function.

(2) External Storage Connecting Function

The migration destination primary storage subsystem 320a handles the storage area of the volume of other storage subsystems (such as the migration source primary storage subsystem 310a) as a storage area of the migration destination primary storage subsystem 320a, and has a function to provide the storage area to the host computer such as the primary server 330a. Hereinafter, this function is referred to as an "external storage connecting function". Further, the storage area managed by the external storage connecting function is referred to as an external volume group (324a).

The information of the external volume group managed by the migration destination primary storage subsystem 320a is managed by an external volume group management table T150 as illustrated in FIG. 29. Each row represents the information of the external volume group, wherein the identifier of the external volume group is stored in group name T151, and the information of the logical volume of the external storage subsystem associated with the external volume group is stored in WWN (T152), LUN (T153) and size (T154). In the example of FIG. 29, a logical volume whose WWN (T152) is "50060e8005111112b" and LUN (T153) is "0" is associated with the external volume group. In the following description, the operation for associating the logical volume to the external volume group is called "mapping". It is possible to provide multiple access routes (paths) from the external volume group of the migration destination primary storage subsystem 320a to the logical volume of the external storage, and to alternate the access path when path failure occurs.

An external volume group 324a is handled similarly as the parity group 322a. Therefore, in the volume creating function, the storage area of the external volume group can be used to create one or multiple logical volumes. Row 907 of the logical volume management table T200 of FIG. 30 shows an example of a logical volume (volume having "33" as an LDEV # (T201)) created by the storage area of external volume group "EG1".

The external storage connecting function is a function that only the migration destination primary storage subsystem 320a has in the computer system according to Embodiment 1 of the present invention. However, the storage subsystem other than the migration destination primary storage subsystem 320a may also have the external storage connecting function.

(3) LU Path Configuring Function

The function to assign LUNs (logical unit numbers) and port identifiers so that the logical volume can be recognized from the host computer such as the primary server 330a is referred to as "logical path creating function" or an "LU path configuring function". According to the present embodiment, a WWN (World Wide Name) which is an identifier that each port 321a has is used as the port identifier. However, other identifiers can be used. An LU management table T300 shown in FIG. 31 is a table for managing the information of the logical unit number (LUN) and the port name associated with the respective logical volumes within the storage subsystem. This table is stored in the shared memory 2042 of the storage subsystem.

Information on the port name and the LUN associated with the logical volume specified by the LDEV # (T303) are stored in port name T301 and LUN (T302). For example, information stating that the port name T301 is "3e243174 aaaaaaaa", LUN (T302) is "0" and LDEV # (T303) is "11" is stored in the initial entry (row) 300-5 in the LU management table T300 of FIG. 31. In this case, the host computer such as the primary server 330a connected to the SAN 350 recognizes that a volume having LUN 0 belongs to the port. Hereinafter, the volume recognized by the host computer (such as the primary server 330a) is called "logical unit" or "LU".

Further according to the storage subsystem of the present embodiment, it is possible to associate multiple sets of "port name and LUN" to a logical volume. For example, in the example of FIG. 31, the information of a logical volume having LDEV # (T303) 11 is stored in entry (row) 300-5 and also stored in the lower entry (row) 300-6. In that case, the host computer recognizes that an LU having LUN number 0 belongs to port (3e243174 aaaaaaaa), and that an LU having LUN number 0 also belongs to port (3e243174 bbbbbbbb).

Further, the LU path configuring function of the storage subsystem also has a function to delete the LUN and port name associated with the logical volume, in contrast to configuring the LU path. The process of deleting the LUN and port name associated with a logical volume is called an LU path deleting process. When the LU path deleting process is performed to a certain logical volume, the host computer will not be able to access that logical volume.

(4) Volume Copying Function

The storage subsystem has a function to replicate data within a logical device to a different volume, and this function is called a volume copying function. The volume copying function includes a function to copy data to a volume within the same storage subsystem as the storage subsystem to which the copy source volume belongs, and a function to copy data to a volume in a different storage subsystem from the storage subsystem to which the copy source volume belongs (such as copying data in a volume within the migration source primary storage subsystem 310a to a volume within the migration source secondary storage subsystem 310b). These functions are respectively referred to as "local copying function" and "remote copying function" in the present embodiment.

The local copying function can be realized using techniques taught in Patent Literatures 2 or 3, for example.

Further, the remote copying function is a function taught in Patent Literatures 4 and 5, for example. There are two types of remote copying functions, a synchronous remote copy and an asynchronous remote copy, but the present invention is effective regardless of which type of remote copying function is adopted by the storage subsystem. There is another type of remote copying function as taught in Patent Literature 5, which uses a journal for performing remote copy, where the copy data is stored as a journal in a volume (journal volume), and the data stored in the journal volume is copied to the copy destination storage subsystem, and the present invention is also effective in such case.

Now, the definition of various terms used in the present specification related to the volume copying function will be described.

(a) P-VOL: A volume copied via the volume copying function (copy source volume) is called a primary volume. It is also referred to as P-VOL.

(b) S-VOL: A volume being the copy destination of the data in the P-VOL is called a secondary volume. It is also referred to as S-VOL.

(c): Pair: The S-VOL storing replica of data in the P-VOL is called "volume in pair relationship" with the P-VOL. Similarly, the P-VOL storing the source data to be replicated to the S-VOL is also called a volume in pair relationship with the S-VOL. The set of P-VOL and the S-VOL storing replica of data in the P-VOL is called "pair" or "volume pair".

(d) Pair Creation, Pair Deletion: Instructing the storage subsystem to use the volume copying function to set the LDEV (P-VOL) of the storage subsystem (such as the migration destination primary storage subsystem 320a) and the LDEV (S-VOL) of the storage subsystem (such as the migration destination secondary storage subsystem 320b) to be in a pair relationship is called "pair creation". On the other hand, the operation to cancel the pair relationship of volumes (so that the replica of data in the P-VOL is not created in the S-VOL) is called "pair cancellation" (or "pair deletion"). The storage subsystem receives instructions such as pair creation or pair deletion from the storage manager 401 or the management terminal. The control instructions instructing pair creation and the like received by the storage subsystem includes a serial number of the storage subsystem to which the P-VOL belongs, the LDEV # of the P-VOL, the serial number of the storage subsystem to which the S-VOL belongs, and the LDEV # of the S-VOL. Thereby, the storage subsystem can uniquely specify the P-VOL and the S-VOL being the target of pair operation.

(e) Pair Status: A volume pair takes some states based on the copy state of data within the volume. When the storage subsystem receives a pair creation instruction, it starts an operation to copy all the data in the P-VOL to the S-VOL. At the point of time when copying of data is started, not all the data in the P-VOL is reflected in the S-VOL, and this state is called "copy pending". The state where copying of all data in the P-VOL is completed and the contents of the P-VOL and the S-VOL become identical (synchronized) is referred to as "pair" state. When writing is performed from the host computer to the P-VOL of a volume pair in "pair" state, the write data is written to the P-VOL, and replica of write data is also written to the S-VOL, so that the P-VOL and S-VOL are controlled to maintain a state storing identical data. The state after pair cancellation is referred to as "simplex" state.

Further, it is possible to temporarily stop the replication performed in a volume pair in "pair" state. The state where the replication process is temporarily stopped is called "suspended" state. It is also possible to resume the replication process of the volume pair in the "suspended" state and return the same to "pair" state. This process is called "resynchronization".

The storage subsystem manages the respective volume pairs using a pair management table T2000. FIG. 32 illustrates a configuration example of the pair management table T2000. The storage subsystem assigns identifiers to the respective pairs for management, and this identifier is called a pair number (T2001). The pair management table T2000 manages the P-VOL and S-VOL information of the respective pairs (a PDKC # (T2003) which is an identification number capable of specifying the storage subsystem to which the P-VOL belongs (T2003), a P-VOL # which is an LDEV # of the P-VOL (T2004), an SDKC # which is an identification number capable of specifying the storage subsystem to which the S-VOL belongs (T2005), and the S-VOL # which is the LDEV # of the S-VOL (T2006)). The serial number of the storage subsystem and the serial number of the storage subsystem 320b are stored in PDKC # (T2003) and SDKC # (T2005). The pair management table T2000 is stored in both the storage subsystem to which the P-VOL belongs and the storage subsystem to which the S-VOL belongs. Therefore, when a pair volume is created by the migration destination primary storage subsystem 320a and the migration destination secondary storage subsystem 320b, the pair management table T2000 is stored in both the migration destination primary storage subsystem 320a and the migration destination secondary storage subsystem 320b.

(5) Volume Migrating Function

A volume migrating function is a function to migrate the data stored in a logical volume within the migration destination primary storage subsystem 320a to other logical volume within the migration destination primary storage subsystem 320a. In addition to the migration of data within the logical volume, the identifiers such as LDEV # are also migrated.

We will describe a case where logical volumes of LDEV #44 and LDEV #33 are created within the migration destination primary storage subsystem 320a, and a case where the state of the logical volume management table T200 is as shown in FIG. 30. When the migration destination primary storage subsystem 320a receives an instruction to move the data in the LDEV #33 to the LDEV #44, the migration destination primary storage subsystem 320a performs a process to replicate the data in the LDEV #33 to LDEV #44. In the following, the logical volume (LDEV #44) being the migration destination of data of the LDEV #33 is also referred to as "target volume" or "migration target volume". It is possible to receive data write requests from the host computer such as the primary server 330a to the LDEV #33 during replication.

When the replication of data from LDEV #33 to LDEV #44 is completed, the migration destination primary storage subsystem 320a switches the role of LDEV #33 and LDEV #44. Actually, the contents of LDEV # (T01) in the logical volume management table T200 are switched. In the example of FIG. 30, 44 is stored in LDEV # (T201) of row 906 and 33 is stored in LDEV # (T201) of row 907, but after performing volume migration by the volume migrating function, 33 is stored in LDEV # (T201) of row 906 and 44 is stored in LDEV # (T201) of row 907. In other words, the correspondence between the LDEV # and the group number and initial address of the data storage destination is swapped between the migration source and the migration destination. Thereby, the data storage position can be migrated transparently to an upper level device such as the host computer, without changing the LDEV # (and the LUN or the port name associated with the logical volume) of the logical volume storing the data. In other words, before replication is completed, during access to the LDEV #33, data has been read/written from/to the external volume EG1, but after replication is completed, data will be read/written from/to the parity group RG A.

(6) Virtual Storage

Next, the virtual storage will be described. The migration destination primary storage subsystem 320a according to the present invention has a function to define one or more virtual storage subsystems 325a (hereinafter referred to as virtual storages) that differ from the physical storage subsystem such as the migration destination primary storage subsystem 320a, and to make it appear to the primary server 330a as if a virtual storage exists within the SAN 350 in addition to physical storage subsystems. The migration destination primary storage subsystem 320a is taken as an example to describe the present virtual storage, but the migration destination secondary storage subsystem 320b also has a function to define virtual storages, so that the migration destination secondary storage subsystem 320b also has the function described below. It is possible for the migration source primary storage subsystem 310a and/or the migration source secondary storage subsystem 310b to have or not to have the function for defining virtual storages. If the migration source primary storage subsystem 310a and/or the migration source secondary storage subsystem 310b has a function to define virtual storages, and when a volume pair belonging to the virtual storage defined by the migration source primary storage subsystem 310a and/or the migration source secondary storage subsystem 310b is to be migrated, in the following description, the migration source storage subsystem will be the migration source virtual storage subsystem, the serial number of the migration source storage subsystem will be the virtual serial number, and the LDEV # will be the VLDEV #.

Figure 33:
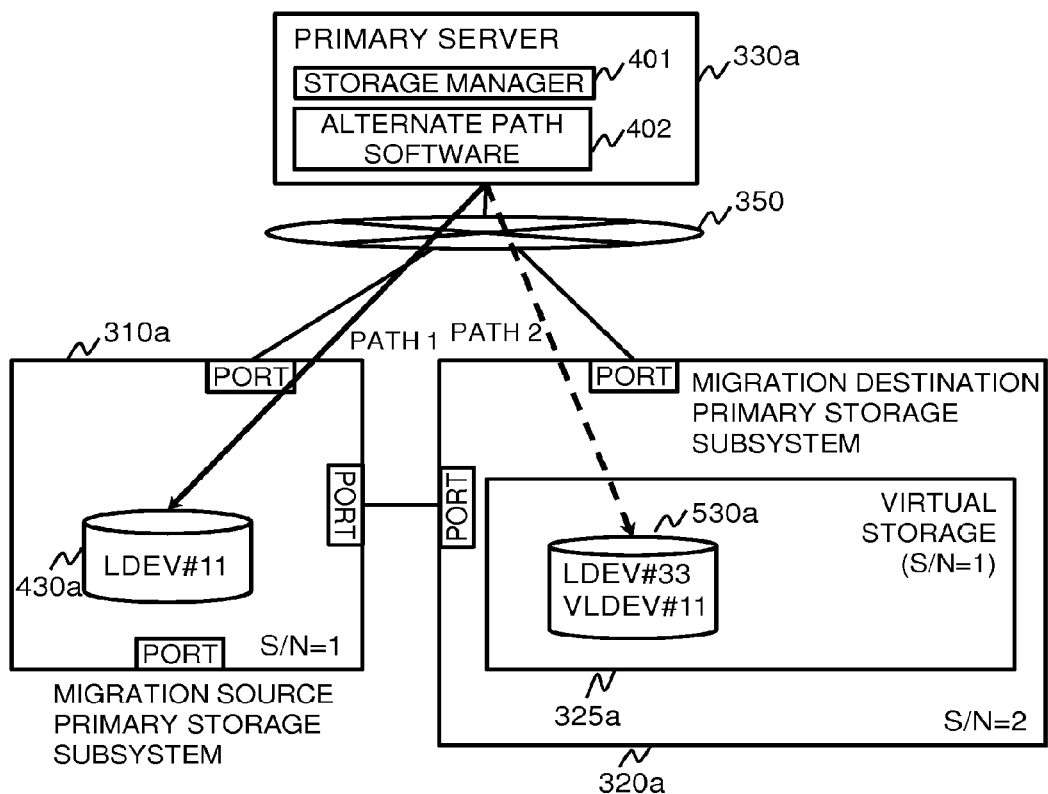
FIG. 33 is a view showing an example where a virtual storage is defined in a migration destination primary storage subsystem.

An example of having a virtual storage 325a defined in the migration destination primary storage subsystem 320a will be described with reference to FIG. 33. The virtual storage has a serial number (S/N) (hereinafter, the serial number of the virtual storage is referred to as "virtual serial number"), and can have a logical volume as the resource within the virtual storage. FIG. 33 illustrates a configuration example where the serial number of the migration source primary storage subsystem 310a is 1, the serial number of the migration destination primary storage subsystem 320a is 2, and the serial number of the defined the virtual storage 325a is 1 (which is the same as the serial number of the migration source primary storage subsystem 310a). According further to FIG. 33, the migration source primary storage subsystem 310a has a logical volume 430a whose LDEV # is 11, and the virtual storage 325a has a logical volume 530a whose LDEV # is 33.

The logical volume 530a in the virtual storage has a virtual identification number which differs from the LDEV #, and this is called a virtual LDEV # or a VLDEV #. The logical volume 530a in the virtual storage 325a of FIG. 33 has a VLDEV #11 (in other words, the number equal to the LDEV # of the logical volume 430a in the migration source primary storage subsystem 310a is assigned).

In this case, when the primary server 330a acquires information of the logical volume 530a by issuing a SCSI INQUIRY command or the like to the migration destination primary storage subsystem 320a, 11 is returned as the volume number and 1 is returned as the serial number. That is, the virtual serial number and the VLDEV # are returned to the primary server 330a. On the other hand, when the primary server 330a acquires information of the logical volume 430a from the migration source primary storage subsystem 310a, the same volume number (11) and the same serial number (1) as the logical volume 530a are returned.

Therefore, (the alternate path software 402 of) the primary server 330a recognizes these two volumes as the same volume, so that it determines that the alternate path of the path from the primary server 330a to the logical volume 430a (solid line arrow in the drawing; this path is hereinafter referred to as "path 1") is the path from the primary server 330*a* to the logical volume 530*a* (dotted line arrow in the drawing; this path is hereinafter referred to as "path 2").

Then, when path 1 is deleted, and the alternate path software 402 receives an access request to the logical volume 430*a* from an application program or the like, the alternate path software 402 issues an access request via path 2 (that is, issues an access request to the logical volume 530*a*).

The management information used for managing the virtual storage will be described with reference to FIG. 34. FIG. 34 illustrates a configuration of a V-BOX management table T1000 stored in the migration destination primary storage subsystem 320*a*. The V-BOX management table T1000 is stored in the shared memory 2042 of the migration destination primary storage subsystem 320*a*. Here, we will only describe the configuration of the V-BOX management table T1000 stored in the migration destination primary storage subsystem 320*a*, but according to Embodiment 1 of the present invention, during data migration operation, a virtual storage is also defined in the migration destination secondary storage subsystem 320*b*, so that the migration destination secondary storage subsystem 320*b* will also store the V-BOX management table T1000.

When defining a virtual storage, the migration destination primary storage subsystem 320*a* creates a management information called V-BOX within the storage subsystem 320. A V-BOX is the management information for managing the information of resources such as logical volumes that should belong to a certain virtual storage. A row (such as R1011 or R1012) in the V-BOX management table T1000 of FIG. 34 corresponds to the information representing a V-BOX.

The V-BOX is composed of an ID (T1001) which is an identifier of the V-BOX defined in the migration destination primary storage subsystem 320*a*, a model name information (T1002) of the V-BOX, a serial number (S/N) of the V-BOX, that is, the virtual serial number (T1003), a VLDEV # (T1004) assigned to the logical volume belonging to the V-BOX, and an LDEV # (T1005). The information on the virtual LDEV # and the LDEV # of the logical volume belonging to the virtual storage are respectively stored in the VLDEV # (T1004) and the LDEV # (T1005).

At the initial state, the migration destination primary storage subsystem 320*a* defines a single V-BOX having a serial number of the migration destination primary storage subsystem 320*a* set as the virtual serial number within the migration destination primary storage subsystem 320*a*. Hereinafter, this V-BOX is referred to as "virtual storage v0". In the initial state, only the information of row R1011 is stored in the V-BOX management table T1000. When logical volumes are created, all the created logical volumes will be in a state belonging to the virtual storage v0.

A virtual storage will be created when the migration destination primary storage subsystem 320*a* receives a command instructing to define a virtual storage together with the designation of the model name of the virtual storage and the virtual serial number from the storage manager 401 or the management terminal. However, immediately after the virtual storage is defined, a virtual storage having no logical volume belonging thereto is defined (in other words, no information of logical volume is stored in the fields of T1004 and T1005). When the migration destination primary storage subsystem 320*a* receives an instruction to have a logical volume belong to the virtual storage after defining a virtual storage, the logical volume information (virtual LDEV # and LDEV #) are stored in the fields of T1004 and T1005 of the V-BOX management table 1000.

We will describe the virtual LDEV management table T1500 which is used when registering information on the logical volume to the V-BOX management table 1000 with reference to FIG. 35. The virtual LDEV management table T1500 is a table for managing the corresponding relationship between the LDEV # of the logical volume and the VLDEV #, composed of fields of LDEV # (T1501), VLDEV # (T1502), ID (T1503), and attribute (T1504).

The virtual LDEV # assigned to the logical volume specified by the LDEV # (T1501) is stored in the VLDEV # (T1502). In the initial state, the same values are stored in the LDEV # (T1501) and the VLDEV # (T1502) for all logical volumes. However, the VLDEV # (T1502) can be changed by the instruction from the exterior (such as the storage manager 401) or the like. Further, the value of VLDEV # (T1502) can be set to an invalid value (NULL) by the instruction from the exterior.

The ID, which is the identifier of the V-BOX to which the logical volume belongs, is stored in the ID (T1503).

Information showing whether the logical volume is registered (reserved) in the virtual storage or not is stored in the attribute (T1504). If the logical volume is registered (reserved) in the virtual storage, "reserved" is stored in the attribute (T1504).

The LDEV # which is to be registered in the virtual LDEV management table T1500 or the V-BOX management table 1000 can be registered independently from whether the logical volume is in a created state or not (whether the information of logical volume is registered in the logical volume management table T200 or not). Therefore, even when a logical volume is not created, the migration destination primary storage subsystem 320*a* can execute a process to register a logical volume to the virtual storage.

As an example, information on three logical volumes having LDEV # (T201) 33, 44 and 55 is stored in the logical volume management table T200 of FIG. 30. In other words, when the state of the logical volume management table T200 of the migration destination primary storage subsystem 320*a* is in the state shown in FIG. 30, the migration destination primary storage subsystem 320*a* is in a state where three logical volumes are created. Even in this state, it is possible to perform a process to have a logical volume not registered in the logical volume management table T200, such as a logical volume having LDEV #2, belong to the virtual storage.

As described earlier, it is possible to change the VLDEV # associated with the LDEV # later, and according to Embodiment 1 of the present invention, this operation is called "virtualization". For example, if the migration destination primary storage subsystem 320*a* receives an instruction to assign number 11 as a virtual LDEV # to the logical volume having LDEV #44, the migration destination primary storage subsystem 320*a* stores 11 in the VLDEV # (T1501) corresponding to the row where the LDEV # (T1502) is 44 in the virtual LDEV management table T1500, and stores 11 in the VLDEV # (T1004) corresponding to the row where the LDEV # (T1005) is 44 in the V-BOX management table 1000.

When virtualization is performed in the migration destination primary storage subsystem 320*a* according to Embodiment 1 of the present invention, the following steps are to be performed. The outline of the flow of the process for having the logical volume with an LDEV #2 belong to the virtual storage v1 (virtual storage where ID (T1001) is v1 in the V-BOX management table T1000), and assigning VLDEV #4 by virtualization will be described. In the following description, the logical volume having LDEV # n is abbreviated as "LDEV # n". Further, we will assume a state where the LDEV #2 belongs to the virtual storage v0, and the VLDEV # corresponding to LDEV #2 is 2.

At first, the migration destination primary storage subsystem 320*a* sets the VLDEV # associated with LDEV #2 to NULL. Thereby, the VLDEV # (T1502) of the row where the LDEV # (T1501) is 2 in the virtual LDEV management table T1500 is set to NULL. Further, "reserved" is entered in attribute T1504 of the virtual LDEV management table T1500. Next, the ID (T1503) in the same row is referred to, and when it is recognized that the V-BOX in which the LDEV # belongs is "v0", the VLDEV # (T1004) of the row where the LDEV # (T1005) is 2 is set to NULL in the row R1011 of the V-BOX management table T1000.

Next, a process to set the LDEV #2 to belong to the virtual storage v1 is carried out. The migration destination primary storage subsystem 320*a* stores 2 in the field of LDEV # (T1005) of row R1012 of the V-BOX management table T1000. Further, NULL is stored in the corresponding VLDEV # (T1004). Value "v1" is stored in the ID (T1503) of the row corresponding to LDEV #2 of the virtual LDEV management table T1500.

Thereafter, LDEV #2 is virtualized. The migration destination primary storage subsystem 320*a* stores 4 in VLDEV # (T1004) corresponding to the row where the LDEV # T1005 is 2 stored in the V-BOX management table T1000. Value 4 is also stored in the VLDEV # (T1502) of the row corresponding to LDEV #2 in the virtual LDEV management table T1500.

Although it will be described in detail later, when a pair operation is performed to a volume pair belonging to a virtual storage in the computer system according to Embodiment 1 of the present invention, a control instruction for pair operation, which includes the information related to the virtual serial number and the virtual LDEV # as identification information for specifying the P-VOL and the S-VOL, and the information notifying that the virtual identifier is used in the command, is issued to the storage subsystem. When the storage subsystem (such as the migration destination primary storage subsystem 320*a*) receives information related to the virtual serial number and the virtual LDEV # as the identifier of the P-VOL and the S-VOL, the virtual LDEV # is converted to the LDEV # by referring to the V-BOX management table T1000, and the logical volume being the processing target is specified. If information stating that the virtual identifier is used is not included in the command, and when the virtual serial number contained in the command and the serial number of the storage subsystem having received the command do not correspond, the storage subsystem rejects the command.

(7) Function of Storage Manager

The storage manager 401 is a program for configuring and controlling the storage subsystem from the primary server 330*a* or the secondary server 330*b*. The respective storage subsystems of the computer system according to Embodiment 1 of the present invention are respectively controlled from the storage manager 401. In the following, the functions of the storage manager 401 and the configuration information used by the storage manager 401 uses will be described.

The storage manager 401 is a program used when the administrator or a program such as the cluster software 403 performs management operation of the storage subsystem. The term "management operation" used here refers to the setup operation for configuring an LU path or the like, or a pair operation using the remote copying function.

The storage manager 401 supports some commands for management operation, and the administrator or a program such as the cluster software 403 issues the commands to the storage manager 401 to perform management operation of the storage subsystem. The storage manager 401 processes the received command, and creates a control instruction to be issued to the storage subsystem. Then, the created control instruction is issued to the command device defined in the storage subsystem. The storage subsystem having received the control instruction performs a given process (such as configuring an LU path) in response to the contents of the received control instruction. Therefore, a command device is defined in the respective storage subsystems existing in the computer system according to Embodiment 1 of the present invention.

There are mainly two types of commands for management operation supported in the storage manager 401. The first type of command is a command for operating the volume pair using the volume copying function (local copying function, remote copying function) and the volume migrating function (hereinafter, this command is referred to as "pair operation command").

The second type of command is a command other than the pair operation command, including a command for configuring the storage subsystem, including configuring an LU path (hereinafter, this command is referred to as "configuration command"). The storage manager 401 can perform all configuration processes other than the process for creating the command device from the various configuration processes of the storage subsystem required in the migration process described hereinafter.

There are commands required to designate the identifiers of the operation target logical volumes when issuing a command. Examples of such commands include a command for creating a volume pair, or a command for configuring an LU path. When a virtual LDEV # is assigned to the operation target logical volume, there occurs a problem on whether to designate the virtual LDEV # or to designate the LDEV # as the identifier of the logical volume to be designated. According to the storage manager 401 of a preferred embodiment of the present invention, in the configuration commands, LDEV # is used as the identifier for specifying the logical volume, not the virtual LDEV #. Further, virtual LDEV # is used as the identifier for specifying the logical volume designated by the pair operation commands (or a configuration file described later).

The storage manager 401 operates as a resident program (service) of an operating system (OS) operating in the host computer (primary server 330*a* or secondary server 330*b*). In the present embodiment, this resident program is called "instance". Multiple instances can be operated in one host computer. To start the operation of an instance is referred to as "starting an instance".

When an instance is started, a number called an instance number is designated. Each instance reads one configuration file according to the designated instance number (a file name including an instance number is assigned to a configuration file, and the instance reads the file including the instance number in the file name).

As will be described later, various information are stored in the configuration file, and at least the command device information to be used is stored therein. Each instance specifies the command device to which the control instruction is to be issued, based on the information of the command device stored in the configuration file. For example, when two instances are started (hereinafter, the two instances are respectively referred to as "instance 0" and "instance 1"), if the information of the command device of the migration source primary storage subsystem 310*a* is stored in the configuration file for instance 0, and if the information of the command device of the migration destination primary storage subsystem 320*a* is stored in the configuration file for instance 1, instance 0 can be used for performing management operation of the migration source primary storage subsystem 310*a*, and instance 1 can be used for performing management operation of the migration destination primary storage subsystem 320*a*.

Further, by storing the information of the same command device in both the configuration file for instance 0 and the configuration file for instance 1, both instances can be used for performing management operation of the same storage subsystem. This is preferable in a case where one instance is used for configuration purpose, such as for configuring LU paths, and the other instance is used for the purpose of pair operation.

Further, when the storage manager 401 is used to perform control (pair operation) of the remote copying function in the storage subsystem, at least one instance is started respectively at the host computer accessing the P-VOL (primary server 330*a*) and the host computer accessing the S-VOL (secondary server 330*b*).

Figure 36:
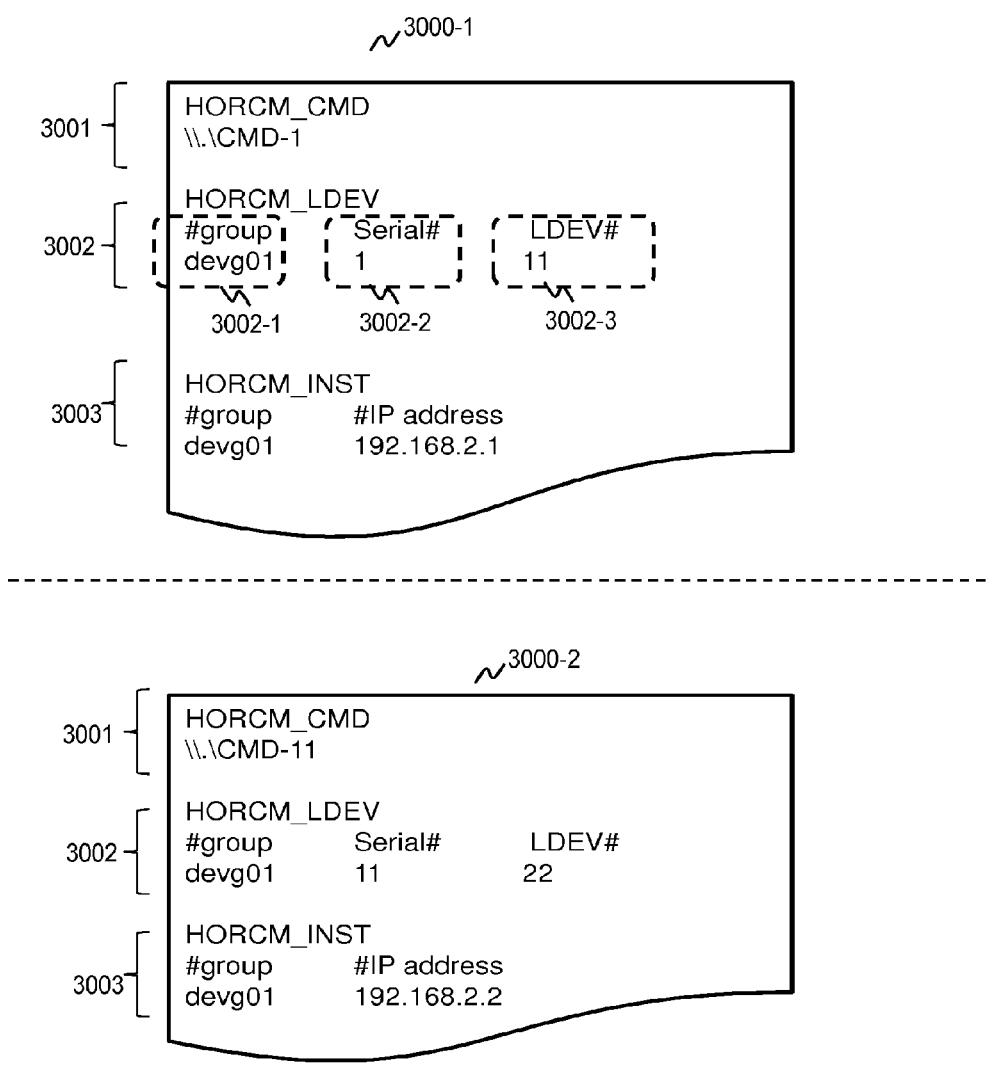
FIG. 36 illustrates an example of a configuration file used by a storage manager.

An example of a configuration file for performing control of the remote copying function will be illustrated in FIG. 36. A configuration file 3000-1 is a configuration file stored in the primary server 330*a*, and a configuration file 3000-2 is a configuration file stored in the secondary server 330*b*. The configuration file 3000-1 is a configuration file for performing pair operation in the migration source primary storage subsystem 310*a*, and the configuration file 3000-2 is a configuration file for performing pair operation in the migration source secondary storage subsystem 310*b*. The drawing illustrates an example where the LDEV # of the P-VOL is 11, the serial number of the storage subsystem to which the P-VOL belongs (migration source primary storage subsystem 310*a*) is 1, the LDEV # of the S-VOL is 22, and the serial number of the storage subsystem to which the S-VOL belongs (migration source secondary storage subsystem 310*b*) is 11.

Three types of information are stored in the respective configuration files 3000-1 and 3000-2. The first information is the information of the command device described earlier, and an identifier of the command device to which the instance issues the control instruction is stored in the field of a command device name 3001. The name of an identifier of the command device is determined uniquely for each storage subsystem, and that name is recorded when creating a configuration file.

The second information is the information related to a volume pair, wherein the information on a volume pair being the target of operation by the remote copying function is stored in a pair information field 3002. The form of description will be described later.

The third information is the information 3003 on a counterpart host computer. When performing control of the remote copying function of the storage subsystem using the storage manager 401, the instance of the primary server 330*a* acquires information regarding the S-VOL and the like from the instance of the secondary server 330*b*. The information 3003 regarding the counterpart host computer is used for that purpose, and the IP address of the counterpart host computer is described therein.

We will now describe the form of description of the pair information field 3002, which is the second information. A group name 3002-1, a device serial number 3002-2, and an LDEV # (3002-3) are stored in the pair information field 3002. An LDEV # of one logical volume of the volumes constituting the volume pair is described in the LDEV #3002-3. A serial number (S/N) of the device in which the LDEV exists is stored in the device serial number 3002-2. A group name assigned to the volume pair is described in the group name 3002-1. The details of the group name 3002-1 will be described later.

The configuration file of the primary server 330*a* stores an LDEV # of a P-VOL existing in a migration source (or migration destination) primary storage subsystem (310*a* or 320*a*), and an LDEV # of an S-VOL existing in a migration source (or migration destination) secondary storage subsystem (310*b* or 320*b*) is stored in a configuration file of the secondary server 330*b*. Moreover, the same group name must be assigned at least to the LDEVs in a pair relationship. In the example of FIG. 36, it is described that the logical volume having LDEV # (3002-3) 11 and the logical volume having LDEV # (3002-3) 22 are in a pair relationship, and the group name (3002-1) thereof is "devg01".

When the administrator or a program such as the cluster software 403 performs a volume pair operation using (the instance of) the storage manager 401, the group name is used as information for specifying the volume pair being the operation target. For example, the format of the command for instructing pair creation is as follows:

paircreate <group name>

When this command is issued to an instance operating in the primary server 330*a*, the instance operating in the primary server 330*a* specifies the LDEV # (3002-3) and the device serial number (3002-1) corresponding to the group name designated by the command, based on the contents of the configuration file. Further, by communicating with the instance operating in the secondary server 330*b*, the LDEV # (3002-3) and the device serial number (3002-1) corresponding to the group name described in the configuration file for the instance operating in the secondary server 330*b* is acquired. Thereby, the instance operating in the primary server 330*a* can specify the LDEV # and the device serial number of the P-VOL and S-VOL. Based on this information, a control instruction to be issued to the command device is created, and the control instruction for pair operation is issued to the command device.

Further, the same group name can be assigned to multiple volume pairs, and in that case, the pair operation of multiple volumes will be performed when the above-mentioned pair operation command is issued.

This configuration file is created by an administrator of a computer system. When volume pair control is performed by the migration source storage system 310, the LDEV # of the P-VOL or S-VOL of the migration source storage system 310 and the serial number of the migration source storage system 310 are stored in the LDEV # (3002-3) and the serial number 3002-1. When the volume pair is migrated to the migration destination storage system 320 via volume migration, the serial number and the LDEV # will be changed, but in that case, the administrator must rewrite the configuration file. In other words, the serial number and the LDEV # must be rewritten to the serial number and the LDEV # of the migration destination storage system. This operation takes up much time, especially when the number of volumes increases.

Next, the example of a configuration file of a case where the virtual storage is defined in the storage subsystem and the logical volume being the target of pair operation belongs to a virtual storage subsystem will be described with reference to FIG. 37. The example of FIG. 37 illustrates a case where the virtual storage is defined in the migration destination storage system, wherein the virtual LDEV # of the P-VOL is 11, the virtual serial number of the virtual storage to which the P-VOL belongs is 1, the virtual LDEV # of the S-VOL is 22, and the virtual serial number of the virtual storage to which the S-VOL belongs is 11 (in other words, the virtual serial numbers assigned to the P-VOL (referred to as migration destination P-VOL) and the S-VOL (referred to as migration destination S-VOL) in the migration destination storage system are the same as the serial numbers of the migration source primary storage subsystem 310a and the migration source secondary storage subsystem 310b respectively, and the virtual LDEV # of the migration destination P-VOL and the migration destination S-VOL are the same as the LDEV # of the P-VOL (migration source P-VOL) of the migration source primary storage subsystem 310a and the LDEV # of the S-VOL (migration source S-VOL) of the migration source secondary storage subsystem 310b respectively).

As mentioned earlier, when the storage subsystem in which the virtual storage is defined receives the instruction of pair operation to the volume pair belonging to the virtual storage, it operates by receiving the information on the virtual serial number and the virtual LDEV # as identifiers of the P-VOL and S-VOL from the storage manager 401. Therefore, as the information of the volume pair described in the configuration file, the virtual serial number and the virtual LDEV # are described as information for specifying the P-VOL and S-VOL.

Figure 37:
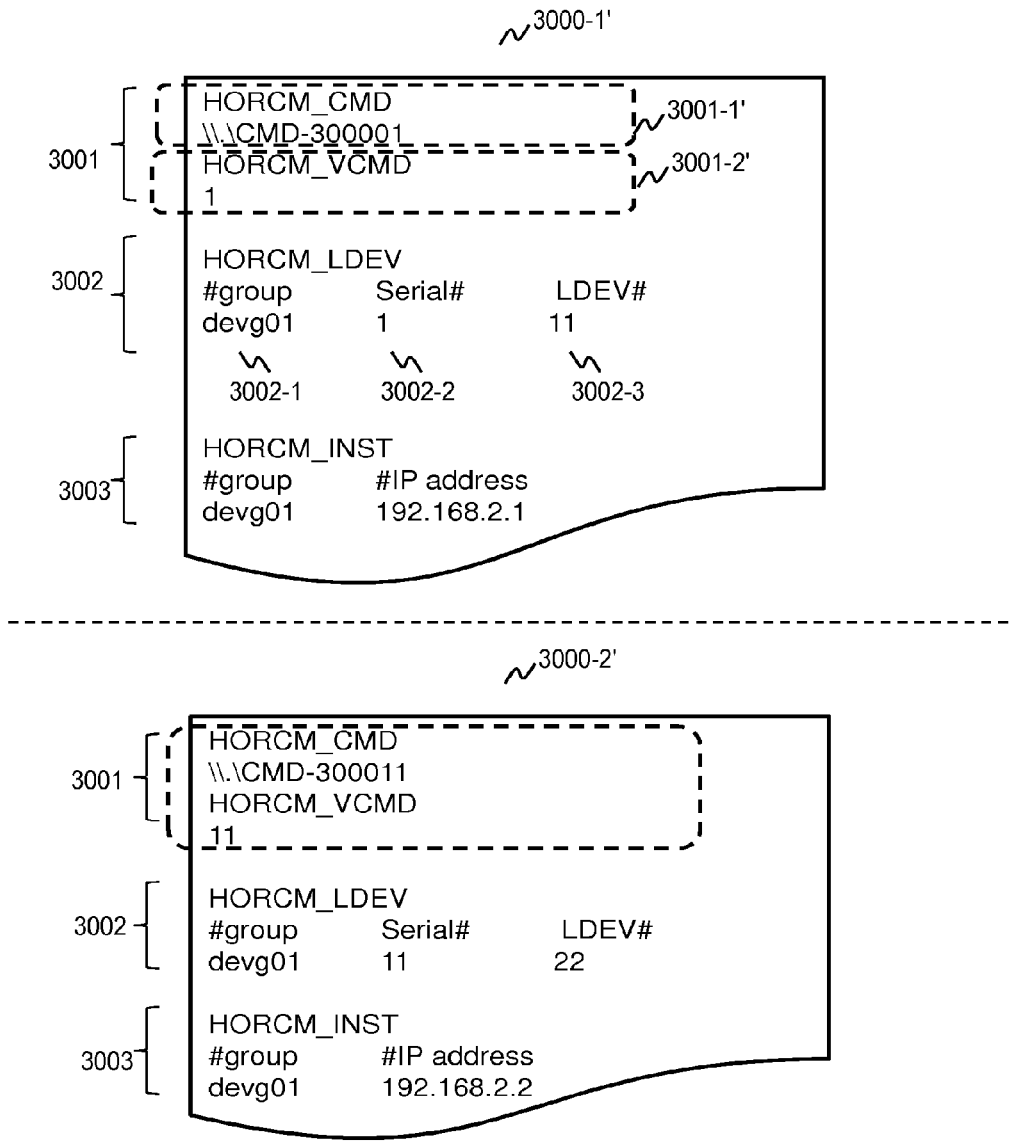
FIG. 37 illustrates an example of a configuration file used by the storage manager.

In FIG. 37, file 3000-1' is the configuration file for the migration destination primary storage subsystem 320a, and file 3000-2' is the configuration file for the migration destination secondary storage subsystem 320b. Now, taking file 3000-1' as an example, the difference from the configuration file of FIG. 36 will be described.

Compared with the configuration file illustrated in FIG. 36, the only difference is that the contents of block 3001 are changed to blocks 3001-1' and 3001-2'. Block 3001-1' shows an identifier of the command device which is the destination to which the storage manager 401 issues a command. Block 3001-2' shows the information (HORCM_VCMD), indicating that a command is issued to the virtual storage and the virtual serial number (1) of the virtual storage.

The points other than the block 3001 are the same as the configuration file of FIG. 36. Therefore, when the migration destination storage system according to the present embodiment is used, it will not be necessary to change the configuration file when migrating a volume from the migration source storage system to the migration destination storage system, and the operation load related to migration can be cut down significantly.

Figure 38:
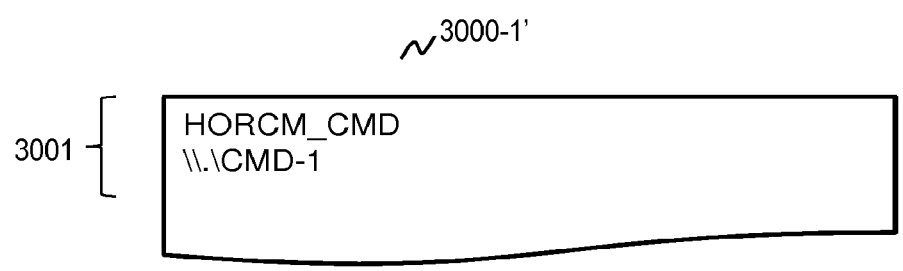
FIG. 38 illustrates an example of a configuration file used by the storage manager.

Another example of the configuration file will be illustrated in FIG. 38. Only the field of command device name 3001 exists in the configuration file 3000-1' illustrated in FIG. 38. When an instance used only for the purpose of configuration such as LU path configuration is started, only the field of the command device name 30001 should be defined.

Outline of Migration Process

Figure 39:
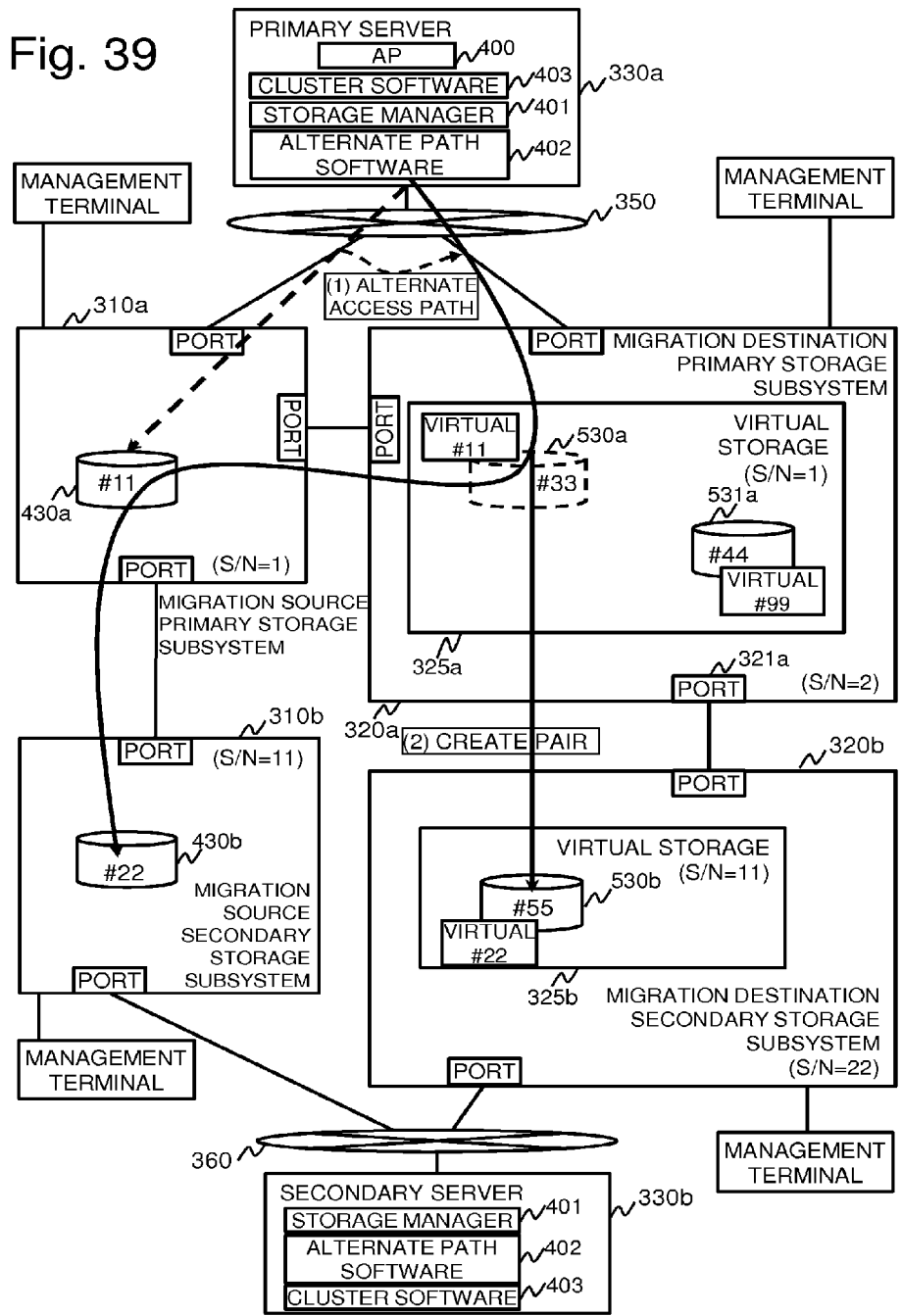
FIG. 39 is a view showing an outline of a migration process in a computer system according to Embodiment 1 of the present invention.

FIG. 39 is a view showing an outline of a migration process of a computer system according to Embodiment 1 of the present invention. The migration source primary storage subsystem 310a and the migration source secondary storage subsystem 310b have a remote copying function. By the operation of a remote copying function, the logical volume 430a of the migration source primary storage subsystem 310a and the logical volume 430b of the migration source secondary storage subsystem 310b are in a pair relationship, wherein the logical volume 430a is the P-VOL and the logical volume 430b is the S-VOL. In other words, the data written from the primary server 330a to the logical volume 430a of the migration source primary storage subsystem 310a is copied to the logical volume 430b of the migration source secondary storage subsystem 310b, so that a state is kept where replication of data of the logical volume 430a is constantly stored in the logical volume 430b ("pair" state). Hereinafter, the logical volume 430a is referred to as "migration source P-VOL" and the logical volume 430b is referred to as "migration source S-VOL".

According to the volume migration method of Embodiment 1 of the present invention, the logical volume 430a and the logical volume 430b in "pair" state migrates to the migration destination storage system 320 while maintaining the "pair" state. At first, a virtual storage 325a is created in the migration destination primary storage subsystem 320a. Then, a logical volume 530a which is to be a migration destination primary volume and a logical volume 531a are created in the virtual storage 325a. Similarly, a virtual storage 325b is created in the migration destination secondary storage subsystem 320b, and a logical volume 530b as a migration destination secondary volume is created in the virtual storage 325b.

A virtual serial number (1) which is the same serial number (S/N=1) as the migration source primary storage subsystem 310a is set to the virtual storage 325a. Further, a virtual serial number (11) which is the same serial number (S/N=11) as the migration source secondary storage subsystem 310b is set to the virtual storage 325b. Further, a virtual LDEV # which is the same number as the LDEV # of the migration source P-VOL is assigned to the logical volume 530a, and a virtual LDEV # which is the same number as the LDEV # of the migration source S-VOL is assigned to the logical volume 530b.

When creating a logical volume 530a, the logical volume 430a is associated as the storage area by the external storage connecting function. Therefore, the logical volume 530a is sometimes referred to as being "mapped to the logical volume 430a". On the other hand, the logical volume 531a is a logical volume which is created using the parity group 322a within the migration destination primary storage subsystem 320a (parity group 322a illustrated in FIG. 26) as the storage area. The logical volume 530a and the logical volume 531a are created as volumes having the same size as the logical volume 430a. The entity (the storage area in which data is stored) of the logical volume 530a exists in the external storage subsystem (migration source primary storage subsystem 310a).

Thereafter, by switching the access route (path) to the logical volume of the primary server 330a, the configuration can be changed so that the primary server 330a accesses the logical volume 530a which is the migration destination P-VOL, instead of the logical volume 430a (migration source P-VOL). Since the logical volume 530a is mapped to the logical volume 430a, when the primary server 330a writes data to the logical volume 530a, the data is transferred from the migration destination primary storage subsystem 320a to the migration source primary storage subsystem 310a, and written to the logical volume 430a. Further, when the primary server 330a issues a read request to the logical volume 530a, data is read from the logical volume 430a, and the read data is transferred from the migration source primary storage subsystem 310a to the migration destination primary storage subsystem 320a, and returned from the migration destination primary storage subsystem 320a to the primary server 330a. Since the logical volume 530a has the same volume number (virtual volume number) as the logical volume 430a assigned thereto, the primary server 330a recognizes that the logical volume 530a is the same volume as the logical volume 430a, though the access route to the primary server 330a was changed to the migration destination primary storage subsystem 320a.

Next, by the operation of the remote copying function of the migration destination storage system 320, a volume copying process is performed between the logical volume 530a and the logical volume 530b. Thereby, data is sequentially read from the logical volume 530a (actually, the logical volume 430a), and replicated to the logical volume 530b. During this replication process, the primary server 330a can issue I/O requests to the logical volume 530a. When the primary server 330a issues a write request to the logical volume 530a, write data is written to the logical volume 530a (actually, the logical volume 430a), and the replica of the write data is also stored in the logical volume 530b. Since the "pair" state of the logical volume 430a and the logical volume 430b is maintained in the migration source storage system 310, the replica of data of the logical volume 430a is stored in the logical volume 430b in addition to the logical volume 530b.

At the point of time when volume copy between the logical volume 530a and the logical volume 530b is completed and the contents of the two volumes become identical (that is, at the point of time when the pair status becomes "pair"), the access route to the logical volume of the secondary server 330b is switched and the configuration is changed so that the secondary server 330b accesses the logical volume 530b, and not the logical volume 430b. Even when the primary server 330a or the migration destination primary storage subsystem 320a stops due to failure, operation can be continued by using the secondary server 330b and the migration destination secondary storage subsystem 320b. However, at this point of time, the data of the logical volume 530a does not exist in the migration destination primary storage subsystem 320a. This is because the entity of the logical volume 530a is the logical volume 430a of the migration source primary storage subsystem 310a, and unless the entity of the logical volume 530a is migrated to the migration destination primary storage subsystem 320a, migration is not completed. Therefore, by using the volume migrating function, the migration destination primary storage subsystem 320a migrates the contents of the logical volume 530a to the logical volume 531a.

According to this migration process, the migration destination primary storage subsystem 320a replicates the contents of the logical volume 530a to the logical volume 531a. At this time, the entity of the data in the logical volume 530a is in the logical volume 430a, so that actually, the data is copied from the logical volume 430a to the storage area associated with the logical volume 531a. At the point of time when the replication has been completed, the migration destination primary storage subsystem 320a switches the roles of the logical volume 530a and the logical volume 531a. As a result, the logical volume 531a becomes the volume pair of the logical volume 530b, and the volume number of the logical volume 531a is changed to the volume number which has been assigned to the logical volume 530a.

Figure 40:
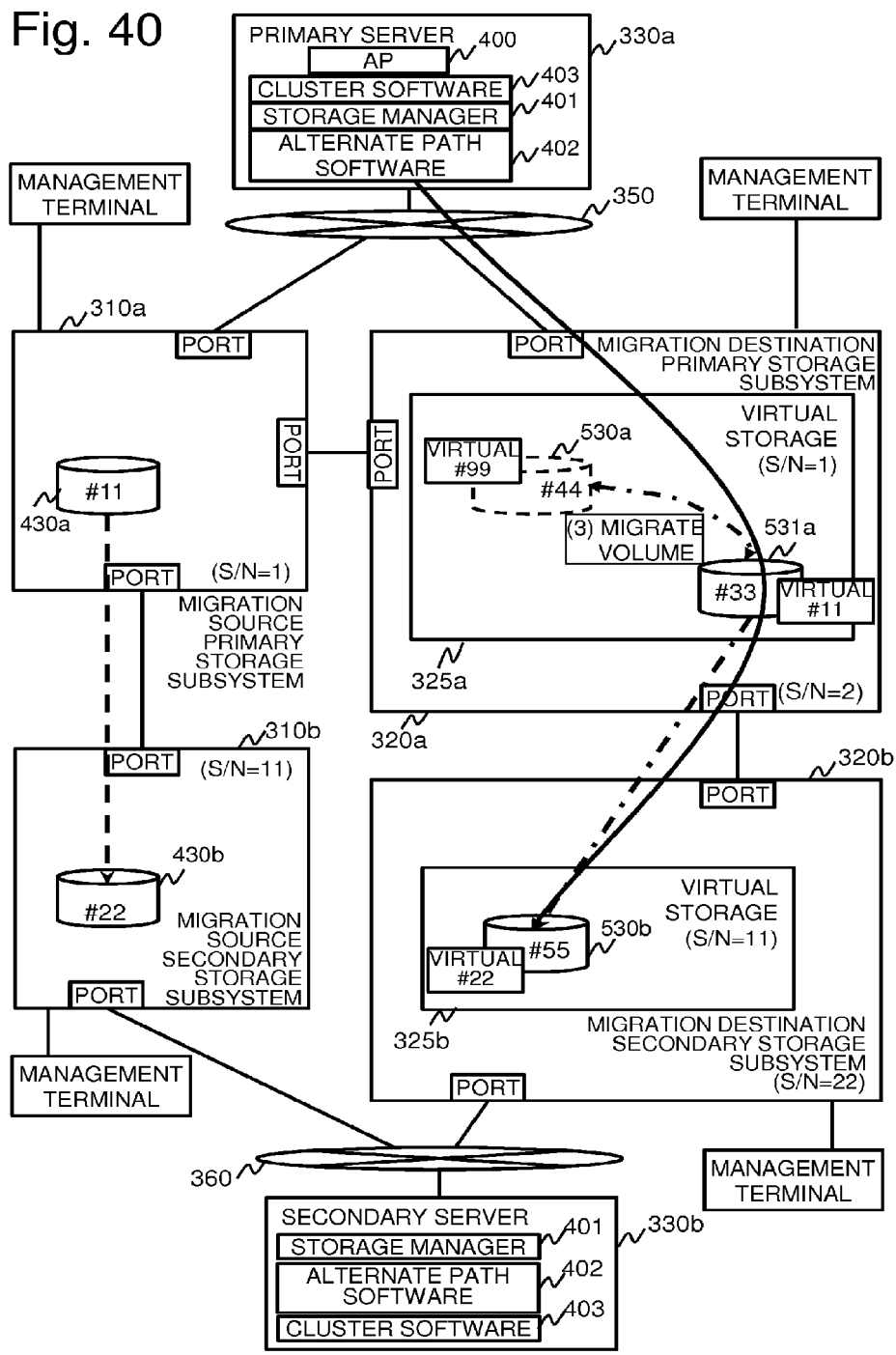
FIG. 40 is a view illustrating a state after the migration process is performed in a computer system according to Embodiment 1 of the present invention.

FIG. 40 illustrates a state after the roles of the logical volume 530a and the logical volume 531a have been switched by the volume migrating function. Since the write data will no longer be transmitted to the migration source primary storage system 310 even when a write request arrives from the primary server 330a, the migration source storage system 310 becomes the state where it can be removed (that is, the migration of the volume pair has been completed).

Flow of Migration Process

Figure 41:
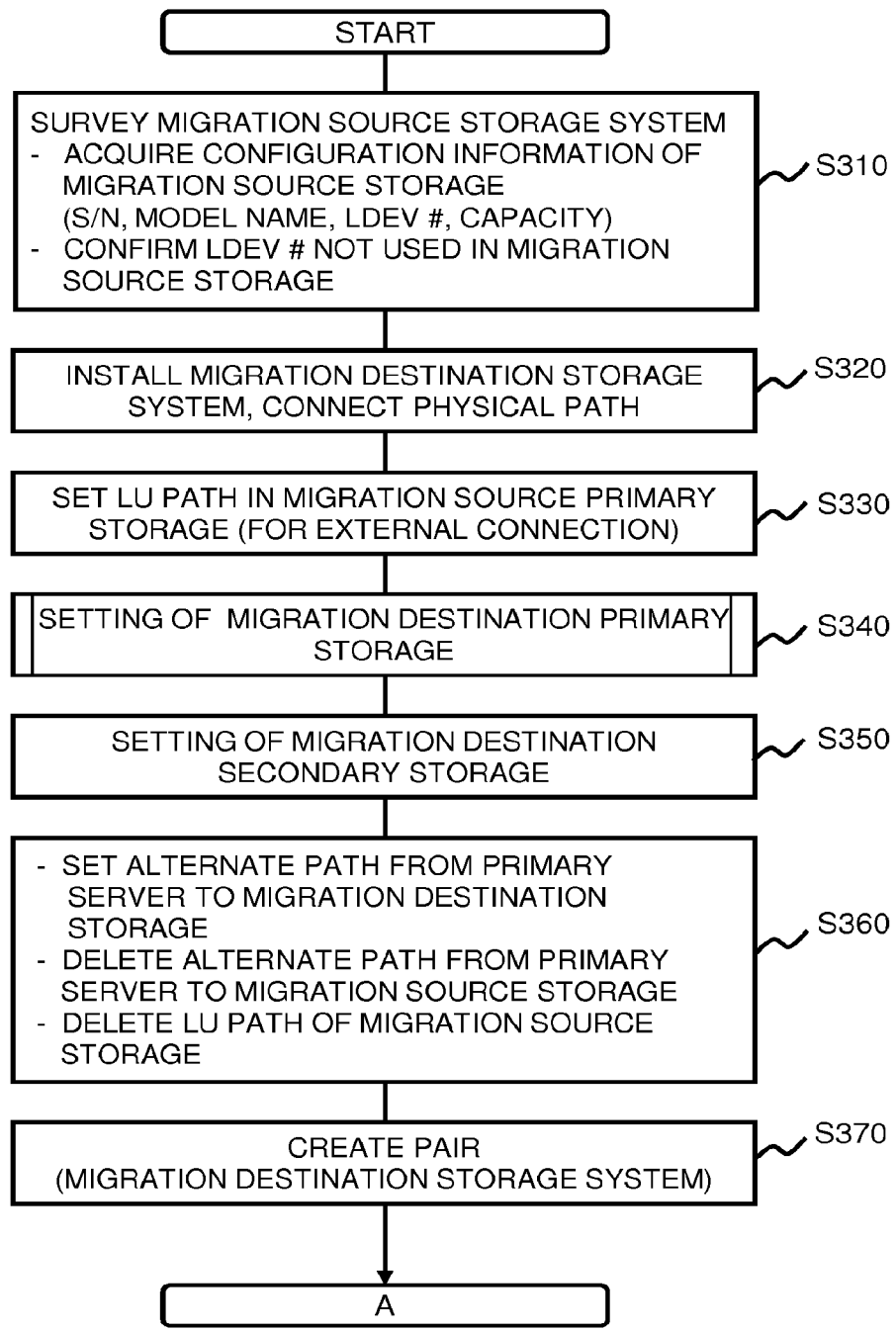
FIG. 41 is a flowchart (1) of a volume migration process in a computer system according to Embodiment 1 of the present invention.
Figure 42:
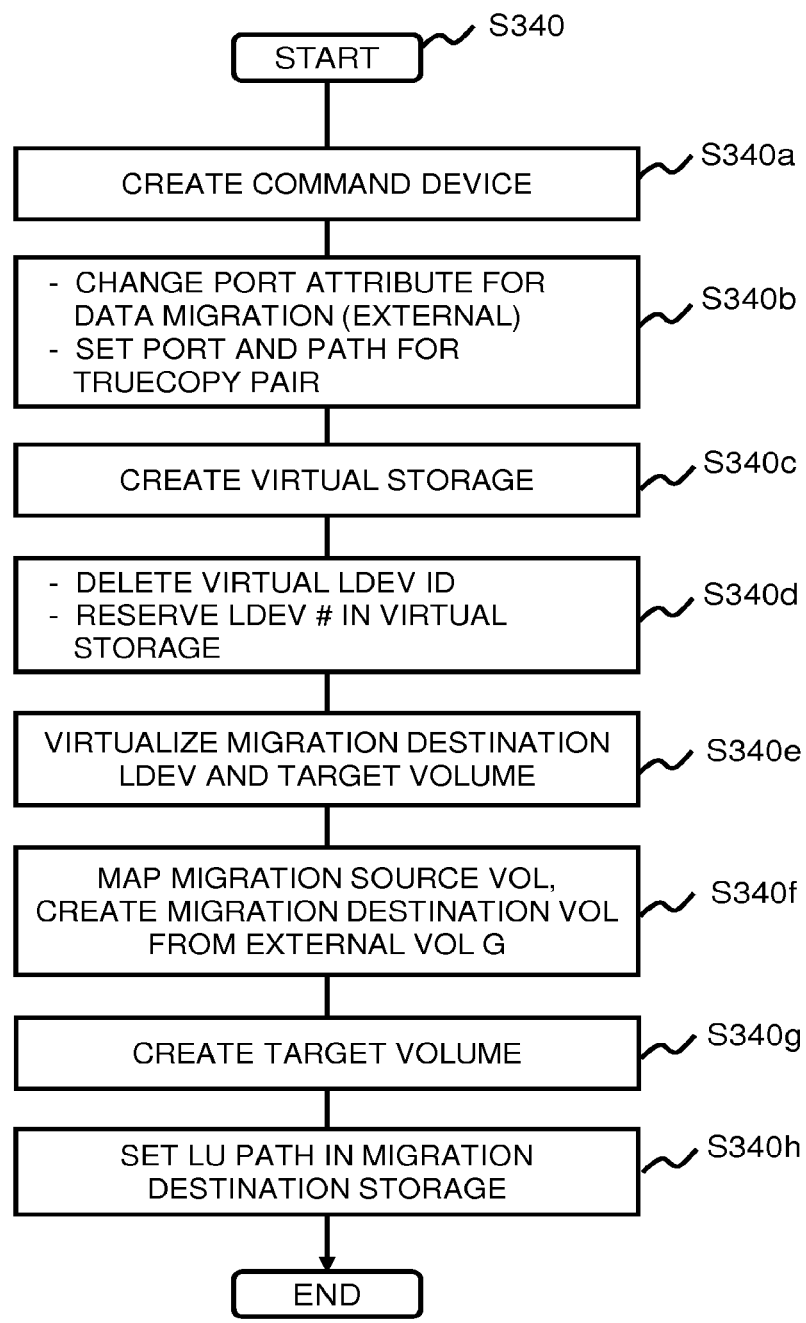
FIG. 42 is a flowchart (2) of a volume migration process in a computer system according to Embodiment 1 of the present invention.
Figure 43:
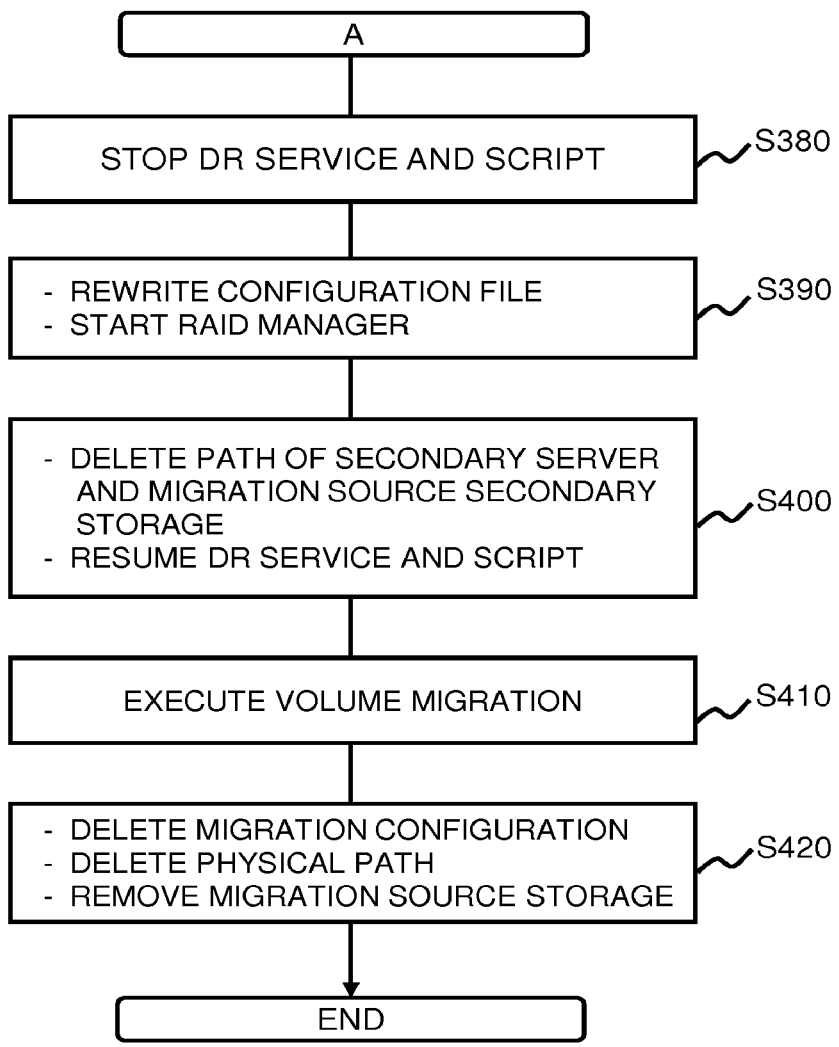
FIG. 43 is a flowchart (3) of a volume migration process in a computer system according to Embodiment 1 of the present invention.

Next, the flow of the volume migration process according to the computer system 1 of Embodiment 1 of the present invention will be described with reference to the flowcharts of FIGS. 41, 42, and 43. In the following description, only the migration process of one volume pair (a set composed of P-VOL and S-VOL) will be described for simplified description, but it is possible to perform migration of multiple volume pairs at the same time.

At first, the storage manager 401 investigates the configuration of the migration source storage system (S310). Through the investigation of the configuration of the migration source storage system, the following information is mainly acquired.

(a) The serial number (S/N) and the model name of the migration source primary storage subsystem 310a and the migration source secondary storage subsystem 310b.

(b) The LDEV # and size of the migration target P-VOL and S-VOL.

(c) The LDEV # not used in the migration source primary storage subsystem 310a and the migration source secondary storage subsystem 310b.

When investigating these information, the storage manager 401 issues a control instruction for acquiring configuration information to the migration source primary storage subsystem 310a and the migration source secondary storage subsystem 310b. When the storage subsystem receives a control instruction for acquiring configuration information, it returns information such as the serial number of the device, the LDEV #, and the size of the logical volume defined within the storage subsystem. As one example of the information of the logical volume defined within the storage subsystem, the contents of the logical volume management table T200 are returned. By referring to the LDEV #s (T201) of the logical volume management table T200, the administrator can determine that the LDEV #s which are not stored in the LDEV #s (T201) are the "unused LDEV #s".

The migration process described below illustrates an example where the configurations of the respective storage subsystems are set as follows.

(a) The LDEV # of the P-VOL of the migration source primary storage subsystem 310a (referred to as migration source P-VOL) is 11, and the size thereof is 100 GB.

(b) The LDEV # of the S-VOL of the migration source secondary storage subsystem 310b (referred to as migration source S-VOL) is 22, and the size thereof is 100 GB.

(c) The serial number of the migration source primary storage subsystem 310a is 1.

(d) The serial number of the migration source secondary storage subsystem 310b is 11.

(e) The serial number of the migration destination primary storage subsystem 320a is 2.

(f) The serial number of the migration destination secondary storage subsystem 320b is 22.

Further, we will assume a case where, as a result of the investigation of the unused LDEV #s in the migration source primary storage subsystem 310a and the migration source secondary storage subsystem 310b in S310, the logical volumes having the following LDEV #s are determined to be used as the logical volumes used as the migration destination P-VOL, the migration destination S-VOL, and the target volume of the volume migrating function.

(g) The LDEV # of the logical volume selected as the P-VOL of the migration destination primary storage subsystem 320a (referred to as migration destination P-VOL) is 33.

(h) The LDEV # of the logical volume selected as target volume of the volume migrating function in the migration destination primary storage subsystem 320a is 44, and the virtual LDEV # thereof is 99.

(i) The LDEV # of the S-VOL of the migration source secondary storage subsystem 310b (referred to as migration source S-VOL) is 55.

Further, the instance numbers of the storage manager 401 operating in the primary server 330a and the secondary server 330b and the configuration file used by the respective instances are specified. In the following example, we will assume that the instance numbers of the instances operating in the primary server 330a and the secondary server 330b are 100 and 101, respectively. In the following description, we will describe the case where the contents of the configuration file are as illustrated in FIG. 36.

Thereafter, a migration destination storage system is installed, and the migration destination storage system is connected to the host computer or other storage subsystems via Fibre Channel cables (S320). The transmission line such as the Fibre Channel cable connecting the storage subsystem to the host computer or connecting storage subsystems mutually is referred to as "physical path", and the operation for connecting the storage subsystems to the host computers via physical paths or for connecting storage subsystems mutually via physical paths is referred to as "connecting physical paths".

In the operation for connecting physical paths, the following physical paths are connected.

(a) The physical paths between the migration destination primary storage subsystem 320a (port J, port K) and the primary server 330a.

(b) The physical paths between the migration destination secondary storage subsystem 320b (port Q, port R) and the secondary server 330b.

(c) The physical path between the migration source primary storage subsystem 310a (port C) and the migration destination primary storage subsystem 310b (port L).

(d) The physical paths between the migration destination primary storage subsystem 320a (port M, port N) and the migration destination secondary storage subsystem 320b (port O, port P).

In the description, (a) are the physical paths for communicating the I/O requests between the primary server 330a and the migration destination primary storage subsystem 320a, and for sending instructions to the command device of the migration destination primary storage subsystem 320a. Further, (b) are the physical paths for communicating the I/O requests between the secondary server 330b and the migration destination secondary storage subsystem 320b, and for sending instructions to the command device of the migration destination secondary storage subsystem 320b.

Moreover, (c) is a physical path used for data migration, which is used for mapping a migration source volume (P-VOL) of the migration source primary storage subsystem 310a to the migration destination primary storage subsystem 320a with an external storage connecting function. According to Embodiment 1, an example is illustrated where there is one physical path corresponding to (c), but it is possible to adopt a configuration having multiple physical paths. Further, (d) are the physical paths used for transmitting data via the remote copying function in the migration destination storage system.

In S330, the storage manager 401 configures an LU path with respect to the logical volume of the migration source primary storage subsystem 310a. The logical volume to which the LU path is configured is the migration target P-VOL. Further, the configuration of an LU path is performed so that the migration destination primary storage subsystem 320a recognizes the migration target volume (P-VOL) of the migration source primary storage subsystem 310a by the external storage connecting function. Therefore, an LU path is configured with respect to port C of the migration source primary storage subsystem 310a connected to the migration destination primary storage subsystem 320a in S320. When configuring an LU path, it is necessary to designate a LUN, but any arbitrary LUN can be designated.

When the storage manager 401 of the primary server 330a issues an instruction to configure an LU path to the migration source primary storage subsystem 310a, the migration source primary storage subsystem 310a configures an LU path to the P-VOL based on that instruction. Further, as another embodiment, LU paths can be configured by the management terminal.

Thereafter, the setting operation of the migration destination primary storage subsystem 320a is performed in S340. Now, the process performed in S340 will be described with reference to FIG. 42. At first, the management terminal creates a command device. After creating the command device, the instance of the storage manager 401 is started in the primary server 330a. The configuration file read by the instance being started at this time should be a file as shown in FIG. 38, that is, a configuration file having at least the information on the identifier of the command device stored therein. Further, an instance number that differs from the instance numbers (100 and 101) of the instances already operating in the primary server 330a and the secondary server 330b is used as the instance number of the instance started here. The respective operations performed hereinafter are performed by the storage manager 401. However, as another embodiment, a management terminal can be used.

Thereafter, in S340b, using the started instance, out of the ports of the migration destination primary storage subsystem 320a, the attribute of the port (port L) connected to the migration source primary storage subsystem 310a is changed to the attribute for the external storage connecting function. Further, out of the ports of the migration destination primary storage subsystem 320a, the attribute of the ports (port M, port N) connected to the migration destination secondary storage subsystem 320b is changed to the attribute for the remote copying function. Actually, the attribute of one of the ports of port M and port N is changed to the attribute of the port for transmitting data from the migration destination primary storage subsystem 320a to the migration destination secondary storage subsystem 320b, and the attribute of the remaining port is changed to the attribute of the port for receiving data from the migration destination secondary storage subsystem 320b to the migration destination primary storage subsystem 320a. Similarly, out of the ports of the migration destination secondary storage subsystem 320b, the attribute of ports (port O, port P) connected to the migration destination primary storage subsystem 320a is changed to an attribute for the remote copying function.

In S340c, the storage manager 401 creates a virtual storage in the migration destination primary storage subsystem 320a. The control instruction for creating a virtual storage that the storage manager 401 issues to the migration destination primary storage subsystem 320a when creating a virtual storage includes the information on an identifier of the creation target virtual storage, a serial number of the virtual storage, and a model name. The identifier of the virtual storage included in the control instruction issued in S340c is an identifier which is to be stored in the ID (T1001) of the V-BOX management table T1000, wherein an identifier that differs from the identifier of an already defined virtual storage (for example, as mentioned earlier, identifier v0 is already defined in the initial state) is designated. Moreover, the serial number of the migration source primary storage 310a is designated as the serial number of the virtual storage included in the control instruction issued in S340c, and the model name of the migration source primary storage 310a is designated as the model name of the virtual storage. The storage manager 401 issues a control instruction with these information for creating a virtual storage to the migration destination primary storage subsystem 320a. The migration destination primary storage subsystem 320a having received the control instruction for creating a virtual storage stores the received information of the virtual storage identifier, model name and serial number to the ID (T1001), the model name (T1002) and the S/N (T1003) of the V-BOX management table T1000.

In S340d, the storage manager 401 issues an instruction to the migration destination primary storage subsystem 320a to delete the virtual LDEV #s assigned to the volumes to be used as the migration destination volumes. As mentioned earlier, since the LDEV # of the migration destination volumes (migration destination P-VOL, target volume) prepared in the migration destination primary storage subsystem 320a are 33 and 44, we will first describe this example. When the migration destination primary storage subsystem 320a receives a control instruction to delete virtual LDEV #s, it invalidates the contents of the VLDEV #s (T1502) of the rows where the LDEV #s (T1501) are 44 and 33 out of the LDEVs stored in the virtual LDEV management table (stores NULL values). Further, the storage manager 401 issues an instruction to register the LDEV #s of the LDEVs having their virtual LDEV #s deleted to the virtual storage. When the migration destination primary storage subsystem 320a receives this instruction, it stores the LDEV #s to the LDEV #s (T1005) of the V-BOX management table T1000, and also stores "reserved" in the attributes T1504 of the virtual LDEV management table T1500. When "reserved" is stored in the attribute T1504, the migration destination primary storage subsystem 320a recognizes that the LDEV belongs to the virtual storage, and it will not use that LDEV for other purposes.

In S340e, the storage manager 401 issues a command to virtualize the LDEVs registered in the virtual storage, in other words, assigns virtual LDEV #s to the LDEVs registered in the virtual storage. As mentioned earlier, 99 is to be used as the virtual LDEV # of the target volume. Also, since the LDEV # of the migration source P-VOL is to be assigned to the virtual LDEV # of the migration destination P-VOL, a control instruction is issued to assign virtual LDEV #11 to the logical volume having LDEV #33, and a control instruction is issued to assign virtual LDEV #99 to the logical volume having LDEV #44.

When the migration destination primary storage subsystem 320a receives this instruction, 11 is stored in the VLDEV # (T1004) corresponding to the row where the LDEV # (T1005) is 33 in the V-BOX management table T1000, and 99 is stored in the VLDEV # (T1004) corresponding to the row where the LDEV # (T1005) is 44. Thereby, 11 is assigned as the virtual LDEV # to the logical volume having LDEV #33, and 99 is assigned as the virtual LDEV # to the logical volume having LDEV #44.

In S340f, the migration source volume (P-VOL) of the migration source primary storage subsystem 310a is mapped to the migration destination primary storage subsystem 320a by the external storage connecting function. The storage manager 401 issues a control instruction to register the migration source volume to the external volume group of the migration destination primary storage subsystem 320a. When the migration destination primary storage subsystem 320a receives this command, it registers the information of the migration source volume to the external volume group management table T150. At this time, the migration destination primary storage subsystem 320a stores the size information of the migration source volume from the migration source primary storage subsystem 310a, and stores the same in size T154. FIG. 29 illustrates an example of the external volume group management table T150 after mapping the migration source P-VOL. Here, an example is illustrated of a case where the migration source P-VOL is mapped to an external volume group having EG1 as the external volume group name (T151). Since the size of the migration source P-VOL is 100 GB, "100 GB" is stored as size T154.

Furthermore, the storage manager 401 issues a control instruction for creating a logical volume (migration destination P-VOL) from the storage area of the external volume group. When the migration destination primary storage subsystem 320a receives this control instruction, it stores 33 in the LDEV # (T201), 100 GB in the size T202 (that is, creates a migration destination P-VOL using the whole area of the migration source P-VOL), "EG1" in the group name T203, and 0 in the initial address T204 of the logical volume management table T200, thereby the information notifying that the storage area of the logical volume whose LDEV # is 33 is the storage area in the external volume group EG1 is stored.

In S340g, a target volume to be used in the volume migrating function is created. Here, the size of the target volume to be created is the same size as the migration destination P-VOL, and a storage area of a parity group within the migration destination primary storage subsystem 320a is used as the storage area. When multiple parity groups exist, it is possible to select an arbitrary parity group whose remaining size of the parity group (remaining size T105 of the parity group management table T100) is equal to or greater than the size of the migration destination P-VOL.

The storage manager 401 issues a control instruction to allocate a storage area of the parity group to the logical volume having LDEV #44. When the migration destination primary storage subsystem 320a receives this control instruction, it registers the information of the LDEV # and the storage area (parity group) allocated to the LDEV to the logical volume management table T200. FIG. 30 shows one example of the contents of the logical volume management table T200 after allocation. FIG. 30 shows that 100 GB of the area of parity group RG A is allocated to LDEV #44 (row 906), and that 100 GB of the area of external volume group EG1 is allocated to LDEV #33 (row 907).

In S340h, an LU path is configured in the migration destination volume. The storage manager 401 issues a control instruction to allocate a port name and a LUN to the LDEV #33. When the migration destination primary storage subsystem 320a receives this control instruction, it registers the information in the LU management table T300. For example, when an instruction to allocate port name 3e243174aaaaaaaa and LUN 0 arrives at the LDEV #33, the migration destination primary storage subsystem 320a registers "33" in the field of LDEV # (T304) of the row in which the port name T301 is "3e243174aaaaaaaa" and the LUN (T303) is 0 in the LU management table T300.

The above describes the process performed in S340. Next, we will return to FIG. 41 to describe the processes of S350 and thereafter. In S350, a setting operation of the migration destination secondary storage subsystem 320b is performed. This process is similar to the operation performed in the migration destination primary storage subsystem 320a in S340. Creation of the command device (operation corresponding to S340a), creation of the virtual storage (operation corresponding to S340c), deletion of the virtual LDEV # assigned to the volume used as the migration destination volume (S-VOL) and the registration of the migration destination volume to the virtual storage (operation corresponding to S340d), virtualization of the migration destination volume (operation corresponding to S340e), creation of the migration destination volume (operation corresponding to S340f), and configuration of an LU path to the migration destination volume (operation corresponding to S340h) are performed. Similar to S340, the operation to create the command device is executed from the management terminal, and after creating the command device, the instance of the storage manager 401 is started in the secondary server 330b, and the subsequent operations are executed using the started instance.

In S360, an alternate path from the primary server 330a to the migration destination primary storage subsystem 320a is added. In the primary server 330a, commands provided by the operating system of the primary server 330a and the alternate path software 402 are executed, by which the migration destination P-VOL created in the migration destination primary storage subsystem 320a in the operation of S340 is recognized by the operating system and the alternate path software 402 of the primary server 330a. When the migration destination P-VOL is recognized by the alternate path software 402, since the migration source P-VOL of the migration source primary storage subsystem 310a and the migration destination P-VOL of the migration destination primary storage subsystem 320a show the same attribute information (serial number and LDEV #) to the primary server 330a, the alternate path software 402 recognizes these volumes as an identical volume, and constructs an alternate path.

Next, the setting of the alternate path software 402 is changed so that the path from the primary server 330a to the migration source volume of the migration source primary storage subsystem 310a is invalidated. This is performed by executing a command provided by the alternate path software 402. Since the alternate path software 402 recognizes that the migration source P-VOL and the migration destination P-VOL are identical volumes, when an alternate path is deleted, the alternate path software 402 comes to issue the I/O requests that an application program or the like operating in the primary server 330a had issued to the migration source P-VOL to the migration destination P-VOL.

Thereafter, the LU path of the migration source P-VOL is deleted in the migration source primary storage subsystem 310a. This operation is performed by the storage manager 401 or the management terminal issuing an instruction to delete the LU path to the migration source primary storage subsystem 310a.

In S370, pair creation of the migration destination P-VOL and the migration destination S-VOL is performed in the migration destination storage system 310. Based on the data of the configuration files (an example of the configuration files is illustrated in FIG. 36) used for operating the volume pair of the migration source P-VOL and the migration destination S-VOL in the primary server 330a and the secondary server 330b, configuration files are created for issuing a control instruction to the virtual storage, as illustrated in FIG. 37. Then, using the created configuration files, the instances of the storage manager 401 of the primary server 330a and the secondary server 330b are started. As the instance numbers of the instances started here, instance numbers which are different from the instance numbers (100 and 101) already operating in the primary server 330a and the secondary server 330b are used. Thereafter, when the storage manager 401 of the primary server 330a issues a control instruction of pair creation, the migration destination storage system 310 starts data replication between the migration destination P-VOL and the migration destination S-VOL.

Until pair creation is completed, that is, until the data in the migration destination P-VOL is completely replicated to the migration destination S-VOL, when the primary server 330a writes data to the migration destination P-VOL (LDEV #33, virtual LDEV #11), that data is written to the migration source P-VOL (LDEV #11) in the migration source primary storage subsystem 310a via the external storage connecting function, and the written data is further written to the migration source S-VOL (LDEV #22). Therefore, even during pair creation of the migration destination P-VOL and the migration destination S-VOL, a redundant configuration is maintained between the migration source P-VOL and the migration source S-VOL. Furthermore, the pair status can be confirmed by issuing a control instruction for displaying the pair status from the storage manager 401 to the migration destination primary storage subsystem 320a.

After the pair status of the migration destination P-VOL and migration destination S-VOL is changed to the "pair" state, the operation of the software for disaster recovery, such as the cluster software 403 in the primary server 330a and the secondary server 330b, is stopped (S380).

Next, the instance of the storage manager 401 that was being started for the migration source storage system is stopped, and the configuration files of the storage manager 401 are rewritten. The rewriting of the configuration files are similar to the operation performed in S370. Since it is unnecessary to change the block 3002 storing the volume pair information and the like in rewriting the configuration files, the rewriting of the configuration files can be executed in a short time. When the rewriting of the configuration files are completed, instance is started in each of the primary server 330a and the secondary server 330b using the configuration files (S390). The instance numbers of the instance started here are the same as the instance numbers (100 and 101) operated in the primary server 330a and the secondary server 330b before the migration process.

In S400, invalidation of the path from the secondary server 330b to the migration source volume of the migration source secondary storage subsystem 310b, and deleting of an LU path of the migration source volume of the migration source secondary storage subsystem 310b are performed. Here, an operation similar to the operation performed to the migration source P-VOL of the migration source primary storage subsystem 310a in S360 is performed to the migration source S-VOL of the migration source secondary storage subsystem 310b. Further, an LU path is configured from the secondary server 330b to the migration destination S-VOL of the migration destination secondary storage subsystem 320b, to have the secondary server 330b recognize the migration destination S-VOL. Thereafter, the operation of software for disaster recovery such as the cluster software 403 in the primary server 330a and the secondary server 330b having been stopped in S380 is resumed.

Thereafter in S410, an operation to migrate the migration destination P-VOL to the target volume is performed. In doing migration, an instance (referred to as second instance) that is different from the instance of the storage manager 401 started in S390 is started in the primary server 330a, and the instruction of migration of volume to the migration destination primary storage subsystem 320a is performed using the second instance. The migration destination primary storage subsystem 320a having received the instruction uses the volume migrating function to migrate the migration destination P-VOL to the target volume.

While waiting for the migration to be completed, that is, while the data of the migration destination P-VOL is completely replicated to the target volume, when the primary server 330a writes data to the migration destination P-VOL (LDEV #33, virtual LDEV #11), the data is written to the migration source P-VOL (LDEV #11) of the migration source primary storage subsystem 310a via the external storage connecting function. Further, the written data is written to the migration destination S-VOL (LDEV #55, virtual LDEV

22). Therefore, even during migration of data between the migration destination P-VOL and the target volume, a redundant configuration is retained between the migration source P-VOL and the migration destination S-VOL. Further, the volume status can be confirmed by the storage manager 401 issuing a control instruction to acquire the migration status to the migration destination primary storage subsystem 320*a*.

When migration is completed, all the data in the migration source storage system becomes stored in the migration destination storage system. Further, by the volume migrating function, the mapping of the LDEV # and the data storage destination storage area is switched between the migration source and the migration destination. Therefore, when migration is completed, an access process is executed to the logical volume to which the storage area of the parity group 322*a* within the migration destination primary storage subsystem 320*a* is mapped, in response to the access request from the primary server 330*a* designating the virtual LDEV #11. Since the primary server 330*a* and the secondary server 330*b* are in a state not accessing the migration source storage system (the paths are deleted), the administrator removes the migration source storage system (S420). Thus, the migration process is completed. By the steps described above, the volume pair of the P-VOL and S-VOL can be migrated from the migration source storage system 310 to the migration destination storage system 320 while maintaining the redundant configuration, without having to stop receiving accesses (such as read or write requests) from the primary server 330*a*.

Modified Example 1

In the above-described migration process, after the pair creation instruction is issued in S370, the processes of S380 and thereafter are performed after confirming that the pair status has changed to "pair". However, the migration process of the present invention is not restricted to the processing steps described above. As a different embodiment, the subsequent operation can be executed immediately after issuing the pair creation instruction in S370. The flow of the process of such example will be described, mainly illustrating the differences from the migration process described above.

The processes from S310 to S360 are the same as the processes described above. In S370, when a pair creation instruction is issued, the procedure advances to the process of S380 (stopping of operation of software for disaster recovery) without waiting for the pair status to change to "pair".

Next, the migration instruction of volume in S410 according to the above-described migration process is issued to the migration destination primary storage subsystem 320*a*. After the volume migration instruction is issued, the procedure awaits completion of pair creation. In that case, when pair creation is completed, the migration source P-VOL and the target volume are switched simultaneously by the operation of the volume migrating function.

After pair creation is completed, the processes of S390 and S400 are executed. Thereafter, the process of S420 (removal of migration source storage system) is performed, and the migration process is ended.

In this migration process, the replication from the migration source P-VOL to the migration destination S-VOL by the remote copying function and the data migration (replication) from the migration source P-VOL to the target volume are executed in parallel, so that the time required for data migration can be shortened compared to the data migration process according to Embodiment 1.

Modified Example 2

Figure 44:
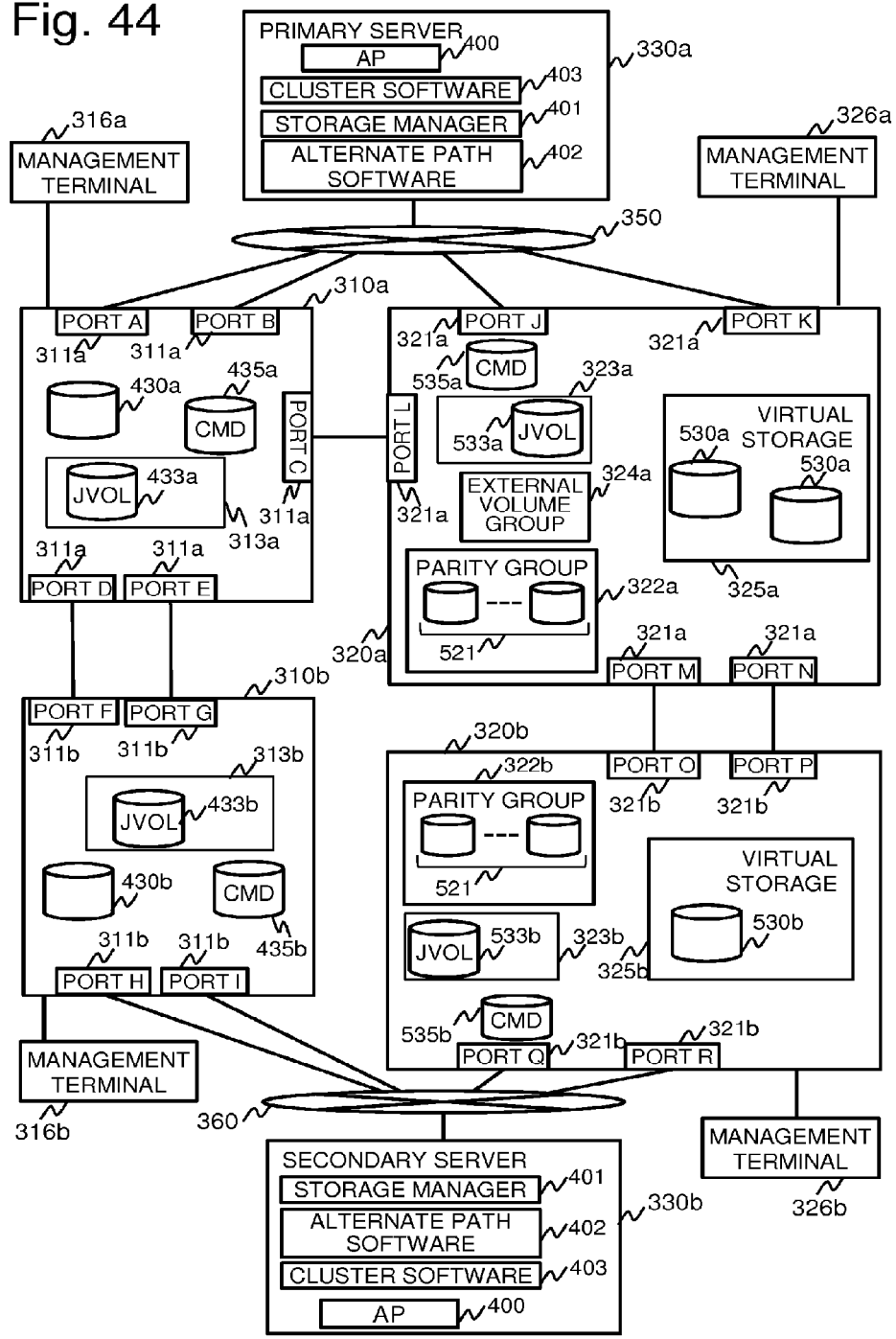
FIG. 44 is a configuration diagram of a computer system according to Modified Example 2 of the present invention.

Now, a computer system according to Modified Example 2 of the present invention will be described. FIG. 44 is a configuration diagram of a computer system according to Modified Example 2 of the present invention. Similar to the computer system according to Embodiment 1, the computer system according to Modified Example 2 of the present invention is composed of a migration source primary storage subsystem 310*a*, a migration source secondary storage subsystem 310*b*, a migration destination primary storage subsystem 320*a*, a migration destination secondary storage subsystem 320*b*, a primary server 330*a*, and a secondary server 330*b*, and the hardware configuration of the respective storage subsystems is also the same as that illustrated in Embodiment 1.

The difference from the computer system of Embodiment 1 is that according to the present Embodiment, a remote copying function using a journal is adopted as the remote copying function. According to the computer system of Modified Example 2, a journal refers to a storage area used for temporarily storing the replica of data in P-VOL transmitted from the storage subsystem having the P-VOL to the storage subsystem having the S-VOL. The migration source primary storage subsystem 310*a* and the migration source secondary storage subsystem 310*b* each have a journal 313*a* and a journal 313*b* provided thereto. When performing migration process, the migration destination primary storage subsystem 320*a* and the migration destination secondary storage subsystem 320*b* will also have a journal 323*a* and a journal 323*b* provided thereto.

Each journal (313*a*, 313*b*, 323*a* and 323*b*) has a journal ID assigned thereto, which is an identifier unique within the storage subsystem. Further, the journals 313*a*, 313*b*, 323*a* and 323*b* each have a journal volume 433*a*, 433*b*, 533*a* and 533*b* respectively registered thereto. In the following description, the journal is sometimes abbreviated as "JNL", and the journal volume is sometimes abbreviated as "JVOL".

The journal volume (433*a*, 433*b*, 533*a* or 533*b*) is a logical volume similar to the logical volume 430*a* and the like described in Embodiment 1. The logical volume 430*a* described in Embodiment 1 is a volume to which a storage area of the parity group within the storage system is statically associated when the logical volume is created, but it is also possible to use a volume formed using so-called thin provisioning technique as the journal volume. According to a volume formed using the thin provisioning technique, a storage area is dynamically allocated to an area to which access has occurred at the point of time when access is received to the volume, so that the storage area can be saved.

Figure 45:
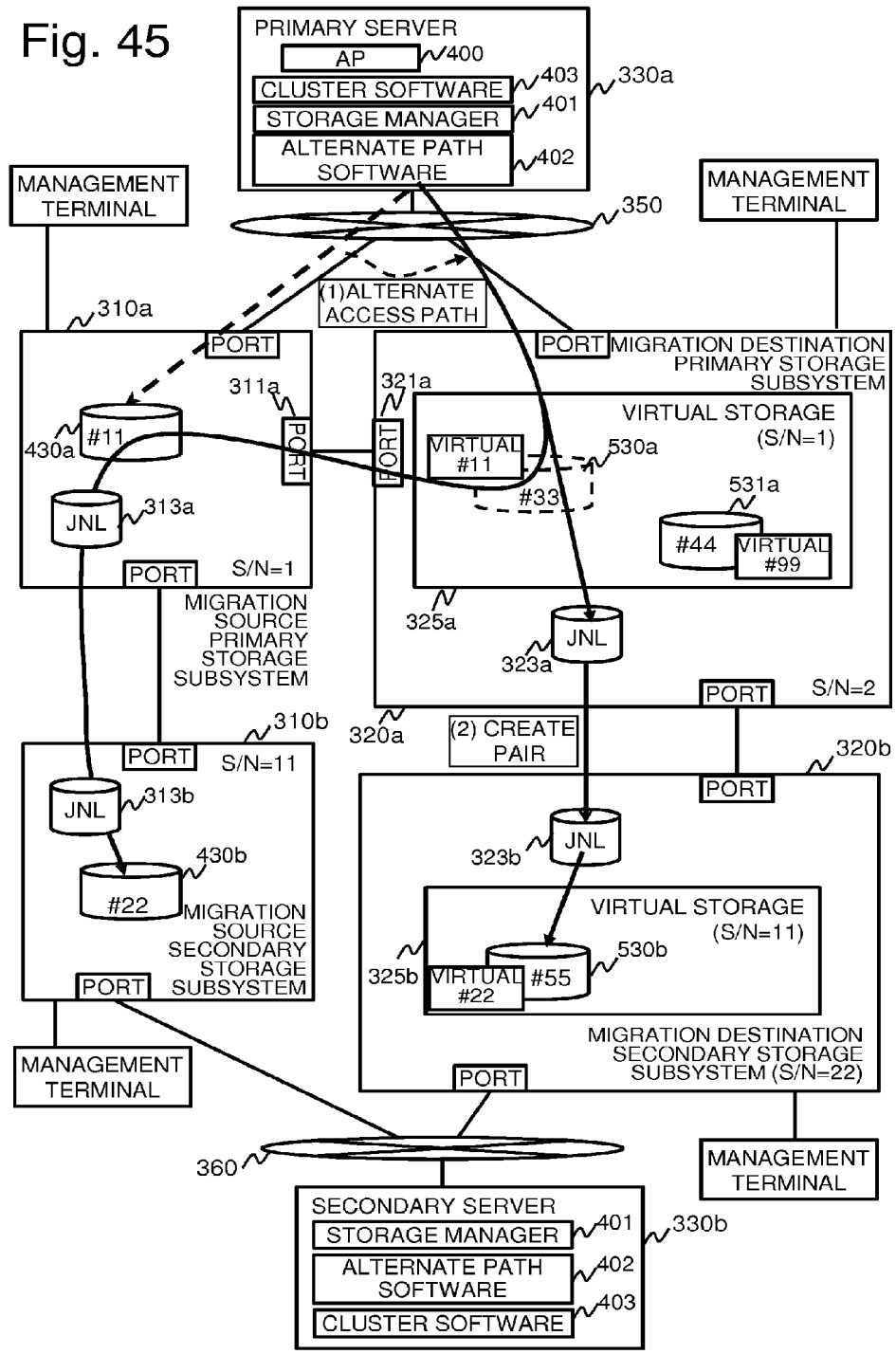
FIG. 45 is a view illustrating a flow of data during a migration process in a computer system according to Modified Example 2 of the present invention.

According to the computer system of Modified Example 2, the data of the logical volume 430*a* as migration source P-VOL is in a state constantly replicated to the logical volume 430*b* as migration source S-VOL via the remote copying function using a journal ("pair" state). The flow of data during the migration process is illustrated in FIG. 45, which is the same as Embodiment 1, except for the point that the replication data of the migration source P-VOL goes through JNL 313*a* and 313*b* before being copied to the migration source S-VOL. That is, when transferring the replication data of the migration source P-VOL to the migration source secondary storage subsystem 310*b*, the replication data is stored temporarily in (JVOL 433*a* of) JNL 313*a*. At this time, a number indicating the writing order of the replication data, which is called a sequence number, is assigned to the replication data. The sequence number is a number assigned so that the migration source secondary storage subsystem 310*b* can write the replication data to the migration source S-VOL in the same order as the order in which the primary server 330*a* writes the data to the migration source P-VOL.

The replication data stored in the JNL 313a is transferred to the (JVOL 433b of) JNL 313b of the migration source secondary storage subsystem 310b. Thereafter, the migration source secondary storage subsystem 310b acquires the replication data of the migration source P-VOL stored in the JNL 313b and reflects the replication data to the migration source S-VOL in the order of the sequence number assigned to the replication data. Though the outline of the volume replication in the migration source storage system 310 has been described above, similar process is also performed in the migration destination storage system 320 when the volume pair creation of the migration destination P-VOL and migration destination S-VOL is done.

Flow of Migration Process

Next, the flow of the volume migration process will be described. The flow of the volume migration process according to the computer system of Modified Example 2 is almost the same as the flow described in Embodiment 1, so that the flow will be described with reference to FIGS. 41 through 43 of Embodiment 1.

According to the computer system of Modified Example 2, the remote copying function using a journal is adopted as the remote copying function, so that the main difference from Embodiment 1 is that a process of preparing journals to the migration destination storage system 320 is added. In S310 of the migration process, in addition to the information described in Embodiment 1, the information of the journal ID of the journal used in the volume pair of the migration source P-VOL and the migration source S-VOL is acquired.

In S340 and S350 described later, journals are created in the migration destination storage system 320, wherein journals (323a, 323b) having the same ID as the journal IDs of journals 313a and 313b in the migration source storage system 310 are created. In the following description, an example is described where, as a result of acquiring the journal ID information, the journal ID of the journal 313a is 0 and the journal ID of the journal 313b is 1. Further, an example is described where the LDEV # of the journal volume 533a is 77 and the LDEV # of the journal volume 533b is 88.

The processes of S320 and S330 are the same as the process illustrated in Embodiment 1.

In S340, in addition to the process illustrated in Embodiment 1 (S340a through S340h in FIG. 42), the creation of a journal volume 533a and the registration of the journal volume 533a to the journal 323a are performed between S340g and S340h. The other points are the same as the process of S340 described in Embodiment 1. The creation of the journal volume 533a and the registration to the journal 323a is executed by issuing a control instruction for registering the logical volume (533a) of LDEV #77 to the journal having journal ID=0 from the storage manager 401 to the migration destination primary storage subsystem 320a. The migration destination primary storage subsystem 320a having received the control instruction creates a journal of journal ID=0, and further registers a logical volume (533a) of LDEV #77 to the created journal. The order for performing this process is not restricted to the above-described order. For example, the process can be performed before S340f.

Also in S350, in addition to the process described in Embodiment 1, a journal volume 533b is created and the created journal volume 533b is registered to the journal 323b. The other processes are the same as the processes of S350 described in Embodiment 1.

S360 is the same as that described in Embodiment 1.

In S370, when the storage manager 401 issues a control instruction for creating a pair of the volume pair (that is, the migration destination P-VOL and the migration destination S-VOL), it issues a control instruction designating the journal IDs (0 and 1) of journal 323a and journal 323b created in S340, in addition to designating the identifiers of the migration destination P-VOL and the migration destination S-VOL. The other points are the same as the process described in Embodiment 1. Thereby, copy from the migration destination P-VOL to the migration destination S-VOL using journal 323a and journal 323b is performed.

The processes of S380 and thereafter are the same as the processes described in Embodiment 1.

Embodiment 2

Figure 46:
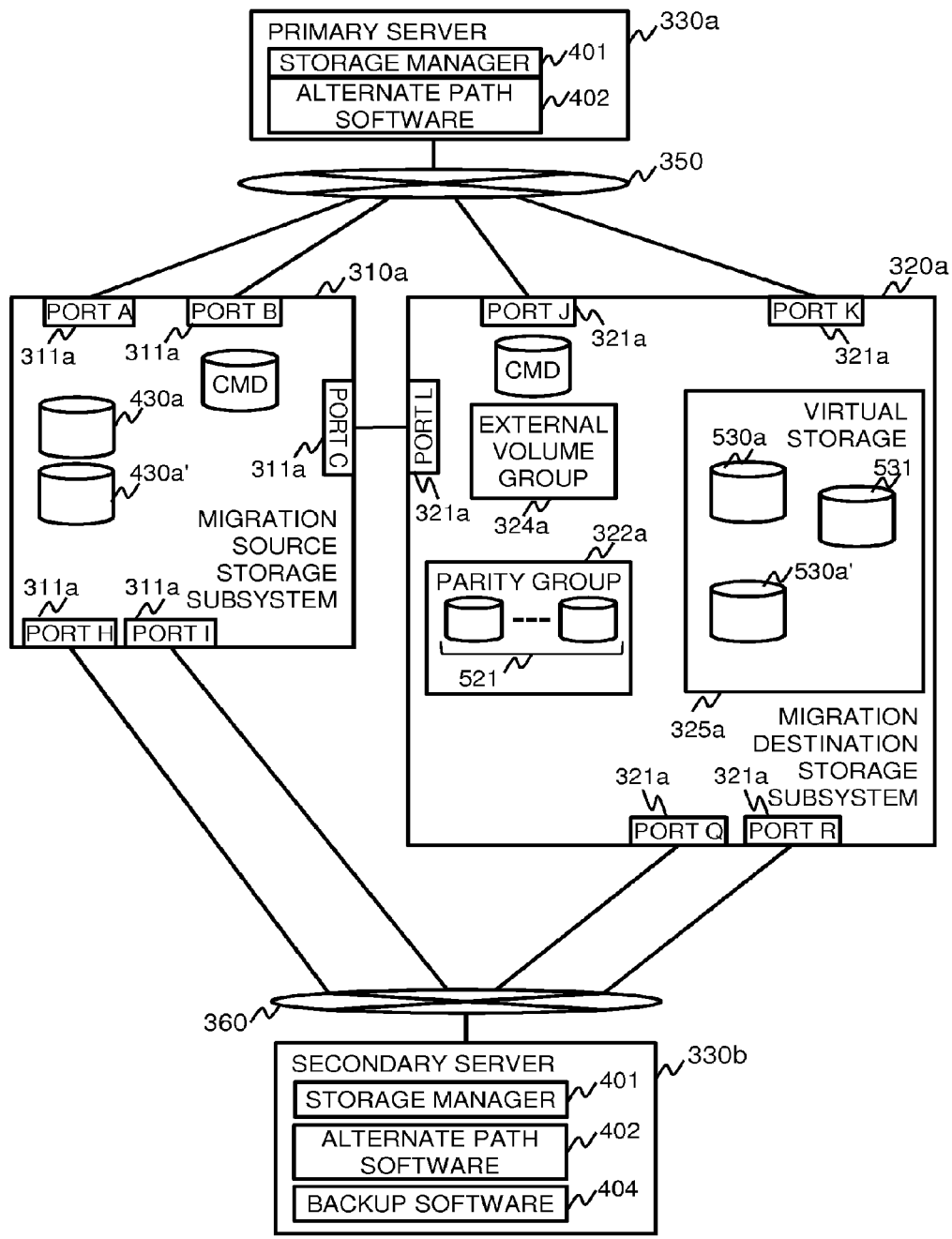
FIG. 46 illustrates a configuration view showing an outline of a computer system according to Embodiment 2 of the present invention.

Now, the computer system according to Embodiment 2 of the present invention will be described. FIG. 46 is a configuration diagram showing the outline of a computer system according to Embodiment 2 of the present invention. The computer system is composed of a migration source storage subsystem 310a, a migration destination storage subsystem 320a, a primary server 330a, and a secondary server 330b. The hardware configurations of the migration source storage subsystem 310a and the migration destination storage subsystem 320 are the same as the configurations described in Embodiment 1.

According to the computer system of Embodiment 2 of the present invention, the logical volumes 430a and 430a' within the migration source storage subsystem 310a are operated as a volume pair before migration. The logical volume 430a is the P-VOL and the logical volume 430a' is the S-VOL. That is, the logical volume 430b existing within the migration source secondary storage 310b according to the computer system of Embodiment 1 exists in the same storage subsystem as the logical volume 430a (migration source storage subsystem 310a) in the computer system according to Embodiment 2.

The logical volume 430a' is a volume used for acquiring backup of the logical volume 430a, wherein the secondary server 330b performs backup of the data of the logical volume 430a' to a backup device not shown during acquisition of backup. A backup software 404, which is a program for performing backup operation, is operated in the secondary server 330b.

For example, during acquisition of backup, the backup software 404 uses the storage manager 401 to set the volume pair status to "suspended" (or if the volume pair is already in "suspended" state, the volume pair is first resynchronized, and then the volume pair status is set to "suspended" state), and the backup software 404 of the secondary server 330b performs a process to copy the data of the logical volume 430a' to a backup device not shown. When the backup process is ended, the secondary server 330b performs resynchronization of the volume pair, and sets the volume pair again to "pair" state.

Figure 47:
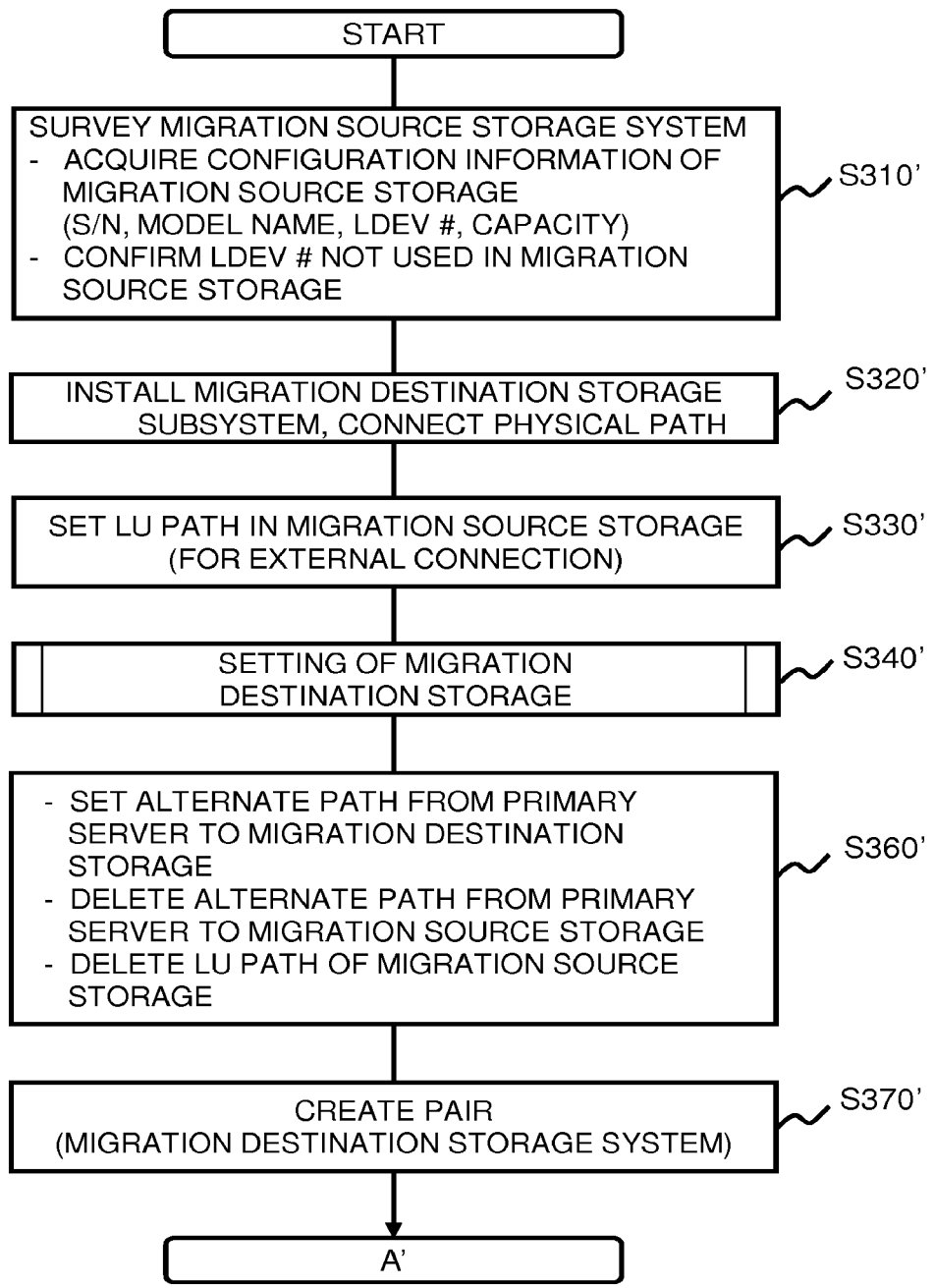
FIG. 47 is a flowchart (1) of a volume migration process in a computer system according to Embodiment 2 of the present invention.
Figure 48:
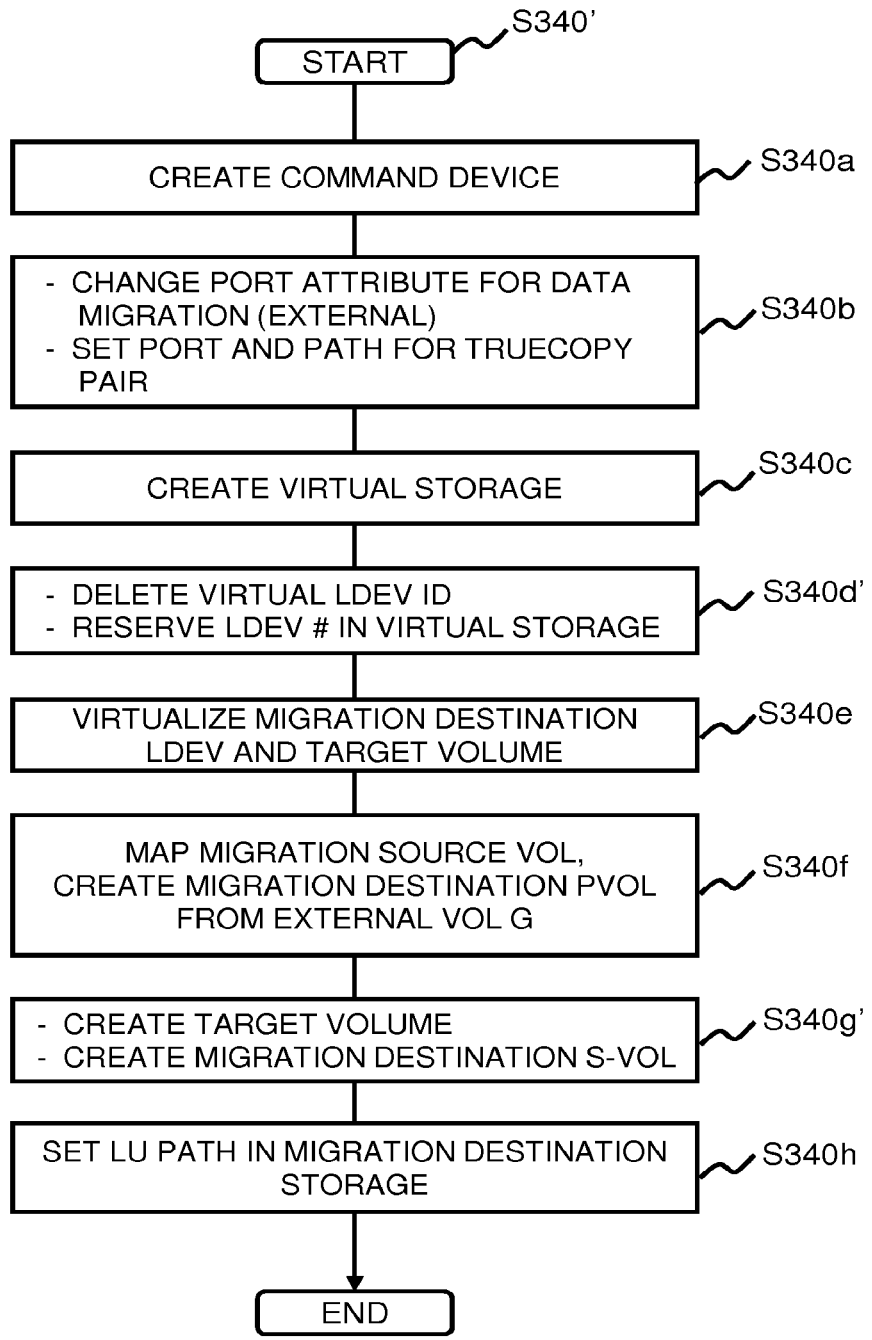
FIG. 48 is a flowchart (2) of a volume migration process in a computer system according to Embodiment 2 of the present invention.
Figure 49:
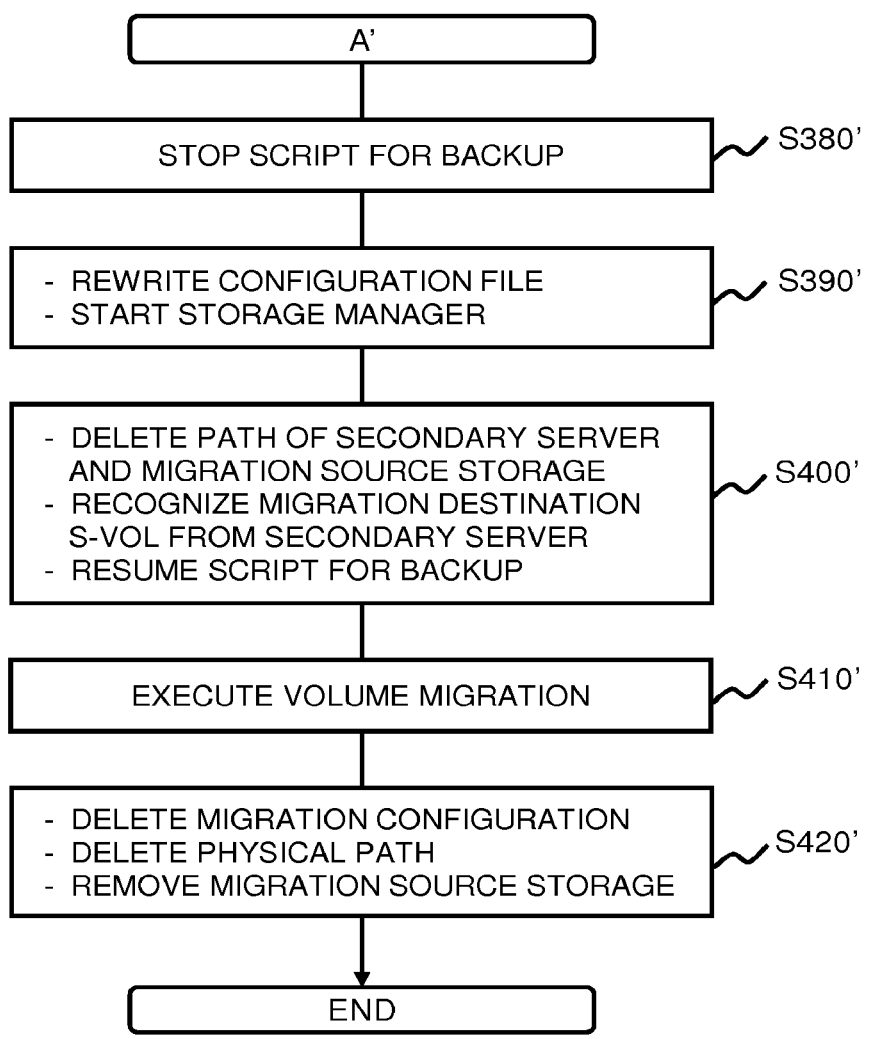
FIG. 49 is a flowchart (3) of a volume migration process in a computer system according to Embodiment 2 of the present invention.

Hereinafter, the flow of the process for performing migration while maintaining the pair status of the logical volumes 430a and 430a' in the computer system having the above-described configuration will be described with reference to FIGS. 47, 48, and 49. Since the present flow is similar to the migration process of Embodiment 1, the differences from Embodiment 1 will mainly be described.

At first, the configuration of the migration source storage subsystem 310a is investigated (S310'). In S310 of Embodiment 1, the migration source secondary storage subsystem 310b had been investigated, but in the computer system of Embodiment 2, since the migration source secondary storage subsystem 310b does not exist, the migration source secondary storage subsystem 310b will not be investigated in S310'. The other points of S310' are the same as S310 of Embodiment 1.

Thereafter, the administrator sets up a migration destination storage subsystem 320a, and performs physical path connection between the migration destination storage system and the host computer or the migration source storage subsystem 310a (S320'). In the connecting operation of the physical paths, the following physical paths are connected.

(a) Physical paths between the migration destination storage subsystem 320a (port J, port K) and the primary server 330a.

(b) Physical paths between the migration destination storage subsystem 320a (port Q, port R) and the secondary server 330b.

(c) A physical path between the migration source storage subsystem 310a (port C) and the migration destination storage subsystem 320a (port L).

In S330', the storage manager 401 configures an LU path to the logical volume of the migration source storage subsystem 310a. The configuration of an LU path performed here is similar to the process performed in S330 of Embodiment 1. In other words, it is performed so that the migration destination storage subsystem 320a can recognize the migration target volume (P-VOL) of the migration source primary storage subsystem 310a by the external storage connecting function. Therefore, an LU path is configured to port C of the migration source storage subsystem 310a connected to the migration destination storage subsystem 320a in S320.

Thereafter, in S340', the operation for setting the migration destination storage subsystem 320a is performed. In this operation, an operation similar to S340 of Embodiment 1 is performed, except for the point that the process to the migration destination secondary storage subsystem is not performed. Now, the process executed in S340' will be described with reference to FIG. 48. At first, the management terminal creates a command device (S340a). After creating the command device, the instance of the storage manager 401 is started in the primary server 330a. In the following operation, various settings are performed from the storage manager 401. However, a management terminal can be used as another embodiment.

Thereafter, in S340b, the storage manager 401 operating in the primary server 330a changes the attribute of the port (port L) connected to the migration source primary storage subsystem 310a out of the ports of the migration destination storage subsystem 320a to the attribute for the external storage connecting function.

In S340c, the storage manager 401 creates a virtual storage 325a in the migration destination storage subsystem 320a.

In S340d', the storage manager 401 issues a control instruction to delete the virtual LDEV #s assigned to the volumes which is to be used as the migration destination volumes to the migration destination storage subsystem 320a. Thereafter, the storage manager 401 issues a control instruction for registering the LDEV # of the LDEV having deleted the virtual LDEV # to the virtual storage. Here, as the migration destination volumes used in the migration destination storage subsystem 320a, the migration destination P-VOL and the migration destination S-VOL (which existed in the migration destination secondary storage subsystem 320b in Embodiment 1) exists. Therefore, in S340d', the virtual LDEV #s assigned to two volumes is deleted, and these two volumes are registered in the virtual storage.

In S340e', the storage manager 401 executes virtualization of the LDEV registered in the virtual storage. Similar to S340d', virtualization is executed to two volumes.

In S340f, the storage manager 401 maps the migration source P-VOL of the migration source storage subsystem 310a to the migration destination primary storage subsystem 320a. Further, the storage manager 401 creates a migration destination volume (migration destination P-VOL) from the mapped storage area.

In S340g', the target volume used in the volume migrating function is created. The size of the target volume created here is the same size as the migration destination P-VOL, and the storage area of parity group 322a is used as the storage area. At the same time, the migration destination S-VOL is created. The storage area of the parity group 322a is also used as the storage area of the migration destination S-VOL.

In S340h, an LU path is configured in the migration destination P-VOL. The storage manager 401 issues a control instruction for allocating the port name and LUN to the LDEV #33.

The above describes the process performed in S340'. Next, we will return to FIG. 47 to describe the processes of S360' and thereafter.

In S360', an alternate path is added from the primary server 330a to the migration destination storage subsystem 320a, and the alternate path from the primary server 330a to the migration source storage subsystem 310a is deleted. This is a process similar to S360.

In S370', pair creation is performed between the migration destination P-VOL and the migration destination S-VOL in the migration destination storage subsystem 320a. When the storage manager 401 of the primary server 330a issues a pair creation control instruction, the migration destination storage subsystem 320a starts data replication between the migration destination P-VOL and the migration destination S-VOL via the local copying function.

After the pair status of the migration destination P-VOL and the migration destination S-VOL becomes in "pair" state, the backup software 404 in the primary server 330a and the secondary server 330b is stopped (S380').

Thereafter, the instance of the storage manager 401 that was being started for the migration source storage subsystem 310a is stopped, and the configuration files of the storage manager 401 are rewritten. The contents of the rewrite of the configuration files are similar to Embodiment 1, therefore the contents of the configuration files should be changed to perform control of the virtual storage. After finishing the rewrite of the configuration file, instance is started in each of the primary server 330a and the secondary server 330b using the configuration files (S390').

Thereafter, in S400', the secondary server 330b invalidates the path to the migration source volume of the migration source storage subsystem 310a, and deletes the LU path to the migration source volume of the migration source secondary storage subsystem 310b. Further, the secondary server 330b configures an LU path to the migration destination S-VOL of the migration destination storage subsystem 320a, and causes the secondary server 330b to recognize the migration destination S-VOL. Thereafter, the operation of the backup software 404 stopped in S380' is resumed.

Next, in S410', an operation to migrate the migration destination P-VOL to the target volume is performed. In doing migration, an instance (called a second instance) that differs from the instance of the storage manager started in S390' is started in the primary server 330a, and the instruction to migrate a volume to the migration destination storage subsystem 320a is output from the second instance. When the migration destination storage subsystem 320a receives the instruction, it migrates the migration destination P-VOL to the target volume using the volume migrating function.

When migration is completed, the administrator removes the migration source storage system (S420'), and ends the migration process. In Embodiment 2, the P-VOL and the S-VOL can be migrated from the migration source storage subsystem 310 to the migration destination storage subsystem 320 while maintaining the logical volume pair within the storage subsystem, without stopping accepting accesses from the primary server 330*a*.

Embodiment 3

Figure 50:
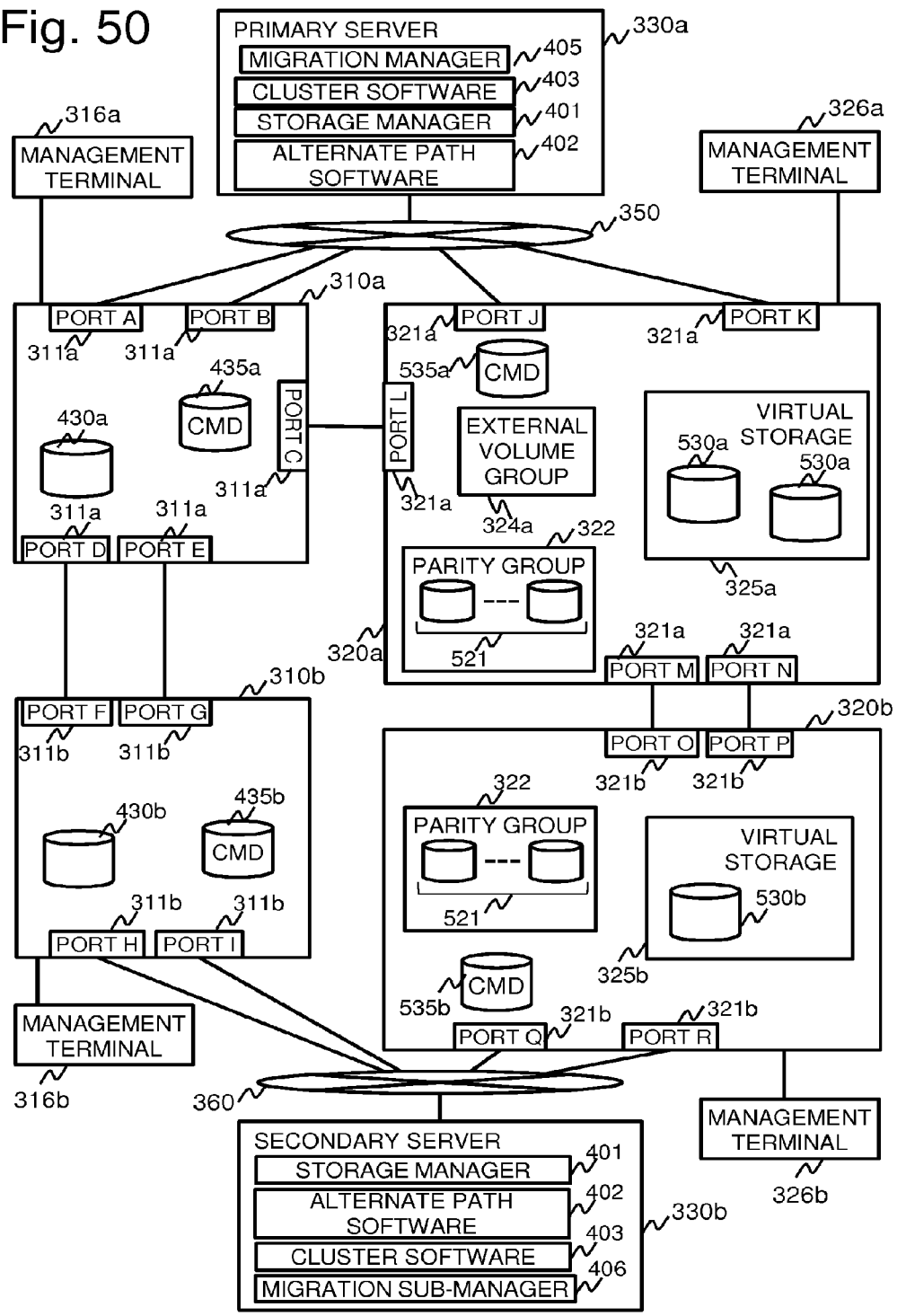
FIG. 50 is a configuration diagram of a computer system according to Embodiment 3 of the present invention.

Next, the computer system according to Embodiment 3 of the present invention will be described. FIG. 50 is a configuration diagram of a computer system according to Embodiment 3 of the present invention. The difference between the present system and the computer system of Embodiment 1 is that in the present system, the primary server 330*a* includes a migration manager 405 which is a program for executing the migration process, and the secondary server 330*b* includes a migration sub-manager 406 which is a program called by the migration manager 405 to perform a process to set the migration destination storage system or the secondary server 330*b*. The other configurations are the same as the computer system of Embodiment 1. Although not shown, the primary server 330*a*, the secondary server 330*b* and the management terminals (316*a*, 316*b*, 326*a* and 326*b*) are connected via a LAN or a WAN, and can communicate mutually.

According to the computer system of Embodiment 3, the migration manager 405 collectively executes the migration process. Therefore, the migration manager 405 issues commands to the storage manager 401, the alternate path software 402 and the cluster software 403 to have given processes performed thereby. Further, it issues commands to the management terminals 316*a* and 326*a* to have processes such as creation of a command device performed thereby. It further has a function to rewrite the configuration files used by the storage manager 401.

Similar to the migration manager 405, the migration sub-manager 406 can issue commands to the storage manager 401, the alternate path software 402 and the cluster software 403 to have given processes performed thereby. It also has a function to rewrite the configuration files used by the storage manager 401. However, the migration sub-manager 406 issues the commands to the storage manager 401, the alternate path software 402 and the cluster software 403, or rewrites the configuration file used by the storage manager 401, in accordance with the instructions from the migration manager 405.

Flow of Migration Process

Figure 51:
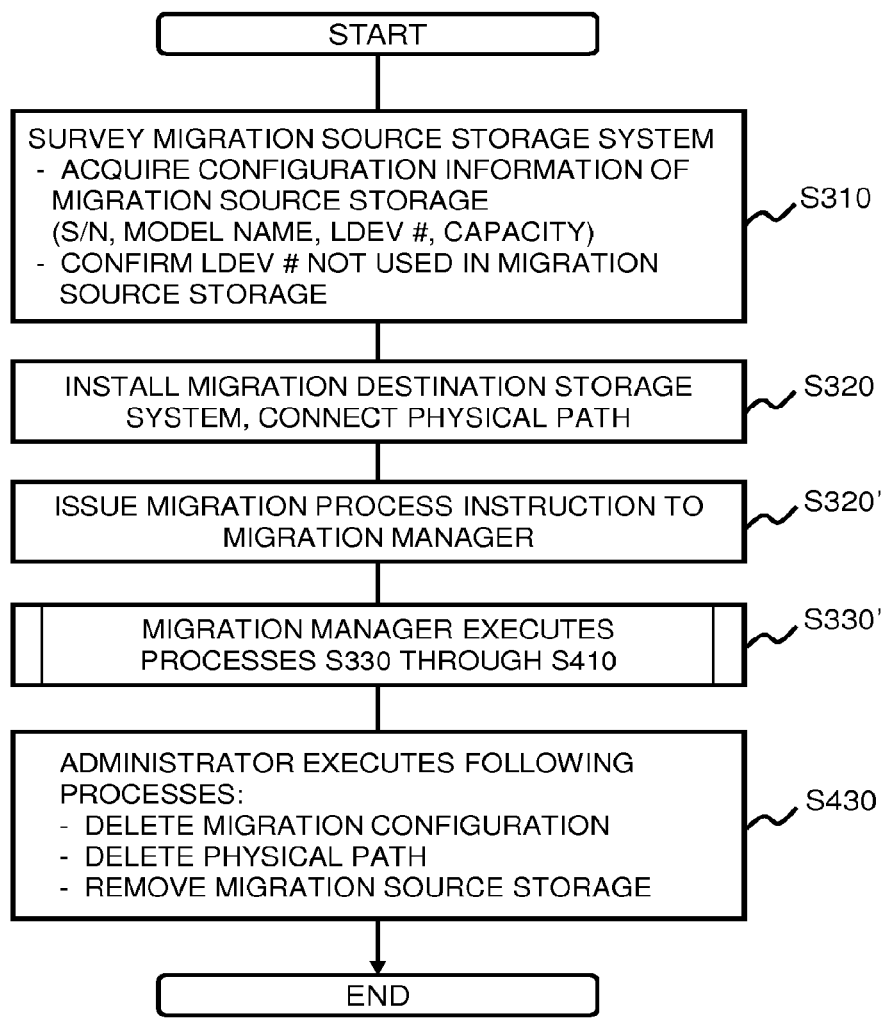
FIG. 51 is a flowchart of a volume migration process in a computer system according to Embodiment 3 of the present invention.

Next, the flow of the volume migration process in the computer system according to Embodiment 3 of the present invention will be described with reference to the flowchart of FIG. 51. For simplified description, only the migration process of one volume pair (a set of P-VOL and S-VOL) in the migration source storage system will be described, but it is also possible to migrate multiple volume pairs at the same time.

S310 and S320 are the same as the migration process of Embodiment 1. However, in S310, the administrator investigates the information of the volumes (migration source P-VOL and migration source S-VOL) operated as a volume pair in the migration source storage system. Then, based on the result of the investigation of this volume pair and the result of the investigation of the configuration of the migration source storage system in S310, the administrator prepares the following information that becomes necessary when instructing the migration process to the migration manager 405.

(1) The serial number of storage subsystems 310*a*, 310*b*, 320*a* and 320*b*.

(2) The unused LDEV # of storage subsystems 310*a*, 310*b*, 320*a* and 320*b*.

(3) The remaining sizes of each parity group of storage subsystems 320*a* and 320*b*.

(4) The LDEV # of the migration source P-VOL and the LDEV # of the migration source S-VOL.

(5) Of the ports of the migration source primary storage subsystem 310*a*, the name of a port connected to the primary server 330*a* and the migration source secondary storage subsystem 310*b*.

(6) Of the ports of the migration source secondary storage subsystem 310*b*, the name of a port connected to the secondary server 330*b* and the migration source primary storage subsystem 310*a*.

(7) The name of port of the migration source primary storage subsystem 310*a* which is to be connected to the migration destination primary storage subsystem 320*a* (which is temporarily called "port C").

(8) The LDEV # of the logical volume (migration source P-VOL) configuring an LU path to port C.

Thereafter, the administrator issues a data migration instruction to the migration manager 405 (S320'). At that time, the following information are designated as parameters.

(1) The serial number of the migration source primary storage subsystem 310*a*.

(2) The serial number of the migration source secondary storage subsystem 310*b*.

(3) The serial number of the migration destination primary storage subsystem 320*a*.

(4) The serial number of the migration destination secondary storage subsystem 320*b*.

(5) The LDEV # of the migration source P-VOL and the LDEV # of the migration source S-VOL.

(6) The LDEV # that can be used in the migration destination primary storage subsystem 310*a* and the migration destination secondary storage subsystem 320*b* (determined based on the unused LDEV # checked in S310).

(7) The group name that can be used in the migration destination primary storage subsystem 310*a* and the migration destination secondary storage subsystem 320*b* (parity groups capable of creating (a migration target volume of) the migration destination P-VOL and the migration destination S-VOL is determined based on the remaining size of the parity groups checked in S310).

(8) The name of port of the migration source primary storage subsystem 310*a* connected to the migration destination primary storage subsystem 320*a* (which is temporarily called "port C").

(9) The name of ports of the migration destination primary storage subsystem 320*a* connected to the primary server 330*a*.

(10) The name of ports of the migration destination secondary storage subsystem 320*b* connected to the secondary server 330*b*.

(11) The name of ports of the migration destination primary storage subsystem 320*a* connected to the migration destination secondary storage subsystem 320*b*, and the name of ports of the migration destination secondary storage subsystem 320*b*.

(12) The instance numbers of the instances operating in the primary server 330*a* and the secondary server 330*b*, and the file name of the configuration files read by the instances.

When the migration manager 405 receives the instruction, it starts the migration process (S330'). The contents performed by the migration process are similar to the processes of S330 and thereafter of Embodiment 1. In the following description, the differences between the migration process of the present embodiment and Embodiment 1 will mainly be described.

The processes of S330 and S340 are similar to the processes of S330 and S340 of Embodiment 1. In S350, the migration manager 405 issues an instruction to the migration sub-manager 406 to have the migration sub-manager 406 perform the configuration process of the migration destination secondary storage subsystem 320b. The content of the process performed by the migration sub-manager 406 is similar to S350 of Embodiment 1.

When the process of S350 ends, the migration manager 405 performs processes S360 and S370. When the process of S370 is completed (that is, when pair creation is completed), the migration manager 405 executes the process of S380. In S380, it is necessary to stop the cluster software 403 and the like in the secondary server 330b, therefore, in addition to the process for stopping the operation of the cluster software in the primary server 330a, the migration manager 405 instructs the migration sub-manager 406 to stop the cluster software 403 and the like in the secondary server 330b.

In S390, the migration manager 405 rewrites the configuration files for the storage manager 401. Since it is also required to rewrite the configuration files in the secondary server 330b is also required, the migration manager 405 instructs the migration sub-manager 406 to rewrite the configuration files in the secondary server 330b. Next, in S400, the migration manager 405 instructs the migration sub-manager 406 to perform invalidation of the path from the secondary server 330b to the migration source volume in the migration source secondary storage subsystem 310b, and deletion of the LU path of the migration source volume of the migration source secondary storage subsystem 310b.

Lastly, in S410, the migration manager 405 performs a process to migrate the migration destination P-VOL to the target volume. When migration is completed, the migration manager 405 notifies the administrator that the migration process of the volume has been completed. When the administrator receives this notice, he/she removes the migration source storage system (S430), and the migration process is completed.

The migration process of Embodiment 3 is not restricted to the above-described process, and various modifications are possible. Other than having all the processes described above executed by the migration manager 405 or the migration sub-manager 406, it is possible to have some processes executed manually by the administrator. For example, rewriting of the configuration file can be executed by the administrator.

In contrast, the selection of the LDEV # of the logical volume created by the migration destination storage system, or the selection of the parity groups where the logical volumes are to be created can be automatically determined by the migration manager 405 based on the investigation result of the configuration information.

According to Embodiment 3, the migration of a volume pair in a similar configuration to the computer system of Embodiment 1 has been described, that is, the migration of a volume pair created by the remote copying function has been described, but it is possible to have the migration method described in Embodiment 3 applied to the volume pair migration in the computer system according to Embodiment 2 (migration of a volume pair created by the local copying function).

The above illustrates the contents of the migration process according to the Embodiment of the present invention. In the migration process of the present invention, even when a volume is migrated from a migration source storage subsystem to a migration destination storage subsystem, the information such as the volume number and the serial number, which are identification information assigned to the migration target logical volume and recognized by the host computer, are not changed. Therefore, volume migration is executed in a transparent manner from the viewpoint of the host computer, so that there is no need to stop I/O processing in the host computer.

Further, even when the volumes forming volume pairs are migrated using the remote copying function or the like, the duplicated state of the volumes are maintained constantly even during migration, so that the availability of data is not deteriorated by the migration process. Further, since the identification information such as the volume number is not changed, there is very little need to change the configuration file for controlling the pair volumes existing in the host computer. Therefore, the time for stopping the software service for backup or disaster recovery can be restricted to an extremely short time.

The storage systems according to preferred embodiments of the present invention have been described, but the present invention is not restricted to the above-described embodiments. The migration process described above has been performed by an instruction output from the host computer (primary server), but it is also possible to adopt a configuration where the storage subsystem issues a command for management operation to control the migration. In addition, the migration process according to preferred embodiments of the present invention is used not only for the purpose of migrating data among subsystems or for rewriting data of the subsystem, but can be used for expanding the system.

Figure 52:
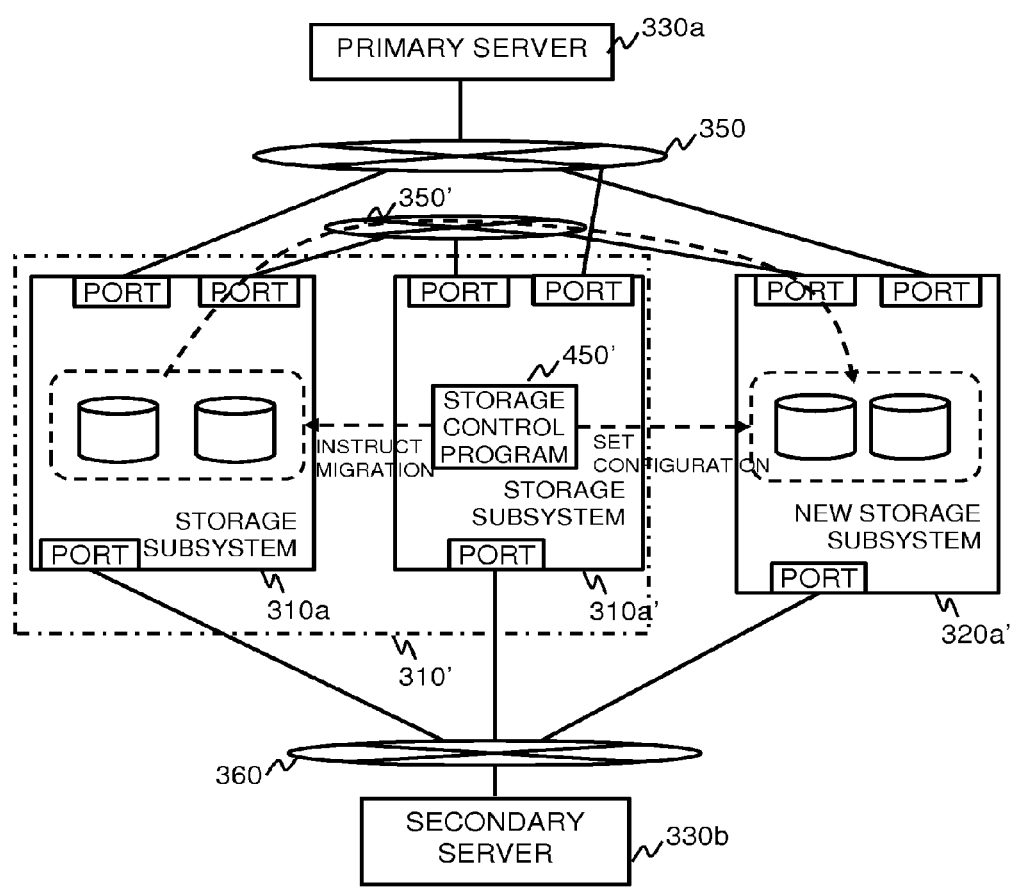
FIG. 52 is a view illustrating an example of the present invention applied to expanding a storage system.

As an example, we will assume a case, as shown in FIG. 52, where the load of the storage subsystem 310a is increased in a storage system 310' composed of storage subsystems 310a and 310a. In that case, the migration process of the present embodiment can be applied when introducing a new storage subsystem 320a to the storage system 310' and migrating the volume pair within the storage system 310' to the new storage subsystem 320a'. At this time, it is possible to provide a storage control program 450', which is a program corresponding to a storage manager described in Embodiment 1, to the storage subsystem 310a' (or 310a) within the storage system 310', and to have the storage subsystem 310a' control the flow of the processes such as the acquisition of the configuration information of the respective subsystems, volume configuration, pair creation, and volume migration.

Of course, the system configurations illustrated in FIGS. 2 and 26 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for migrating volumes among storage subsystems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A destination storage system coupled to a host computer and a source storage system including a source replication pair which is composed of a source primary volume and a source secondary volume, the source replication pair being migrated to a destination replication pair in the destination storage system, the destination storage system comprising:
   a destination primary storage apparatus providing a destination primary volume of the destination replication pair; and
   a destination secondary storage apparatus providing a destination secondary volume of the destination replication pair,
   wherein the destination storage system is configured to:
      execute a copy of data stored in the source primary volume to the destination primary volume and the destination secondary volume;
      receive a write request from the host computer during the copy to the destination primary volume and the destination secondary volume; and
      send data regarding to the write request to the source storage system until the copy to both of the destination primary volume and the destination secondary volume is completed so that the data is stored in both of the source primary volume and the source secondary volume.

2. The destination storage system according to claim 1;
   wherein the destination storage system is configured to:
   provide the destination primary volume as a volume having the same volume identifier with the source primary volume; and
   provide the destination secondary volume as a volume have the same volume identifier with the source secondary volume.

3. The destination storage system according to claim 1;
   wherein the destination storage system is configured to provide a virtual volume to which the source primary volume is mapped as a storage area of the virtual volume, and
   wherein the copy of the data stored in the source primary volume to the destination secondary volume is a replication from the virtual volume to the destination secondary volume.

4. The destination storage system according to claim 3;
   wherein the destination storage system is configured to:
   provide the virtual volume as a volume having the same volume identifier with the source primary volume; and
   provide the destination secondary volume as a volume having the same volume identifier with the source secondary volume,
   wherein the copy of the data stored in the source primary volume to the destination primary volume is migration from the virtual volume to the destination primary volume, and
   wherein after completion of the copy the data stored in the source primary volume to the both of the destination primary volume and the destination secondary volume, the destination storage system is configured to:
   swap volume identifiers of the virtual volume and the destination primary volume, provide the destination primary volume as the volume having the same identifier with the source primary volume; and
   configure the destination replication pair of the destination primary volume and the destination secondary volume instead of a replication pair of the virtual volume and the destination secondary volume.

5. The destination storage system according to claim 1,
   wherein the data is replicated from the source primary volume to the source secondary volume when the data is sent from the destination storage system.

6. A method for migrating a source replication pair to a destination replication pair, the source replication pair being composed of a source primary volume and a source secondary volume in a source storage system, the destination replication pair being composed of a destination primary volume and a destination secondary volume in a destination storage system, the method comprising:
   executing a copy of data stored in the source primary volume to the destination primary volume and the destination secondary volume;
   receiving a write request from a host computer during the copy to the destination primary volume and the destination secondary volume; and
   sending data regarding to the write request to the source storage system until the copy to both of the destination primary volume and the destination secondary volume is completed so that the data is stored in both of the source primary volume and the source secondary volume.

7. The method according to claim 6, further comprising:
providing the destination primary volume as a volume having the same volume identifier with the source primary volume; and
providing the destination secondary volume as a volume having the same volume identifier with the source secondary volume.

8. The method according to claim 6, further comprising:
providing a virtual volume to which the source primary volume is mapped as a storage area of the virtual volume, and
wherein the copy of the data stored in the source primary volume to the destination secondary volume is a replication from the virtual volume to the destination secondary volume.

9. The method according to claim 8, further comprising:
providing the virtual volume as a volume having the same volume identifier with the source primary volume; and
providing the destination secondary volume as a volume having the same volume identifier with the source secondary volume,
wherein the copy of the data stored in the source primary volume to the destination primary volume is a migration from the virtual volume to the destination primary volume, and
wherein after completion of the copy the data stored in the source primary volume to the both of the destination primary volume and the destination secondary volume, the method is further comprising:
swapping volume identifiers of the virtual volume and the destination primary volume, provide the destination primary volume as the volume having the same identifier with the source primary volume; and
configuring the destination replication pair of the destination primary volume and the destination secondary volume instead of the replication pair of the virtual volume and the destination secondary volume.

10. The method according to claim 6;
wherein the data is replicated form the source primary volume to the source secondary volume when the data is sent from the destination storage system.

11. A system for migrating a source replication pair to a destination replication pair, the system comprising:
a source storage system including the source replication pair being composed of a source primary volume and a source secondary volume in a source storage system; and
a destination storage system including the destination replication pair being composed of a destination primary volume and a destination secondary volume,
wherein the destination storage system is configured to:
execute a copy of data stored in the source primary volume to the destination primary volume and the destination secondary volume;
receive a write request from a host computer during the copy to the destination primary volume and the destination secondary volume; and
send data regarding to the write request to the source storage system until the copy to both of the destination primary volume and the destination secondary volume is completed so that the data is stored in both of the source primary volume and the source secondary volume.

12. The system according to claim 11,
wherein the destination storage system is configured to:
provide the destination primary volume as a volume having the same volume identifier with the source primary volume; and
provide the destination secondary volume as a volume having the same volume identifier with the source secondary volume.

13. The system according to claim 11,
wherein the destination storage system is configured to provide a virtual volume to which the source primary volume is mapped as a storage area of the virtual volume, and
wherein the copy of the data stored in the source primary volume to the destination secondary volume is a replication from the virtual volume to the destination secondary volume.

14. The system according to claim 13,
wherein the destination storage system is configured to:
provide the virtual volume as a volume having the same volume identifier with the source primary volume; and
provide the destination secondary volume as a volume having the same volume identifier with the source secondary volume,
wherein the copy of the data stored in the source primary volume to the destination primary volume is a migration from the virtual volume to the destination primary volume, and
wherein after completion of the copy the data stored in the source primary volume to the both of the destination primary volume and the destination secondary volume, the destination storage system is configured to:
swap volume identifiers of the virtual volume and the destination primary volume, provide the destination primary volume as the volume having the same identifier with the source primary volume; and
configure the destination replication pair of the destination primary volume and the destination secondary volume instead of a replication pair of the virtual volume and the destination secondary volume.

15. The system according to claim 11,
wherein the data is replicated from the source primary volume to the source secondary volume when the data is sent from the destination storage system.

* * * * *